United States Patent
Bartkiewicz et al.

(10) Patent No.: US 10,481,763 B2
(45) Date of Patent: Nov. 19, 2019

(54) MOBILE STAMP CREATION AND MANAGEMENT FOR DIGITAL COMMUNICATIONS

(71) Applicant: Lett.rs LLC, Canton, CT (US)

(72) Inventors: Drew Charles Bartkiewicz, Canton, CT (US); Dane Alfred Bartkiewicz, Canton, CT (US); Blake Daniel Bartkiewicz, Canton, CT (US); Ana Drew Bartkiewicz, Canton, CT (US)

(73) Assignee: LETT.RS LLC., Canton, CT (US)

( * ) Notice: Subject to any disclaimer, the term of this patent is extended or adjusted under 35 U.S.C. 154(b) by 1009 days.

(21) Appl. No.: 14/856,489

(22) Filed: Sep. 16, 2015

(65) Prior Publication Data

US 2016/0078659 A1 Mar. 17, 2016

Related U.S. Application Data

(60) Provisional application No. 62/051,937, filed on Sep. 17, 2014.

(51) Int. Cl.
*G06F 3/0482* (2013.01)
*G06F 3/0484* (2013.01)
(Continued)

(52) U.S. Cl.
CPC ........ *G06F 3/0482* (2013.01); *G06F 3/04817* (2013.01); *G06F 3/04845* (2013.01);
(Continued)

(58) Field of Classification Search
CPC .... G06T 11/60; G06F 3/0482; G06F 4/04842; G06F 3/0485; G06F 3/04817
See application file for complete search history.

(56) References Cited

U.S. PATENT DOCUMENTS 7,121,455 B2 * 10/2006 Chamberlain ....... G06Q 10/107
235/375
7,363,495 B2 * 4/2008 Felt .................... G06Q 20/3829
713/170
(Continued)

FOREIGN PATENT DOCUMENTS

GB 1077435 A1 2/2001

*Primary Examiner* — William L Bashore
*Assistant Examiner* — Gregory A Distefano
(74) *Attorney, Agent, or Firm* — Ashok Tankha

(57) ABSTRACT

A computer implemented method and a mobile stamp creation and communication system (MSCCS) dynamically creates, renders, and transforms a digital stamp for a stamped communication and media interactions. The MSCCS creates digital stamps by integrating media content, data elements, and dynamic functional elements received from multiple sources. The MSCCS renders the digital stamps to a user device for user selection based on dynamic rendering criteria, generates a stamped communication with the selected digital stamps, and marks the selected digital stamps with a visual usage marker that indicates use of the selected digital stamps in the stamped communication. The MSCCS transforms the marked digital stamps into dynamic content on the user device using data elements and functional elements imbedded in the marked digital stamps and inherent elements of the user device for performing actions on the marked digital stamps and invoking media interactions for creation and rendering of enhanced digital stamps.

28 Claims, 38 Drawing Sheets

(51) Int. Cl.
  *G06F 3/0481* (2013.01)
  *G06F 21/62* (2013.01)
  *G06F 21/64* (2013.01)
  *G06Q 30/02* (2012.01)
  *G06Q 50/00* (2012.01)

(52) U.S. Cl.
  CPC ........ *G06F 21/6218* (2013.01); *G06F 21/645* (2013.01); *G06Q 30/0241* (2013.01); *G06Q 50/01* (2013.01)

(56) References Cited

U.S. PATENT DOCUMENTS

| | | |
|---|---|---|
| 2001/0025254 A1 | 9/2001 | Park |
| 2003/0140017 A1* | 7/2003 | Patton ................ G06Q 20/045 705/410 |
| 2004/0117684 A1 | 6/2004 | Chamberlain |
| 2008/0028294 A1* | 1/2008 | Sell ................ G06F 17/30265 715/234 |
| 2009/0187764 A1* | 7/2009 | Astakhov ............ H04L 9/3263 713/170 |
| 2009/0192881 A1* | 7/2009 | Pierre ................ G06Q 10/107 705/59 |
| 2014/0130182 A1 | 5/2014 | Yackanich et al. |

\* cited by examiner

EDITING STAMP

Name

UNITED WAY

Book

FOR GOOD CAUSES

Sponsor lettrs®

Order Value

1075

Description (character count: 119)

This was the first United Way NYC stamp on the lettrs network and a proud example of social messaging with social good.

App url lettrs://letters//5489fb1f03d81e9

Web Url www.lettersfoundation.org

Circulation Date: 2014 November 12

Stamp type 1st

Geo origin

United States

Stamps  Stamp books  Users  Home  Banners  Sponsors  Settings

Total Stamps: 1464
Total Stamps in Circulation: 1464
Total Stamp Books: 54

| Total Selection | Total Detail | Total List | Total Detail View w/Stamp | Total | Total Uses |
|---|---|---|---|---|---|
| 56578543 | 219090 | 95539849 | 6904750 | 668449127 | 1200048 |

Sync with lettrs.com
Last sync: about 1 hour

Stamp Analytics (order by selected, then by total view count)

| Name | Stamp Selection Views | Stamp Detail Views | Letter List View | Letter Detail View w/Stamp | Stamp Total Views | Stamp | Stamp Uses on Letters | Stamp Engagement |
|---|---|---|---|---|---|---|---|---|
| 1). ORIGINAL Position: 1055 | 255691 | 24474 | 32221656 | 2128335 | 36931382 | 165158 | 965893 | 1155525 |
| 2). LOVE Position: 1120 | 241595 | 1017 | 167546 | 113405 | 4205841 | 9136 | 6261 | 16414 |
| 3). ANGEL BREATHING Position: 1234 | 108091 | 680 | 518447 | 62041 | 1662079 | 8803 | 5536 | 15019 |

FIG. 11C

Listing books

| | Order | Name | Enabled | | | New Book |
|---|---|---|---|---|---|---|
|  | 0 | LETTERS, THE ORIGINALS | true | Show | Edit | Destroy |
|  | 0 | THE PULSE | true | Show | Edit | Destroy |
|  | 0 | INTERNET PIONEERS | true | Show | Edit | Destroy |
|  | 0 | INTERNET COLLECTION | true | Show | Edit | Destroy |
|  | 0 | SALUTATION STAMPS | true | Show | Edit | Destroy |
|  | 1 | ROCK OUT | true | Show | Edit | Destroy |
|  | 1 | SPORT | true | Show | Edit | Destroy |

| Listing sponsors | | | | | 1202 New Sponsor | |
|---|---|---|---|---|---|---|
| Name | Description | Web url | App url | | | |
| lettrs® | Powering Messages that Matter. | http://txt.lettrs.com/sponsorlink | lettrs://users | Show | Edit | Destroy |
| Cisco United States | Cisco | | | Show Show | Edit Edit | Destroy Destroy |
| Denice Rinks | | https://www.etsy.com/shop/denicerinks | Lettrs://letters/551ddbb b9aab5049d0000984 | Show | Edit | Destroy |
| USA Postal | Stamps Past, messages today. | | | Show | Edit | Destroy |
| Izabella Miko | | http://txt.lettrs.com/iz abella-miko | lettrs://users /54d007519aab509eed00bbcc | Show | Edit | Destroy |
| Paulo Coelho | | http://txt.lettrs.com/p aulo-coelho | lettrs://users /52fd4d6c0c0ca0494c000115 | Show | Edit | Destroy |
| Torch & Laurel | | http://txt.lettrs.com/tlf ridge | lettrs://users /54c94cc59aab5005550027ff | Show | Edit | Destroy |
| Relativity Media | | http://txt.lettrs.com/d esert-dancer | lettrs://users /54e4d6b403d81e71f60017d8 | Show | Edit | Destroy |
| The Joy of Sox® | New socks for the homeless. | http://thejoyofsox.org | http://thejoyofsox.org | Show | Edit | Destroy |

MOBILE STAMP CREATION AND MANAGEMENT FOR DIGITAL COMMUNICATIONS

CROSS-REFERENCE TO RELATED APPLICATIONS

This application claims priority to and the benefit of provisional patent application No. 62/051,937 titled "Mobile Stamp Creation And Management For Digital Communications", filed in the United States Patent and Trademark Office on Sep. 17, 2014. The specification of the above referenced patent application is incorporated herein by reference in its entirety.

BACKGROUND

With the advent of high speed communication technology that facilitates communication between people via social networking platforms, text messages, electronic mails (emails), etc., the practice of communicating via digital messages has almost become the norm. However, these digital messages generally lack personalization, for example, by a stamp created or selected by a user based on preferences, etc. Typically, there have been digital messaging and communication systems that, for example, generate electronic flat object mail stamps that simulate a sticker of a stamp, use a computer to simulate a stamp in an email, or use a computer to create a physical stamp. However, there is no mobile or digital messaging and communication system that integrates data, media content, advertising content, and/or branding of content into a single communication medium in the form of a dynamic, logic based, and visually esthetic digital stamp. Moreover, there is no mobile, hand-held, or internet enabled device system that can be used to create, render, transform, manage, and distribute logic based, location based, or profile based smart stamps. Furthermore, there is no mobile or digital messaging and communication system that transforms stamps into dynamic content using inherent elements of a user device, data elements, and other dynamic functional elements, tracks usage of the stamps and media interactions with the stamps, and allows data extraction, analysis, sharing, and pathways to external sources via the stamps.

Hence, there is a long felt but unresolved need for a computer implemented method and system that dynamically creates, renders, transforms, and manages a digital stamp as a new media object in itself, for a personalized stamped communication or a commerce related stamped communication and for media interactions. Moreover, there is a need for a computer implemented method and system that marks a digital stamp to indicate use of the digital stamp, a delivery status of the digital stamp, and a viewing status of the digital stamp. Furthermore, there is a need for a computer implemented method and system that transforms media content in the digital stamp into dynamic content using inherent elements of a user device, data elements, and other dynamic functional elements for advertising, gaming, and/or branding purposes. Furthermore, there is a need for a computer implemented method and system that tracks stamp usage, media interactions, and activities with the digital stamp for creating and rendering enhanced digital stamps.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended to determine the scope of the claimed subject matter.

The computer implemented method and system disclosed herein addresses the above stated need for dynamically creating, rendering, and transforming a digital stamp, also referred to as a "mobile digital stamp", as a new media object in itself, for a stamped communication, for example, a personalized stamped communication or a commerce related stamped communication, and for media interactions. Moreover, the computer implemented method and system disclosed herein marks a digital stamp to indicate use of the digital stamp, a delivery status of the digital stamp, and a viewing status of the digital stamp. Furthermore, the computer implemented method and system disclosed herein distributes controls and management tools to transform media content in the digital stamp into dynamic content using inherent elements of a user device, data elements, and other dynamic functional elements for advertising, gaming, and/or branding purposes. Furthermore, the computer implemented method and system disclosed herein tracks stamp usage, media interactions, and activities with the digital stamp for creating and rendering enhanced digital stamps. The computer implemented method and system disclosed herein provides a mobile or digital messaging and communication system that integrates data, media content, advertising content, and/or branding of content into a single communication medium in the form of a dynamic, logic based, and visually esthetic digital stamp. Moreover, the computer implemented method and system disclosed herein provides a mobile, hand-held, or internet enabled device system that can be used to create, render, transform, manage, and distribute logic based, location based, or profile based smart stamps.

The computer implemented method disclosed herein employs a mobile stamp creation and communication system (MSCCS) comprising at least one processor configured to execute computer program instructions for dynamically creating, rendering, and transforming a digital stamp for a stamped communication, for example, a personalized stamped communication or a commerce related stamped communication, and for media interactions. The MSCCS receives, processes, and transforms media content, data elements, and dynamic functional elements from one or more of multiple sources. The MSCCS creates multiple digital stamps by integrating the received, processed, and transformed media content, data elements, and dynamic functional elements. The MSCCS processes and renders the created digital stamps to a user device via a graphical user interface (GUI) provided by the MSCCS based on one or more of multiple dynamic rendering criteria, for use in a stamped communication and/or media interactions. The MSCCS generates a stamped communication with one or more of the processed and rendered digital stamps. The MSCCS marks the processed and rendered digital stamps in the generated stamped communication with a visual usage marker. The visual usage marker indicates use of one or more of the processed and rendered digital stamps in the generated stamped communication. The MSCCS, in communication with the user device, processes and transforms the marked digital stamps in the generated stamped communication into dynamic content on the user device using one or more of data elements and the dynamic functional elements imbedded in the marked digital stamps and one or more of multiple inherent elements of the user device, for performing one or more actions on the marked digital stamps and invoking the media interactions for further creation and rendering of enhanced digital stamps.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, in an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIGS. 10A-10B exemplarily illustrate screenshots of a graphical user interface provided by the mobile stamp creation and communication system for editing a digital stamp.

FIGS. 11A-11C exemplarily illustrate screenshots of administration interfaces provided by the mobile stamp creation and communication system for viewing results of analytics performed on digital stamps.

FIGS. 12A-12B exemplarily illustrate screenshots of administration interfaces provided by the mobile stamp creation and communication system for managing stamp books and sponsors for digital stamps.

DETAILED DESCRIPTION OF THE INVENTION

Figure 1:
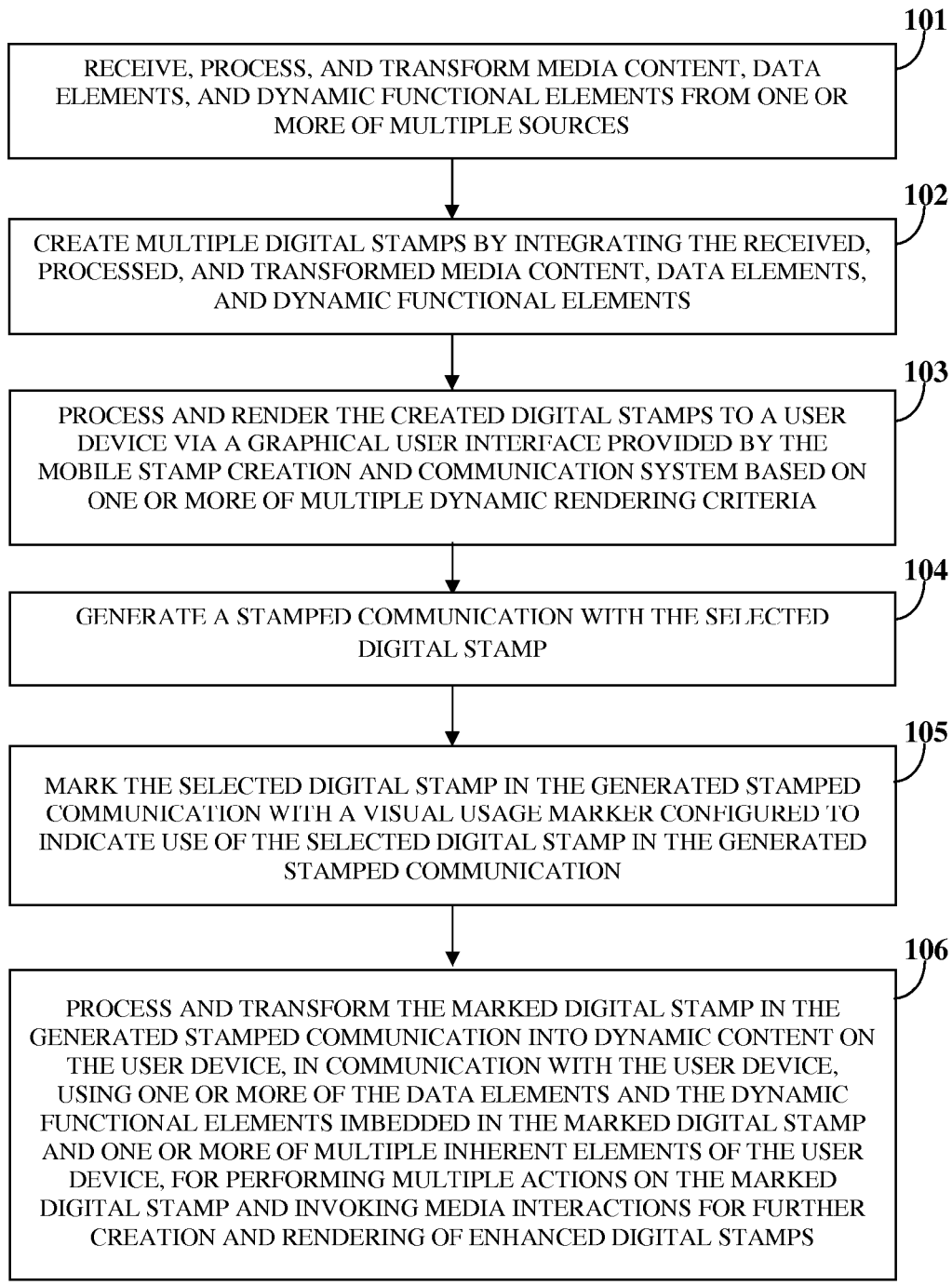
FIG. 1 illustrates a computer implemented method for dynamically creating, rendering, and transforming a digital stamp for a stamped communication and media interactions.

FIG. 1 illustrates a computer implemented method, also referred to as a "mobile device implemented method", a "software implemented method", a "smart phone implemented method", or a "tablet implemented method", for dynamically creating, rendering, and transforming a digital stamp, also referred to as a "mobile digital stamp", for a stamped communication and media interactions. As used herein, "digital stamp" refers to a digital content and communication object that is rendered on a predefined section of a communication such as a personal letter, a personal digital message, a public digital message, a commerce related communication, etc., to facilitate digital content communication and media interactions. Digital stamps are both data and content objects that transform digital communications and also transform data as they are used, while collecting new information each time and with real time integration possibilities to transform themselves, for example, by unlocking points, unlocking a gift code, playing a song, etc. Also, as used herein, "stamped communication" refers to a personalized communication, for example, a personal digital message, a personal letter, a personal text, a digital image, a picture, etc., a commerce related communication, and any other form of communication composed by a user, that contains a digital stamp. Also, as used herein, "media interactions" refer to interactions performed by users, for example, senders and recipients of a stamped communication with media content contained in digital stamps or accessible via the digital stamps. The media interactions comprise, for example, communications such as platform messaging, instant messaging, video messaging, voice messaging, etc., through media content contained in digital stamps or accessible via the digital stamps, uploading or posting digital stamps through one or more media channels, downloading digital stamps from stamped communications, accessing links contained in digital stamps, reviewing or rating digital stamps, selling or trading items, communications regarding a brand, accessing and viewing advertisements, sharing the digital stamps, commenting on the digital stamps, social media interactions within a social networking environment, etc.

The computer implemented method disclosed herein employs a mobile stamp creation and communication system (MSCCS) also referred to as a "mobile communication and messaging system", comprising at least one processor configured to execute computer program instructions for dynamically creating, rendering, and transforming a digital stamp for a stamped communication and for media interactions. In an embodiment, the MSCCS comprises a mobile stamp creation and communication application (MSCCA) configured as a mobile application downloadable on a user device, for example, a personal computer, a mobile device, a smart phone, a tablet, a smart glass, a laptop, a personal digital assistant, a client device, a portable electronic device, a network enabled computing device, an interactive network enabled communication device, etc., configured to perform functions of the MSCCS. A user using a user device accesses the MSCCA via a graphical user interface (GUI) provided by the MSCCS. In an embodiment, the GUI is a mobile device interface. In another embodiment, the GUI is a screen of a user device, for example, a mobile device, a smart phone, or a tablet, for creating, selecting, viewing, sharing, and managing digital stamps, stamped communications, etc. In an embodiment, the MSCCS creates, distributes, transforms, analyzes, publishes, and/or manages multiple digital stamps, for example, for mobile messaging. The computer implemented method disclosed herein recreates a physical medium of stamps to generate digital stamps with logic, software functions, access rights, analytics, intelligence, dynamic actions, and distribution capabilities.

The mobile stamp creation and communication system (MSCCS) receives, processes, and transforms 101 media content, data elements, and dynamic functional elements from one or more of multiple sources. The sources comprise, for example, the Internet, a user device such as a personal computer, a smart phone, or a mobile device that has data and content collection capabilities, external content databases, etc. The media content comprises, for example, one or more of textual content such as typed messages, handwritten messages, voice dictated personal or public digital communication messages, image content, audio content, video content, audiovisual content, multimedia content, digital content, messaging content, social media content such as "likes", "tweets", etc., advertising content, links to external sources, etc., and any combination thereof. The data elements comprise, for example, tags, captions, system settings, user profile information, user device characteristics, digital photos captured using a built-in camera of a user device such as a phone, geolocation information, data or media content stored in the user device, third party data or media content accessed via an application programmable interface (API), etc. The dynamic functional elements comprise, for example, user inputs, stamp transformation criteria, stamp usage parameters, purchase information, monetary credits, non-monetary credits, conversion techniques of user devices or mobile device interactions, access rights, etc. The stamp transformation criteria refer to code logic to be imbedded in a digital stamp that defines how transformation of a digital stamp to dynamic content should be performed on a user device. For example, the code logic defines inclusion of an interface element, for example, a play button on a digital stamp for allowing a user to activate transformation of the digital stamp to dynamic content on the user device. A user provides media content for creating a digital stamp, for example, by uploading images from the user device or an external computer, selecting one or more of a collection of stamps of different types and genres rendered for selection by the MSCCS, writing a textual message, providing a voice message, inserting audio content, typing, drawing, uploading content, etc., on the graphical user interface (GUI) of the MSCCS. The media content, data elements, and dynamic functional elements received by the MSCCS from different sources and the data inputted by the user via the GUI of the MSCCS is processed, transformed, and executed by an algorithm in the MSCCS for creating digital stamps.

In an embodiment, the mobile stamp creation and communication system (MSCCS) renders predetermined digital stamps for selection by a user based on predetermined logic in the MSCCS that is derived, for example, from user profile information or user profile attributes, for example, status, location, age, sex, nationality, etc., or from the logic of the MSCCS to promote certain digital stamps or offer digital stamps for purchase. The logic of the MSCCS uses various system attributes to render digital stamps, for example, based on time, featured status, tags, promotional status, etc. In an embodiment, the MSCCS determines the logic for rendering a digital stamp by a combination of the user profile attributes and system settings of the digital stamp. For example, for a user of a certain location, the MSCCS renders a digital stamp on promotion for that location, with media or a commerce action that is triggered when the user selects that digital stamp.

The mobile stamp creation and communication system (MSCCS) assigns dynamic functional elements comprising, for example, access rights, values or points, links to products and/or services, etc., to a digital stamp and defines how the digital stamp can be used by a user, for example, a sender or a recipient of a stamped communication. In an embodiment, the MSCCS allows access to some pieces of content contained in the digital stamp while restricting access to other pieces of content. The MSCCS further defines that the other pieces of content are accessible to the recipient of a stamped communication, if the user performs predefined tasks, for example, viewing of an advertisement, taking a survey, providing feedback, etc. The assignments and the definitions configured by the MSCCS define the dynamic functional elements for the creation of the digital stamps.

In an embodiment, the mobile stamp creation and communication system (MSCCS) allows a user to create an "instant stamp" similar to a theme, using a picture for a one time use of a stamp on a personalized communication. The MSCCS marks the instant stamp with an indicator of the MSCCS for use on that personalized communication only, and specifies that the instant stamp is not available to others. In another embodiment, the MSCCS allows a user to submit a stamp for use by others in a network. In this embodiment, the user uploads a picture, adds wordings over the picture, fonts over the picture, etc., selects a border and a color, and the stamp automatically adds the user's post box number as an originator or submitter of that original stamp. The owner of the stamp clicks a check box accepting "terms and conditions" on the graphical user interface (GUI) provided by the MSCCS and submits the stamp to a data store of the MSCCS for approval. When the user receives a notification that stamp has been approved, the stamp is made available in a collection of digital stamps on the GUI.

The mobile stamp creation and communication system (MSCCS) creates 102 multiple digital stamps by integrating the received, processed, and transformed media content, data elements, and dynamic functional elements into a dynamic digital stamp media object, also referred to as a "dynamic digital asset" or a "dynamic digital stamp content object". For example, the MSCCS converts an image, or a file in a graphic interchange format (gif), or a file of another digital content type into a dynamic digital stamp media object with new content, data attributes, and features, for example, stamp markings, a date of creation, distribution rights, presentation rights, and behavioral elements for creation of that digital stamp as a unique dynamic digital stamp media object in the MSCCS. The MSCCS configures each of the digital stamps with logic, access rights, analytics, intelligence, etc., for achieving, for example, message personalization, user self-expression, commercial purposes, content management, commerce related stamped communication, advertising, branding of applications, monetization of digital stamps by assigning values or points to the digital stamps, etc. In an embodiment, the MSCCS allows a user using a user device to use, for example, a personal digital image and create a digital stamp via the graphical user interface (GUI) provided by the MSCCS. The MSCCS converts or transforms generic data associated with the personal digital image to a digital stamp. In an embodiment, the converted digital stamp is savable and reusable by the MSCCS. The MSCCS extracts digital elements and data items from the received, processed, and transformed media content. An application programmable interface (API) of the MSCCS converts or transforms the extracted digital elements and data items into a digital stamp. After converting dynamic digital stamp media objects to a digital stamp, the MSCCS renders the digital stamp as shareable digital media content comprising, for example, embedded intelligence, logic, behaviors, paths, etc. The created digital stamp is imbedded with code logic that allows transformation of the created digital stamp into dynamic content comprising, for example, audio content, visual content, activation information, points, prizes, etc. In an embodiment, the digital stamp rendered on a user device carries an activation element, for example, a play button user interface (UI) that invites the user to activate the transformation. In an embodiment, the MSCCS allows users, for example, third party application developers to extend digital stamps that are distributed and/or created by the API of the MSCCS to other mobile applications hosted on the same server managed by the third party application developers.

An example implementation of a computer program code that illustrates a programmed algorithm executed by the mobile stamp creation and communication system (MSCCS) for creating digital stamps is as follows:

```
<div class="field">
   <label for="stamp_name">Name</label><br />
   <input id="stamp_name" name="stamp[name]" size="30"
   type="text" />
</div>
<div class="field">
   <label for="stamp_book_id">Book</label><br />
      <label>LETTRS, THE ORIGINALS</label>
      <input id="stamp_book_id" name="stamp[book_id]"
      type="hidden" value="544ea864072d62392a000001" />
</div>
<div class="field">
   <label for="stamp_sponsor_id">Sponsor</label><br />
      <select id="stamp_sponsor_id" name="stamp[sponsor_id]">
      <option value="">Optional Sponsor</option>
<option value="546949db4ded54cd19000002">lettrs®</option>
<option value="546ba72fb36b206fb3000003">Cisco</option>
<option value="546f83a4371ae3d42a000004">United States</option>
<option value="54d2c20022b9538304000001">Denice Rinks</option>
<option value="555b2d0eb532a37a1b000001">USA Postal</option>
<option value="552d4874516557f90cd000001">Izabella Miko</option>
<option value="546b69ab6f7630972c000005">Paulo Coelho</option>
<option value="54d53b4c1c87823766000001">Torch &
Laurel</option>
<option value="550ca268345a56fad0000001">Relativity Media</option>
<option value="559fed0ac76a6666ab000001">The Joy of Sox®</option>
<option value="55bba38b73180a5103000001">Weaver Films</option>
<option value="55d8fccf0fca965c58000001">Election 2016</option>
<option value="55db29836ac1fa3672000001">Lebron James
Foundation</option>
<option value="55db2ed26ac1fa6699000001">lettrs Foundation</option>
<option value="55e08261fadcce7b41000001">Jordan Clarkson</option>
<option value="55f103balef46fe299000001">Vint Cerf</option></select>
   </div>
```

In an embodiment, the mobile stamp creation and communication application (MSCCA) of the mobile stamp creation and communication system (MSCCS) uses specific and specialized code to configure the user device to receive media content, data elements, and dynamic functional elements from multiple sources and encapsulate the received media content, data elements, and dynamic functional elements in a digital stamp media object, for example, in an extensible markup language (XML) format. The MSCCS packs data and functions into a single component, herein referred to as a "digital stamp media object". The digital stamp media object contains relevant data comprising, for example, metadata, byte streams, and scripts that govern dynamic behavior, required to reproduce digital content. In an embodiment, designated servers of the MSCCS retrieve the digital stamp media object from a device storage unit of the user device, for example, via an application program interface (API). The MSCCS parses the retrieved digital stamp media object to generate a digital stamp.

A user using a user device accesses the mobile stamp creation and communication system (MSCCS) for creating and delivering a stamped communication, for example, a personalized stamped communication or a commerce related stamped communication, for example, via a website hosted by the MSCCS or via a downloadable software, herein referred to as the "mobile stamp creation and communication application" on the user device. The user using the user device transmits the media content for creation of a digital stamp to the MSCCS via the website or the mobile stamp creation and communication application on the user device. In an example, after the user composes a personalized communication, for example, types, writes, or voice dictates a personalized letter via the graphical user interface (GUI) of the MSCCS, the MSCCS allows the user to change a pre-selected digital stamp rendered on the composed personalized communication via the GUI. In an embodiment, the MSCCS provides a selection list of digital stamps to a creator of the personalized communication with stamp availability as determined by the logic of the MSCCS. The selection list comprises, for example, a library description of each of the digital stamps that are to be transformed to branded dynamic digital stamp media objects. The options for digital stamps displayed to the users on the GUI are based on predetermined logic of the MSCCS that is derived, for example, from the user profile information comprising, for example, a status, a location, age, sex, nationality, etc., or from the logic of the MSCCS to promote digital stamps or offer digital stamps for purchase. For example, the MSCCS displays digital stamps configured as mobile stamps on a user device to a user based on geolocation information retrieved by the MSCCS from the user device.

Consider an example where a user registers with the mobile stamp creation and communication system (MSCCS) for creating and/or viewing a digital stamp, for example, a mobile stamp on a mobile device via a graphical user interface (GUI) of the MSCCS. The user captures an image or a picture using a built-in camera of the mobile device. The user uploads the captured image via the GUI of the MSCCS. In an embodiment, the user uploads additional mobile data associated with the captured image via the GUI of the MSCCS. The MSCCS converts the uploaded image and/or the additional mobile data into dynamic digital stamp media objects comprising updated characteristics. The characteristics comprise, for example, tags to describe the digital stamp, settings of whether the digital stamp can be used by others on their messages or for personal use, settings of whether the digital stamp is for free or for purchase to use by others, etc. The MSCCS converts a device picture or a video or a file of another content type to a new and defined digital stamp media object, with new and original markings, distribution characteristics, settings, tags, descriptions, etc. In an embodiment, this conversion also incorporates algorithms that retrieve data from the user profile information to determine digital stamp attributes comprising, for example, markings of a user specific identifier (ID), linking logic to connect the digital stamp to the user's profile, etc. The MSCCS displays the dynamic digital stamp media objects comprising, for example, settings choices, tag settings, style user interface (UI), etc., to the user on the user device, thereby allowing the user to create a dynamic mobile stamp using the displayed dynamic digital stamp media objects via the GUI of the MSCCS.

In an embodiment, the mobile stamp creation and communication system (MSCCS) determines a cost for each of the created digital stamps based on predetermined pricing criteria. The predetermined pricing criteria for determining the cost for each of the created digital stamps comprise, for example, one or more of digital stamp availability, promotion of the created digital stamps, sponsorship of the created digital stamps, stamp usage trends, social factors, etc. The pricing of the digital stamps is based on variables comprising, for example, stamp scarcity, a limited edition status of each digital stamp, popularity, a trending nature of digital stamps, social factors such as sale of digital stamps to raise money for a social cause, etc. In an example, the MSCCS computes a high price for digital stamps that are scare or for digital stamps with a limited edition status of digital stamps. In another example, the MSCCS computes a low price for popular or trending digital stamps. In an embodiment, the MSCSS determines an ordering sequence for rendering of the created digital stamps to the user device based on predetermined ordering criteria. The predetermined ordering criteria comprise, for example, one or more of a manual order, digital stamp availability, promotion of the created digital stamps, sponsorship of the created digital stamps, stamp usage trends, social factors, etc. In an embodiment, the MSCCS implements a specialized formula that calculates the ordering sequence for the digital stamps to determine which digital stamps should be displayed first based on the user profile information matched against system factors, for example, promoted digital stamps, sponsored digital stamps, digital stamps with limited availability, digital stamps that are trending in popularity, etc. An example of a computer program code that illustrates the dynamic or programmed algorithm executed by the MSCCS for ordering the digital stamps to be rendered or displayed to users via the graphical user interface (GUI) is as follows:

```
<div class="field">
  <label for="stamp_order_value">Order value</label><br />
  <select id="stamp_order_value" name="stamp[order_value]"><option value="0">0</option>
<option value="1">1</option>
<option value="2">2</option>
<option value="3">3</option>
```

The mobile stamp creation and communication system (MSCCS) processes and renders 103 the created digital stamps to a user device via the graphical user interface (GUI) provided by the MSCCS based on one or more of multiple dynamic rendering criteria for use in a stamped communication and/or media interactions. The dynamic rendering criteria comprise, for example, logic parameters, user device characteristics, time, a location, a user selection of a digital stamp, user purchase information including a purchase of a digital stamp, user profile information, user interaction information, marketing criteria, a predefined or random rendering sequence, pricing, a user membership status, user profile settings in social networks, business requirements and rules, dynamic variables such as random luck, etc. The dynamic rendering criteria render the digital stamps as smart digital stamps. The dynamic rendering criteria used by the MSCCS is processed, transformed, and executed by an algorithm in the MSCCS for rendering the created digital stamps to the user device. A random display of the digital stamps is a setting in the MSCCS that utilizes code and similarly a more defined rendering of the digital stamps can also be established based on variables disclosed in the examples above. In an embodiment, for stamp rendering within another social network, the MSCCS creates its own stamp logic, in addition to stamping logic determined by user device characteristics. An example of a computer program code that illustrates the dynamic or programmed algorithm executed by the MSCCS using a Ruby on Rails® implementation for rendering the created digital stamps to a user device is as follows:

In an embodiment, a digital stamp is configured as a mobile stamp that is rendered to a user device based on user device characteristics. For example, the mobile stamp creation and communication system (MSCCS) retrieves a display resolution and a screen size from the user device and renders the created digital stamps at positions on a display screen in accordance with the display resolution and the screen size. In an embodiment, the MSCCS resizes the created digital stamp to fit within a stamped communication to be created. In another example, the MSCCS renders the created digital stamps to the user device based on geolocation information retrieved by the MSCCS from the user device. In another example, the MSCCS renders the digital stamps selected or purchased by the user with the dynamic digital stamp media objects. In another example, the MSCCS renders the created digital stamps to the user device based on the user profile information or user profile settings in social networks such as a user's preference for sports, travel, food, television, music, artists, politics, literature, etc. In another example, the MSCCS renders the created digital stamps to the user device based on the user interaction information such as a user's interaction with a digital stamp from a personalized stamped communication received by the user, a user accessing media content of the digital stamp, sharing the digital stamp with members of a social networking platform, etc. In another example, the MSCCS renders the created digital stamps based on marketing criteria comprising, for example, promotional campaigns to promote the digital stamps or to offer the digital stamps for purchase. In another example, the MSCCS renders the digital stamps based on a user membership status with the MSCCS, that is, users who are registered with the MSCCS have access to a wider range of digital stamps and offers on the digital stamps. In an embodiment, the MSCCS tracks and processes a date and a timestamp of each of the processed and rendered digital stamps to track usage of the processed and rendered digital stamps. In an embodiment, the processed and rendered digital stamps comprise links to origin locations of the processed and rendered digital stamps. This embodiment allows a user to identify from where the digital stamp originated before being selected, converted, shared, accessed, etc.

A user who wants to create a stamped communication, for example, a personalized stamped communication, provides media content to the mobile stamp creation and communication system (MSCCS) for generating a personalized communication, for example, by writing, dictating, typing, drawing, uploading media content, etc., on the graphical user interface (GUI) of the MSCCS. For example, the user may submit media content comprising, for example, textual content, image content, audio content, video content, audiovisual content, multimedia content, animations, digital content, etc., to the MSCCS via the GUI. The MSCCS receives the submitted media content and provides an option to select or create a digital stamp for the stamped communication. When a user selects one of the processed and rendered digital stamps on the GUI, the MSCCS generates 104 a stamped communication with one of the rendered digital stamps, that is, the selected digital stamp. In an embodiment, the user may select more than one of the processed and rendered digital stamps on the GUI. In this embodiment, the MSCCS generates the stamped communication with the selected digital stamps. In an embodiment, the MSCCS positions the selected digital stamp at a predefined section of the personalized communication to generate the stamped communication. The MSCCS generates, for example, a text based personalized communication such as a personal letter, a personal text, etc., an audio based personalized communication such as a recorded audio letter, or a video based personalized communication such as a recorded video letter with the selected digital stamp based on the type of media content received from the user device.

When a user selects a digital stamp, the mobile stamp creation and communication system (MSCCS) attaches the selected digital stamp to a personalized or commerce related communication for delivery of the stamped communication to either multiple users as a public letter or to a single user as a private personal digital message. The MSCCS allows a user using a user device to transmit the stamped communication with the selected digital stamp to another user who uses another user device via a network, for example, the internet, a network that implements Wi-Fi® of Wi-Fi Alliance Corporation, a mobile telecommunication network, etc. The MSCCS transmits the stamped communication via one or more of multiple delivery modes, for example, digital mail, a short message service (SMS), mobile messaging, communication channels in social networks, electronic mail (email) systems, mobile devices, connected smart phones, smart glasses, etc.

The mobile stamp creation and communication system (MSCCS) marks 105 one or more of the processed and rendered digital stamps, that is, the selected digital stamp in the generated stamped communication with a visual usage marker. The visual usage marker indicates use of the selected digital stamp in the generated stamped communication. In an embodiment, the visual usage marker also indicates a delivery status and/or a viewing status of the selected digital stamp on the user device. The visual usage marker is configured, for example, as an ink mark, a cancellation postal mark, etc., of a used physical stamp. In an embodiment, the visual usage marker is configured, for example, as an icon, a symbol, a logo, an emblem, a code, an image, a digital watermark, a multimedia object such as an animation, etc., in one or more of multiple sizes and shapes. Examples of the visual usage marker comprise a star, a polygon, a checkmark, a pictorial cancellation mark, etc. The MSCCS detects and visually indicates the use of the selected digital stamp in the stamped communication through the visual usage marker.

The mobile stamp creation and communication system (MSCCS) detects and visually indicates the use of the selected digital stamp in the stamped communication using predetermined logic defined by a user such as a creator of a digital stamp or an administrator, or based on user device characteristics comprising, for example, data of a user device. The MSCCS displays the visual usage marker on the selected digital stamp when the digital stamp is used by the users of the MSCCS. In an embodiment, the visual usage marker is configured as a visual postmark. For example, the MSCCS renders a visual mobile location postmark on a digital stamp when the digital stamp is utilized in a stamped communication. The MSCCS renders the visual usage marker on a digital stamp, when the digital stamp is viewed, for example, as a public letter or a private letter. Once a digital stamp is used in a stamped communication, the MSCCS renders the visual usage marker over the digital stamp to illustrate that the stamped communication is delivered as a private stamped communication or published as an open digital stamped communication. In an embodiment, after insertion of the visual usage marker into the digital stamp, the digital stamp displays information related to the digital stamp but is not changeable on the embedded and completed stamped communication.

The mobile stamp creation and communication system (MSCCS), in communication with the user device, processes and transforms 106 the marked digital stamp in the generated stamped communication into dynamic content on the user device using one or more of the data elements and the dynamic functional elements imbedded in the marked digital stamp and one or more of multiple inherent elements of the user device, for performing one or more actions on the marked digital stamp and invoking media interactions for further creation and rendering of enhanced digital stamps. The created digital stamp is imbedded with code logic that creates the transformation of the marked digital stamp into dynamic content comprising, for example, audio content, visual content, activation information, points, prizes, etc. In an embodiment, the digital stamp rendered on a user device carries an activation element, for example, a play button user interface (UI) that invites the user to activate the transformation. The inherent elements of the user device used for transforming the marked digital stamp into dynamic content comprise, for example, a built-in image capture device such as a mobile phone camera, a global positioning system that provides geolocation information, and user device data comprising, for example, phone numbers, mobile applications, etc. In an example, the MSCCS uses the geolocation information of the user device to transform the marked digital stamp into dynamic content. The unique geolocation from the user device, when powered by a telecommunications network or an internet protocol (IP) address indicates the location of the MSCCS user to the MSCCS. This geolocation information is inputted into a specialized algorithm for rendering the digital stamps, and in an embodiment, also for transformation of the digital stamps. For example, the digital stamp automatically activates audio enhancements of the digital stamp in a particular language when the MSCCS detects that the user is in a country for that language using the geolocation information.

The inherent elements of the user device retrieved by the MSCCS are processed, transformed, and executed by an algorithm in the MSCCS for transforming the marked digital stamp in the generated stamped communication into dynamic content on the user device. The processed and transformed digital stamps become dynamic content for tracking, analytics, intelligence, and secondary paths to other media content. Each digital stamp transforms itself into a dynamic stamp media object during interactions with a user. In an embodiment, the processed and transformed digital stamps become shareable, branded or non-branded dynamic digital stamp media objects across social networks. A generic computer using a generic program cannot create digital stamps by integrating the received, processed, and transformed media content, data elements, and dynamic functional elements, cannot process and render the created digital stamps to a user device via the graphical user interface (GUI) provided by the MSCCS based on dynamic rendering criteria for use in a stamped communication and for media interactions, and cannot transform the marked digital stamp in the generated stamped communication into dynamic content on the user device using one or more of the data elements and the dynamic functional elements imbedded in the marked digital stamp and one or more of the inherent elements of the user device for invoking media interactions for further creation and rendering of enhanced digital stamps.

A recipient of the stamped communication receives and views the rendered digital stamp on the stamped communication. Behavior of the rendered digital stamp may change based on the user device, that is, the recipient's device to which the stamped communication is provided by the mobile stamp creation and communication system (MSCCS). The MSCCS tracks the behavior of the rendered digital stamp and extracts digital elements and data items from the digital stamp to transform the digital stamp into a digital smart stamp using application programmable interfaces (APIs) of the mobile stamp creation and communication system (MSCCS). In an embodiment, when a recipient downloads the delivered digital stamp on the recipient's user device, the metadata of the digital stamp comprising, for example, a name, a sponsor, an order value, a description, an application uniform resource locater (URL), a web uniform resource locater, a circulation date, a stamp type, a geo-origin, etc., is prepopulated. The MSCCS provides an option to browse content, for example, image content, of the downloaded digital stamp on operating system display screens of the recipient's user device. The MSCCS analyzes image properties which may be in any static image format and dynamically renders the image content, for example, using object character recognition technology. According to a frame size of the digital stamp, the MSCCS further resizes and adjusts the digital stamp using an in-built processing system.

An example of a computer program code that illustrates the dynamic or programmed algorithm executed by the mobile stamp creation and communication system (MSCCS) for dynamic rendering, selection, and transformation of the created digital stamps is as follows:

The actions performed on the marked digital stamps comprise, for example, tracking, data extraction, analysis, sharing, providing pathways to external sources, and management of the processed and rendered digital stamps. In an embodiment, the mobile stamp creation and communication system (MSCCS) performs the analysis and the tracking of the digital stamps by using analytical inputs received via the graphical user interface (GUI) and/or analytical tools. The MSCCS analyzes the created, delivered, and used digital stamp elements using logic parameters via the analytical tools and/or expert inputs received via the GUI of the MSCCS. The MSCCS performs the analysis and the tracking of the digital stamps for determining the dynamic functional elements used for the creation and the rendering of the enhanced digital stamps. In an embodiment, the MSCCS determines user behavior associated with the processed and rendered digital stamps by processing, analyzing, and transforming media interactions with the processed and rendered digital stamps in the generated stamped communication using analytical inputs received via the GUI and/or analytical tools. For example, the MSCCS determines time spent on reading or viewing the digital stamps, the selections of the digital stamps, a sharing count of the digital stamp, etc. In an embodiment, the MSCCS determines the user behavior on a per user basis and based on a total population or aggregate use of a digital stamp. Sample data determined by the MSCCS comprises, for example, time spent on a digital stamp, views, shares, likes, comments, number of times the digital stamp is used on a message, number of times a digital stamp is shared on another social network or shared via electronic mail (email), a short message service (SMS) message, etc. This data is processed, transformed, and executed by an algorithm in the MSCCS for determining the user behavior associated with the processed and rendered digital stamps. In an embodiment, the MSCCS utilizes the determined user behavior as an additional dynamic rendering criterion for rendering the created digital stamps to users via their user devices. For example, if the MSCCS finds that a particular user has shared a particular digital stamp multiple times via social networks through the determined user behavior, the MSCCS rendering one or more free digital stamps for the user's personal use in stamped communications.

In another embodiment, the mobile stamp creation and communication system (MSCCS) determines the dynamic functional elements, for example, stamp transformation criteria, stamp usage parameters, etc., for the creation and rendering of the enhanced digital stamps by processing, analyzing, and transforming media interactions with the processed and rendered digital stamps in the generated stamped communication using analytical inputs received via the graphical user interface (GUI) and/or analytical tools. In an embodiment, the MSCCS utilizes the determined user behavior as a criterion for determining dynamic functional elements that can be used for transforming digital stamps to dynamic content. For example, if the MSCCS finds that a particular user has shared a particular digital stamp multiple times via social networks through the determined user behavior, the MSCCS embeds links to promotional offers within the delivered digital stamp on a stamped communication delivered to that user, to allow the user to use the promotional offers at locations proximal to the location of the user device. In another embodiment, the mobile stamp creation and communication system (MSCCS) computes one or more factors for rendering and transforming digital stamps by processing, analyzing, and transforming media interactions with the digital stamps in the generated stamped communication using analytical inputs received via the graphical user interface (GUI) and/or analytical tools based on commerce criteria. The commerce criteria comprise, for example, use of the stamps for promoting products and/or services, use of the stamps for offering products and/or services for purchase, etc.

In an embodiment, the mobile stamp creation and communication system (MSCCS) creates, distributes, and marks digital stamps using inherent elements of a user device comprising, for example, a built-in image capture device such as a camera, a global positioning system that provides geolocation information, and user device data, for example, phone numbers, mobile applications, etc. In an embodiment, the digital stamps received and viewed on a user device carry monetary credits such as winning credits and/or non-monetary benefits such as points, status, etc., assigned by users. In an embodiment, the MSCCS assigns a monetary indicator, for example, a monetary value or a class, to the created digital stamps for monetization of the created digital stamps via the graphical user interface (GUI) of the MSCCS, thereby allowing the users to track and manage monetization or measurement capabilities associated with the created digital stamps via the GUI. In an embodiment, the MSCCS generates rewards for performing predetermined tasks on one or more of the rendered digital stamps or the marked digital stamps. In this embodiment, the MSCCS processes media interactions performed on the rendered digital stamps or the marked digital stamps via the GUI and transforms the processed media interactions into rewards. In an embodiment, the MSCCS accesses a memory unit or a device storage unit of the user device and retrieves user device data comprising, for example, phone contacts, electronic mail (email) contacts, call logs, internet data such as browsing history, calendar data, data about the device's location, the device unique identifiers (IDs), etc. The MSCCS uses the retrieved user device data to create, distribute, and mark the digital stamps. The mobile stamp creation and communication application (MSCCA) configures or programs a processor of the user device of the recipient of the stamped communication to communicate with a global positioning system (GPS) receiver of the user device to retrieve GPS coordinates. The designated servers of the MSCCS that communicate with the MSCCA via the network use the retrieved GPS coordinates to provide location based information to the recipient via the digital stamp. In an example, the MSCCS retrieves the geolocation information of the user device and allows the user to obtain coupons from nearby stores, purchase products from nearby locations, etc., via links inserted in the digital stamps.

In an embodiment, the mobile stamp creation and communication system (MSCCS) configures access controls on the created digital stamps for controlling access to the media content of the marked digital stamp and for tracking and processing media interactions with the marked digital stamp and activities associated with the marked digital stamp. In the computer implemented method disclosed herein, the MSCCS allows users to learn from the digital stamps and the data presented, with analytics of usage; interact with the digital stamps by using them on their digital message communications, transforming the message itself, with the digital stamp becoming permanently fused with the communications; interact with the digital stamps by sharing them, for example, via a short service message (SMS) service, social networks, and other channels, where the digital stamp carries a link back to the origination of the digital stamp and more metadata is presented; track the dates and time when a digital stamp is continually transformed, updated, and rendered both on the GUI to the user and at a backend analytics engine of the MSCCS that analyzes stamp activity, usage, etc.

In an embodiment, the computer implemented method and the mobile stamp creation and communication system (MSCCS) implements one or more specific computer programs to direct the user towards a set of end results. The interactions designed by the MSCCS allows the MSCCS to render the created digital stamps to a user device of a sender of a stamped communication based on dynamic rendering criteria for use in the stamped communication and collect inherent elements of a user device of a recipient of the stamped communication, and from this information, through the use of other separate and autonomous computer programs, transform the digital stamps into dynamic content on the recipient's user device. This transformation is used by the MSCCS as a trigger to invoke media interactions with the digital stamps. These processes require no less than two separate computer programs, which cannot be easily or manually executed by a person working with a generic computer.

Example computer program codes that illustrate programmed algorithms executed by the mobile stamp creation and communication system (MSCCS) for dynamically creating, rendering, and transforming a digital stamp are as follows:

```
</div>
 <div class="field">
   <label for="stamp_stamp_type">Stamp type</label><br />
   <select id="stamp_stamp_type" name="stamp[stamp_type]"><option
     value="1st">1st</option>
<option value="2nd">2nd</option>
<option value="3rd">3rd</option></select>
 </div>
 <div class="field">
   <label for="stamp_geo_origin">Geo origin</label><br />
   <input id="stamp_geo_origin" name="stamp[geo_origin]" size="30" type="text" />
```

-continued

```
      </div>
      <div class="field">
        <label for="stamp_image">Image</label><br />
        <input id="stamp_image" name="stamp[image]" type="file" />
      </div>
      <div class="field">
        <label for="stamp_enabled">Enabled</label><br />
        <input name="stamp[enabled]" type="hidden" value="0" /><input
          id="stamp_enabled" name="stamp[enabled]" type="checkbox" value="1" />
      </div>
      <div class="actions">
        <input class="btn btn-primary pull-right" name="commit" type="submit"
          value="Create Stamp" />
      </div>
    </form>
        <a href="/stamps" class="btn pull-right">Back</a>
        <div class="clearfix"></div>
  </div>
  </div>
  <div class="clearfix"></div>
  <footer>
      <p>Interested in submitting stamp ideas for you or your business?</br>
      Contact us at <span><a
      href="mailto:stamps@lettrs.com">stamps@lettrs.com</a></span></p></br>
      <p>Questions about use of these samples, see <span><a
      href="http://aboutlettrs.com/disclaimer">Disclamer</a></span></p>
  </footer>
  </body>
</html>
//backend creation process of stamp
# POST /stamps
# POST /stamps j son
before_filter :authenticate_user!, only: [:new, :edit, :update, :create, :update, :destroy]
def create
  @stamp = Stamp.new(params[:stamp])
  @stamp_count = Stamp.all.count
  respond_to do |format|
    if @stamp.save
      expire_action :action => :index
      expire_action :action => :show
      format.html { redirect_to @stamp, notice: 'Stamp was successfully created.' }
      format.json { render json: @stamp, status: :created, location: @stamp }
    else
      format.html { render action: "new" }
      format.json { render json: @stamp.errors, status: :unprocessable_entity }
    end
  end
end
admin stamp settings
//edit stamp settings generated view
<!DOCTYPE html>
<html>
<head>
<script
type="text/javascript">window.NREUM||(NREUM={ });NREUM.info={ "beacon":"bam.
nr-data.net","errorBeacon":"bam.nr-
data.net","licenseKey":"d904b09ee0","applicationID":"6764971","transactionName":"Ill
aFkVWWgoEQkoHAQxfWk1ETVcLEUNKAwEIQg==","queueTime":9,"applicationTime
":172,"ttGuid":"","agentToken":null,"agent":"js-agent.newrelic.com/nr-
686.min.js"}</script>
<script
type="text/javascript">window.NREUM||(NREUM={ }),__nr_require=function(e,n,t){function
r(t){if(!n[t]){var o=n[t]={exports:{ }};e[t][0].call(o.exports,function(n){var
o=e[t][1][n];return r(o?o:n)},o,o.exports)}return n[t].exports}if("function"==
typeof__nr_require)return__nr_require;for(var o=0;o<t.length;o++)r(t[o]);return
r}({QJf3ax:[function(e,n){function t(e){function n(n,t,a){e&&e(n,t,a),a||(a={ });for(var
u=c(n),f=u.length,s=i(a,o,r),p=0;f>p;p++)u[p].apply(s,t);return s}function
a(e,n){f[e]=c(e).concat(n)}function c(e){return f[e]||[ ]}function u( ){return t(n)}var
f={ };return{on:a,emit:n,create:u,listeners:c,_events:f}}function r( ){return{ }}var
o="nr@context",i=e("gos");n.exports=t( )},{gos:"7eSDFh"}],ee:[function(e,n){n.exports=
e("QJf3ax")},{ }],3:[function(e,n){function t(e){return function( ){r(e,[(new
Date).getTime( )].concat(i(arguments)))}}var
r=e("handle"),o=e(1),i=e(2);"undefined"==typeof
window.newrelic&&(newrelic=window.NREUM);var
a=["setPageViewName","addPageAction","setCustomAttribute","finished","addToTrace
","inlineHit","noticeError"];o(a,function(e,n){window.NREUM[n]=t("api-
"+n)}),n.exports=window.NREUM},{1:12,2:13,handle:"D5DuLP"}],gos:[function(e,n){
n.exports=e("7eSDFh")},{ }],"7eSDFh":[function(e,n){function
t(e,n,t){if(r.call(e,n))return e[n];var
```

```
o=t( );if(Object.defineProperty&&Object.keys)try{return
Object.defineProperty(e,n,{value:o,writable:!0,enumerable:!1}),o}catch(i){ }return
e[n]=o,o}var
r=Object.prototype.hasOwnProperty;n.exports=t},{ }],D5DuLP:[function(e,n){function
t(e,n,t){return
r.listeners(e).length?r.emit(e,n,t):void(r.q&&(r.q[e]||(r.q[e]=[ ]),r.q[e].push(n)))}var
r=e("ee").create( );n.exports=t,t.ee=r,r.q={ }},{ee:"QJf3ax"}],handle:[function(e,n){n.exports=
e("D5DuLP")},{ }],XL7HBI:[function(e,n){function t(e){var n=typeof
e;return!e||"object"!==n&&"function"!==n?-1:e===window?0:i(e,o,function( ){return
r++})}var
r=1,o="nr@id",i=e("gos");n.exports=t},{gos:"7eSDFh"}],id:[function(e,n){n.exports=e("
XL7HBI")},{ }],G9z0B1:[function(e,n){function t( ){var
e=d.info=NREUM.info,n=f.getElementsByTagName("script")[0];if(e&&e.licenseKey&
&e.applicationID&&n){c(p,function(n,t){n in e||(e[n],t)});var
t="https"===s.splite(":")[0]||e.ss1ForHttp;d.proto=t?"https://":"http://",a("mark",["onload",i
( )]);var
r=f.createElement("script");r.src=d.proto+e.agent,n.parentNode.insertBefore(r,n)}}function
r( ){"complete"===f.readyState&&o( )}function
o( ){a("mark",["domContent",i( )])}function i( ){return(new Date).getTime( )}var
a=e("handle"),c=e(1),u=window,f=u.document;e(2);var
s=(""+location).split("?")[0],p={beacon:"bam.nr-data.net",errorBeacon:"bam.nr-
data.net",agent:"js-agent.newrelic.com/nr-
686.min.js"},d=n.exports={offset:i( ),origin:s,features:{ }};f.addEventListener?(f.addEvent
Listener("DOMContentLoaded",o,!1),u.addEventListener("load",t,!1)):(f.attachEvent("on
readystatechange",r),u.attachEvent("onload",t)),a("mark",["firstbyte",i( )])},{1:12,2:3,
handle:"D5DuLP"}],loader:[function(e,n){n.exports=e("G9z0B1")},{ }],12:[function(e,n){function
t(e,n){var t=[ ],o="",i=0;for(o in e)r.call(e,o)&&(t[i],n(o,e[o]),i+=1);return t}var
r=Object.prototype.hasOwnProperty;n.exports=t},{ }],13:[function(e,n){function
t(e,n,t){n||(n=0),"undefined"==typeof t&&(t=e?e.length:0);for(var r=-1,o=t-
n||0,i=Array(0>o?0:o);++r<o;)i[r]=e[n+r];return
i}n.exports=t},{ }]},{ },["G9z0B1"]);</script>
  <title>Stamps</title>
  <link rel="stylesheet"
href="https://maxcdn.bootstrapcdn.com/bootstrap/3.2.0/css/bootstrap.min.css">
  <link href="/assets/admin-945a244c1e59ae308e1c9c1e8d2a9d59.css" media="all"
rel="stylesheet" type="text/css" />
  <script src="/assets/application-f9d3b1ff86b8934d89dfffbaa268d3a8.js"
type="text/javascript"></script>
  <meta content="authenticity_token" name="csrf-param" />
  <meta content="GYaPU9JFaDuKd/e911J2kDC+GqBYuGsB6bLmwSA+hwQ="
name="csrf-token" />
  <!-- Latest compiled and minified CSS -->
</head>
<body>
<header>
        <a href="/admin" id="logo"><img alt="Lettrs_logo" src="/assets/lettrs_logo-
9ee53cbbc27283a12b2e11ccaa1a278a.jpg" /></a>
        <div class="right_actions">
                  <a href="/users/sign_out" class="" data-method="delete"
rel="nofollow">Sign out</a>
              </div>
</header>
<div class="admin_nav">
  <a href="/admin/stamps" class="btn">Stamps</a>
  <a href="/admin/books" class="btn">Stamp Books</a>
  <a href="/admin/users" class="btn">Users</a>
  <a href="/admin/banners" class="btn">Home Banners</a>
  <a href="/admin/sponsors" class="btn">Sponsors</a>
  <a href="/admin/settings" class="btn">Settings</a>
</div>
<div class="clearfix"></div>
<div class="admin_content">
  <div class="stamp_edit">
  <h1>Editing stamp</h1>
   <form accept-charset="UTF-8" action="/admin/stamps/54eb9d00913cef1074000001"
class="edit_stamp" enctype="multipart/form-data"
id="edit_stamp_54eb9d00913cef1074000001" method="post"><div
style="margin:0;padding:0;display:inline"><input name="utf8" type="hidden"
value="✓" /><input name="_method" type="hidden" value="put" /><input
name="authenticity_token" type="hidden"
value="GYaPU9JFaDuKd/e911J2kDC+GqBYuGsB6bLmwSA+hwQ=" /></div>
<div class="field">
  <label for="stamp_name">Name</label><br />
  <input id="stamp_name" name="stamp[name]" size="30" type="text"
value="LETTRS CHALK " />
 </div>
 <div class="field">
  <label for="stamp_book_id">Book</label><br />
     <select id="stamp_book_id" name="stamp[book_id]"><option
```

-continued

```
value="5460f8adfc7c047ca6000001">HARRY POTTER</option>
<option value="5461028ffc7c04da0200000f">FOR GOOD CAUSES</option>
<option value="546b6bb66f7630e240000006">LITTLE WORLD</option>
<option value="546b68ea6f7630dded000002">HOLIDAYS</option>
<option value="544ea864072d62392a000001" selected="selected">LETTRS, THE
ORIGINALS</option>
<option value="5460d5deae3b013454000001">WORDS</option>
<option value="54bed224a4bfe0a70f000004">CAFFEINATED</option>
<option value="54c268f62d91cfd2c6000001">ASTROLOGY &
ZODIAC</option>
<option value="54c27a5c2d91cfd2c6000006">DISABLED GOING PLACES</option>
```

Figure 2:
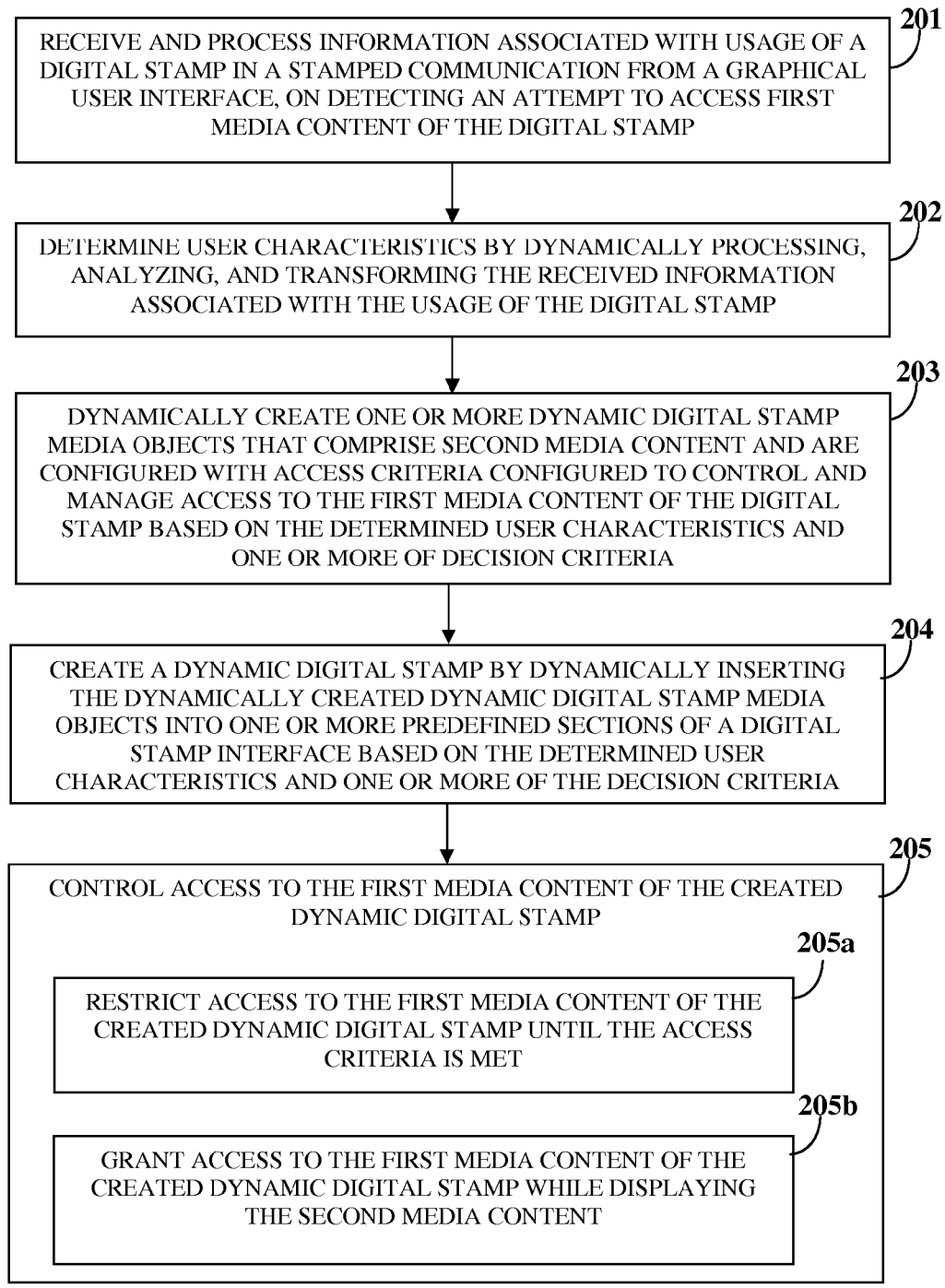
FIG. 2 exemplarily illustrates an embodiment of the computer implemented method for creating a dynamic digital stamp and controlling and managing access to media content of the created dynamic digital stamp.

FIG. 2 exemplarily illustrates an embodiment of the computer implemented method for creating a dynamic digital stamp and controlling and managing access to media content of the created dynamic digital stamp. In this embodiment, the computer implemented method disclosed herein controls grant of access to first media content. The first media content comprises, for example, digital media content contained in the digital stamp. In an embodiment, the mobile stamp creation and communication system (MSCCS) allows access to enterprises that are registered with the MSCCS to use the digital stamps for branding, commercial purposes, commerce related stamped communication, content management, etc. The MSCCS provides a mobile stamp content access management application (MSCAMA) to users such as business entities of the enterprises. The MSCAMA is executable by at least one processor configured to control access to media content hosted on the MSCCS. In an embodiment, the MSCAMA is configured as a mobile application downloadable on a user device that creates a network of digital stamps that can be used, for example, for commercial purposes, content management, identification, advertising purposes, etc. The MSCAMA allows users such as third party business entities to have access rights, levels, and/or controls to digital stamps, thereby configuring digital stamps as media content types. In an embodiment, the MSCCS allows the users to create, for example, a sponsored digital stamp via the graphical user interface (GUI) of the MSCCS. The sponsored digital stamp can be converted into a business brand. The MSCCS allows the users to select these branded digital stamps to be part of the stamped communication. These branded digital stamps are accessible, for example, based on logic, user profile, user behavior, user device information such as geolocation information, etc.

The mobile stamp creation and communication system (MSCCS) receives and processes 201 information associated with usage of a digital stamp used in a stamped communication from the graphical user interface (GUI) of the MSCCS, on detecting an attempt to access first media content of the digital stamp. The MSCCS detects use of digital stamps via media interactions and interaction of users with the GUI. The MSCCS determines 202 user characteristics by dynamically processing, analyzing, and transforming the received information associated with the usage of the digital stamp. The user characteristics comprise, for example, user information, user device information, user activity, user stamp usage history, user interests, user preferences, user profile information, etc. The MSCCS dynamically processes and analyzes the user characteristics based on the detection of user attempts to access the first media content of the digital stamp via the GUI of the MSCCS.

The mobile stamp creation and communication system (MSCCS) dynamically creates 203 one or more dynamic digital stamp media objects by processing and transforming the determined user characteristics and decision criteria. As used herein, "decision criteria" refer to parameters that define conditions for accessing media content. In an embodiment, the decision criteria comprise, for example, one or more of preset rules, preset user segments, preset media segments, preset segment optimization goals, etc., that are preset by a media content owner. Each dynamically created dynamic digital stamp media object comprises second media content. Furthermore, each dynamically created dynamic digital stamp media object is configured with access criteria configured to control and manage access to the first media content of the digital stamp based on the determined user characteristics and one or more of the decision criteria. The second media content comprises, for example, digital advertising content. The access criteria control the grant of access to the first media content. The access criteria are configured to control and manage the access to the first media content. The dynamic digital stamp media objects can be created, for example, from a user data element, content assets, a photo rendered as first media content, a digital stamp stored in a database of the MSCCS, etc.

The mobile stamp creation and communication system (MSCCS) creates 204 a dynamic digital stamp by dynamically inserting the dynamically created dynamic digital stamp media objects into one or more predefined sections of a digital stamp interface of the graphical user interface (GUI) based on the determined user characteristics and one or more of the decision criteria. The digital stamp interface is a section of the GUI, for example, a web page of a website, an online web interface, a downloadable mobile application interface, etc., configured to allow users to create and/or modify a dynamic digital stamp. The MSCCS controls 205 access to the first media content of the created dynamic digital stamp as follows: Each dynamically inserted dynamic digital stamp media object in the created dynamic digital stamp is configured to restrict 205a access to the first media content of the created dynamic digital stamp until the access criteria is met, or grant 205b access to the first media content of the created dynamic digital stamp while displaying the second media content.

The dynamically inserted dynamic digital stamp media object restricts access to the first media content that the user wants to consume on the graphical user interface (GUI) in such a way that the user must engage with the second media content or sponsored media content and satisfy an unlock condition in order to gain access to the first media content. The mobile stamp creation and communication system (MSCCS) locks the first media content contained in the digital stamp, renders the second media content on the GUI, and unlocks the first media content when the user satisfies the unlock condition. The unlock condition defines one or more tasks that the user must complete with the second media content to unlock the first media content. The tasks comprise, for example, viewing an advertisement, selecting and listening to audio content such as an audio clip, selecting and viewing video content such as a video clip, answering survey questions, sharing information with social media contacts, downloading the second media, liking an advertiser on a social networking platform through a like option, filling in a form, choosing to apply points or credits earned during prior media interactions with the digital stamp, etc., and any combination thereof.

Figure 3:
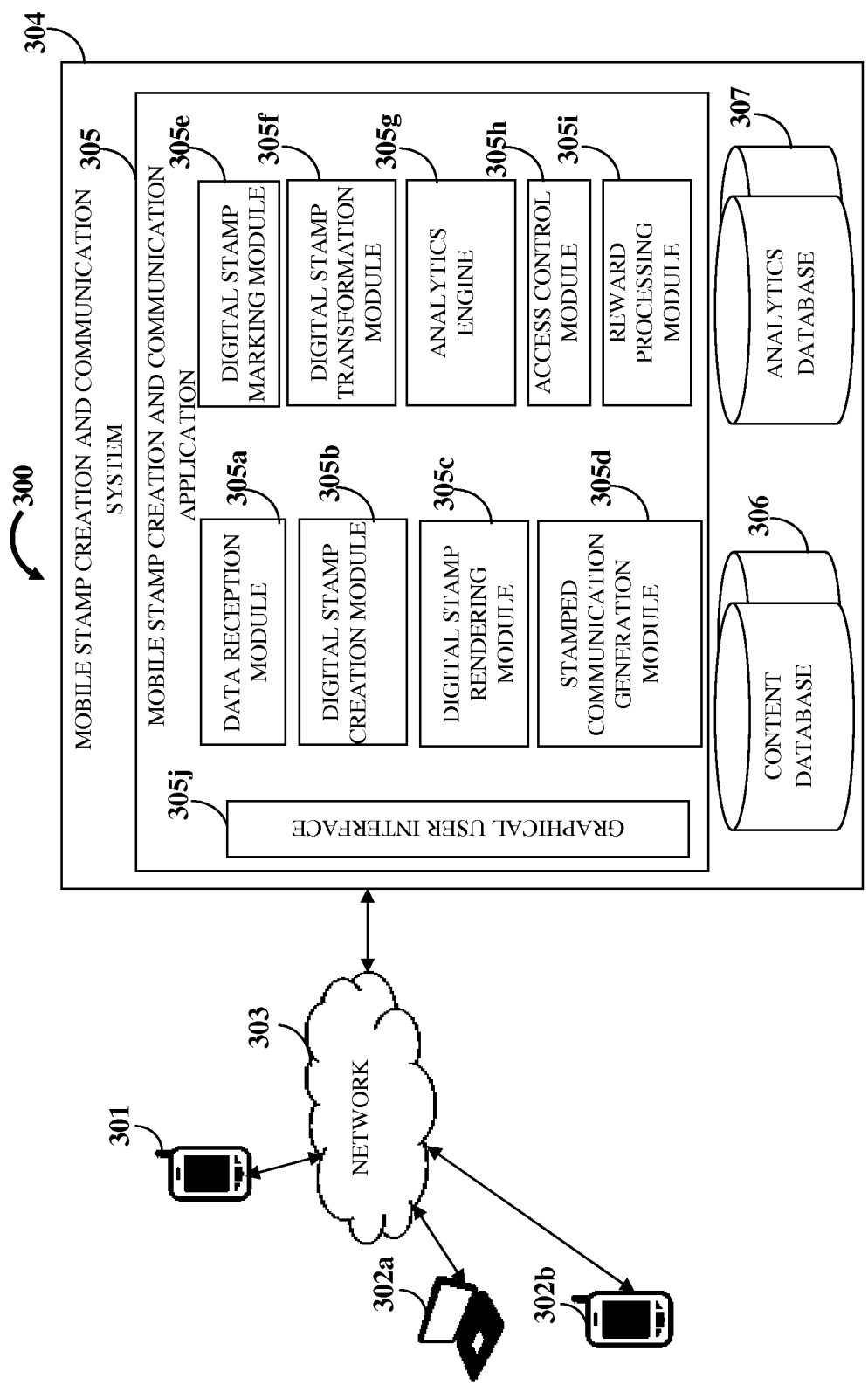
FIG. 3 exemplarily illustrates a computer implemented system for dynamically creating, rendering, and transforming a digital stamp for a stamped communication and media interactions.

FIG. 3 exemplarily illustrates a computer implemented system 300 for dynamically creating, rendering, and transforming a digital stamp for a stamped communication and media interactions. The computer implemented system 300 disclosed herein comprises the mobile stamp creation and communication system (MSCCS) 304 accessible by user devices, for example, a sender device 301 and one or more recipient devices 302a and 302b via a network 303. The MSCCS 304 is accessible to the sender device 301 and the recipient devices 302a and 302b, for example, through a broad spectrum of technologies and devices such as personal computers with access to the internet, internet enabled cellular phones, tablet computing devices, smart glasses, etc. The sender device 301 and the recipient devices 302a and 302b can be linear electronic devices or non-linear electronic devices, for example, personal computers, tablet computing devices, mobile computers, mobile phones, smart phones, portable computing devices, laptops, personal digital assistants, wearable devices such as the Google Glass of Google Inc., the Apple Watch of Apple Inc., etc., touch centric devices, workstations, client devices, portable electronic devices, network enabled computing devices, interactive network enabled communication devices, any other suitable computing equipment, combinations of multiple pieces of computing equipment, etc. In an embodiment, computing equipment is used to implement applications such as media playback applications, for example, iTunes® from Apple Inc., a web browser, a mapping application, an electronic mail (email) application, a calendar application, etc.

The network 303 for accessing the mobile stamp creation and communication system (MSCCS) 304 is, for example, the internet, an intranet, a wireless network, a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the mobile stamp creation and communication system (MSCCS) 304 is configured as a web based platform, for example, a website hosted on a server or a network of servers. In another embodiment, the MSCCS 304 comprises a mobile stamp creation and communication application (MSCCA) 305 which is a software application downloadable and usable on the sender device 301 and each of the recipient devices 302a and 302b. In another embodiment, the MSCCS 304 is implemented in a cloud computing environment and provides an open communication community service. As used herein, "cloud computing environment" refers to a processing environment comprising configurable computing physical and logical resources, for example, networks, servers, storage, applications, services, etc., and data distributed over the network 303, for example, the internet. The cloud computing environment provides on-demand network access to a shared pool of the configurable computing physical and logical resources. The MSCCS 304 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. In an embodiment, the MSCCS 304 is configured as a cloud computing based platform implemented as a service for dynamically creating, rendering, and transforming a digital stamp for a stamped communication and media interactions.

The mobile stamp creation and communication system (MSCCS) 304 disclosed herein comprises a non-transitory computer readable storage medium and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium is configured to store computer program instructions defined by modules, for example, 305a, 305b, 305c, 305d, 305e, 305f, 305g, 305h, 305i, etc., of the MSCCS 304. The processor is configured to execute the defined computer program instructions.

In an embodiment, the mobile stamp creation and communication application (MSCCA) 305 of the mobile stamp creation and communication system (MSCCS) 304 is configured and coded as a mobile application. The MSCCA 305 is developed to operate within mobile application marketplaces such as iTunes® of Apple Inc., Google Play™ of Google, Inc., etc. As exemplarily illustrated in FIG. 3, the MSCCA 305 comprises a graphical user interface (GUI) 305j. The GUI 305j is, for example, a webpage of a website hosted by the MSCCS 304, an online web interface, a web based downloadable application interface, a mobile based downloadable application interface, etc. A sender of the stamped communication or a recipient of the stamped communication can access the MSCCA 305 and the MSCCS 304 via the GUI 305j. The GUI 305j of the MSCCA 305 is interoperable with a web based version of the MSCCS 304. The MSCCA 305 comprises a data reception module 305a, a digital stamp creation module 305b, a digital stamp rendering module 305c, a stamped communication generation module 305d, a digital stamp marking module 305e, a digital stamp transformation module 305f, an analytics engine 305g, an access control module 305h, and a reward processing module 305i.

The data reception module 305a receives, processes, and transforms media content, data elements, and dynamic functional elements from one or more of multiple sources, for example, via the graphical user interface (GUI) 305j. In an embodiment, the GUI 305j is a touch enabled interface configured to receive, process, and transform media content, data elements, and dynamic functional elements from multiple sources through one or more input modes comprising, for example, a manual input mode and a device input mode. In an embodiment, the data reception module 305a stores the received media content and the data elements in one or more databases, for example, a content database 306 of the mobile stamp creation and communication system (MSCCS) 304 for current and subsequent creation, delivery and transformation of digital stamps and for current and subsequent generation and delivery of a stamped communication. The digital stamp creation module 305b creates multiple digital stamps by integrating the received, processed, and transformed media content, data elements, and dynamic functional elements. In an embodiment, the digital stamp creation module 305b determines a cost for each of created digital stamps based on predetermined pricing criteria as disclosed in the detailed description of FIG. 1. In another embodiment, the digital stamp creation module 305b determines an ordering sequence for rendering of the created digital stamps to the user devices, for example, 301, 302a, 302b, etc., based on predetermined ordering criteria as disclosed in the detailed description of FIG. 1.

The digital stamp rendering module 305c processes and renders the created digital stamps to a user device, for example, 301, 302a, or 302b via the graphical user interface (GUI) 305j provided by the mobile stamp creation and communication system (MSCCS) 304 based on one or more of the dynamic rendering criteria, for use in a stamped communication and/or media interactions as disclosed in the detailed description of FIG. 1. The digital stamp rendering module 305c tracks and processes a date and a timestamp of each of the processed and rendered digital stamps. The stamped communication generation module 305d generates a stamped communication with one or more of the processed and rendered digital stamps. The digital stamp marking module 305e marks one or more of the processed and rendered digital stamps in the generated stamped communication with a visual usage marker as disclosed in the detailed description of FIG. 1. The digital stamp transformation module 305f, in communication with the user device, for example, the recipient device 302a or 302b, processes and transforms the marked digital stamps in the generated stamped communication into dynamic content on the user device using one or more of the data elements and the dynamic functional elements imbedded in the marked digital stamps and one or more of the inherent elements of the user device, for example, the recipient device 302a or 302b, for performing one or more of multiple actions on the marked digital stamps and invoking media interactions for further creation and rendering of enhanced digital stamps. The access control module 305h configures access controls on the created digital stamps for controlling access to the media content of the marked digital stamps and for tracking and processing the media interactions with the marked digital stamps and activities associated with the marked digital stamps as disclosed in the detailed description of FIG. 2.

The analytics engine 305g determines user behavior associated with one or more of the processed and rendered digital stamps by processing, analyzing, and transforming the media interactions with the processed and rendered digital stamps in the generated stamped communication using one or more analytical inputs received via the graphical user interface (GUI) 305j and/or analytical tools. The analytics engine 305g also determines the dynamic functional elements for the creation and rendering of enhanced digital stamps by processing, analyzing, and transforming the media interactions with the processed and rendered digital stamps in the generated stamped communication using analytical inputs received via the GUI 305j and/or analytical tools. The determined user behavior, the dynamic functional elements, and data of the media interactions are stored in one or more databases, for example, an analytics database 307 of the mobile stamp creation and communication system (MSCCS) 304. The reward processing module 305i processes the media interactions performed on the processed and rendered digital stamps or the marked digital stamps via the GUI 305j and transforms the processed media interactions into rewards.

The content database 306 and the analytics database 307 of the mobile stamp creation and communication system (MSCCS) 304 can be any storage area or medium that can be used for storing data and files. The content database 306 and the analytics database 307 can be, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the content database 306 and the analytics database 307 can also be locations on a file system. In another embodiment, the content database 306 and the analytics database 307 can be remotely accessed by the MSCCS 304 via the network 303. In another embodiment, the content database 306 and the analytics database 307 are configured as cloud based databases implemented in a cloud computing environment, where computing resources are delivered as a service over the network 303.

In the computer implemented system 300 disclosed herein, the mobile stamp creation and communication system (MSCCS) 304 interfaces with the mobile stamp creation and communication application (MSCCA) 305 on user devices, for example, the sender device 301 and the recipient devices 302a and 302b, to create digital stamps, render the created digital stamps to multiple user devices, for example, the sender device 301 and the recipient devices 302a and 302b, generate a stamped communication, mark the digital stamps on the stamped communication with a visual usage marker, and transform the rendered digital stamps on multiple user devices, for example, the recipient devices 302a and 302b, and therefore uses more than one computing system. In the computer implemented system 300 disclosed herein, the MSCCS 304 interfaces with the MSCCA 305 on the user device, to implement the creation, rendering, transformation, and management of enhanced digital stamps, and therefore more than one specifically programmed computing system is used for implementing the creation, rendering, transformation, and management of enhanced digital stamps. The data inputted by the user, for example, selections of the digital stamps, the media interactions with the rendered digital stamps, etc., via the GUI 305j on the user device, for example, 301 to create, render, transform, and manage the digital stamps, is transformed, processed and executed by an algorithm in the MSCCS 304 for transmission to another user device, for example, 302a or 302b, over the network 303.

Figure 4:
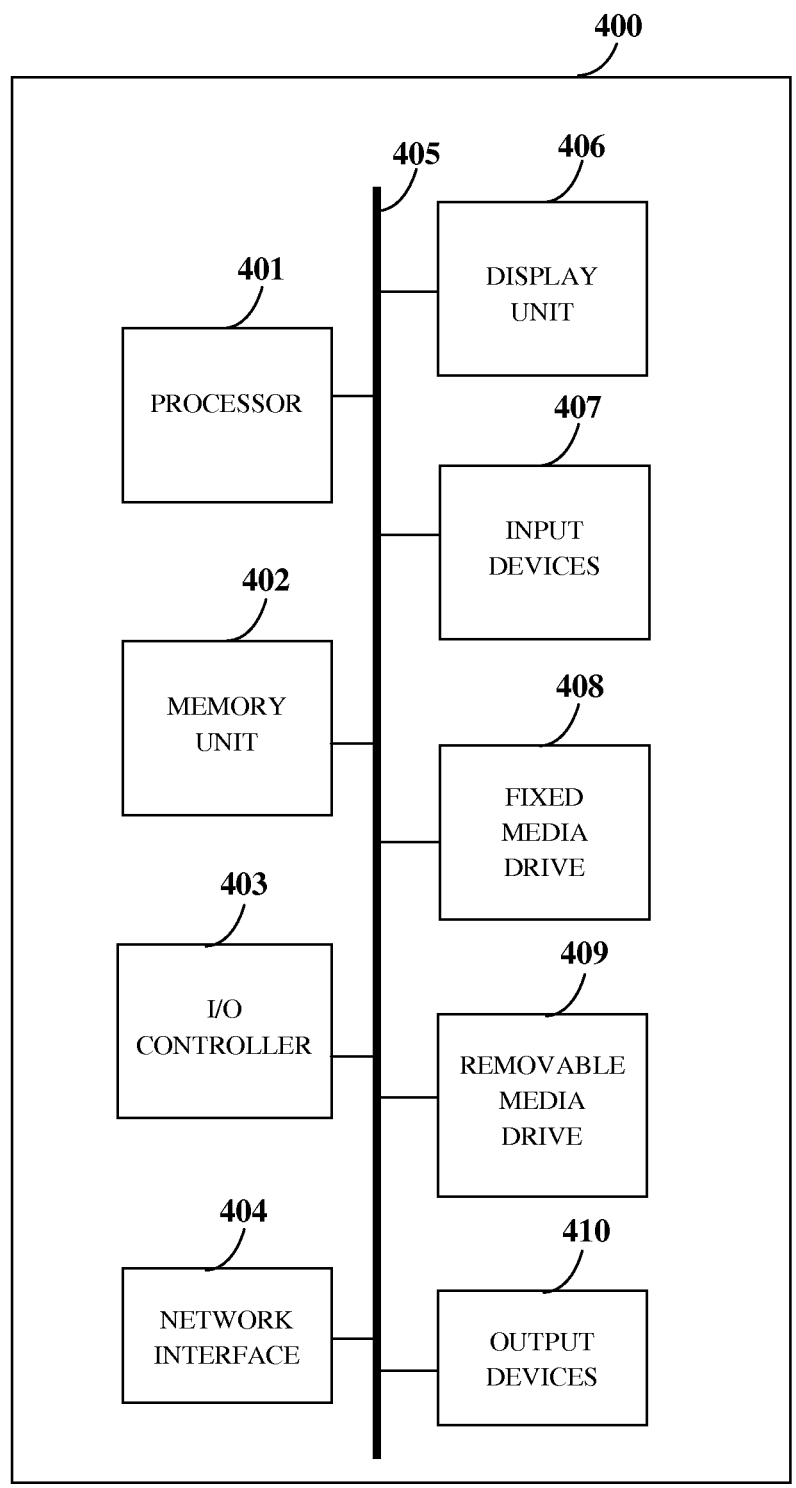
FIG. 4 exemplarily illustrates the hardware architecture of a mobile stamp creation and communication system employed for dynamically creating, rendering, and transforming a digital stamp for a stamped communication and media interactions.

FIG. 4 exemplarily illustrates the hardware architecture 400 of the mobile stamp creation and communication system (MSCCS) 304 exemplarily illustrated in FIG. 3, for dynamically creating, rendering, and transforming a digital stamp for a stamped communication and media interactions. The MSCCS 304 is a computer system that is programmable using a high level computer programming language. In an embodiment, the MSCCS 304 is implemented using programmed and purposeful hardware. The MSCCS 304 communicates with a sender device 301, recipient devices 302a and 302b, etc., registered with the MSCCS 304 via the network 303 exemplarily illustrated in FIG. 3, for example, a short range network or a long range network.

As exemplarily illustrated in FIG. 4, the hardware architecture 400 of the mobile stamp creation and communication system (MSCCS) 304 comprises a processor 401, a non-transitory computer readable storage medium such as a memory unit 402 for storing programs and data, an input/output (I/O) controller 403, a network interface 404, a data bus 405, a display unit 406, input devices 407, a fixed media drive 408 such as a hard drive, a removable media drive 409 for receiving removable media, output devices 410, etc. The processor 401 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. In an embodiment, the processor 401 is implemented as a processor set comprising, for example, a programmed microprocessor and a math or graphics co-processor. The processor 401 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The MSCCS 304 disclosed herein is not limited to employing a processor 401. In an embodiment, the MSCCS 304 employs a controller or a microcontroller. The processor 401 executes the modules, for example, 305a, 305b, 305c, 305d, 305e, 305f, 305g, 305h, 305i, etc., of the MSCCS 304.

The memory unit 402 is used for storing programs, applications, and data. For example, the data reception module 305a, the digital stamp creation module 305b, the digital stamp rendering module 305c, the stamped communication generation module 305d, the digital stamp marking module 305e, the digital stamp transformation module 305f, the analytics engine 305g, the access control module 305h, the reward processing module 305i, etc., of the mobile stamp creation and communication system (MSCCS) 304 are stored in the memory unit 402 of the MSCCS 304. The memory unit 402 is, for example, a random access memory (RAM) or another type of dynamic storage device that stores information and instructions for execution by the processor 401. The memory unit 402 also stores temporary variables and other intermediate information used during execution of the instructions by the processor 401. The MSCCS 304 further comprises a read only memory (ROM) or another type of static storage device that stores static information and instructions for the processor 401. The I/O controller 403 controls input actions and output actions performed by the MSCCS 304.

The network interface 404 enables connection of the mobile stamp creation and communication system (MSCCS) 304 to the network 303. In an embodiment, the network interface 404 is provided as an interface card also referred to as a line card. The network interface 404 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 405 permits communications between the modules, for example, 305a, 305b, 305c, 305d, 305e, 305f, 305g, 305h, 305i, 305j, 306, 307, etc., of the MSCCS 304.

The display unit 406, via the graphical user interface (GUI) 305j, displays information, display interfaces, user interface elements such as text fields, checkboxes, text boxes, windows, etc., for example, for displaying digital stamps configured as mobile stamps to a user, on a user device based on geolocation information of the user device, for displaying a timer counter counting time spent by the user in composing a personalized communication, etc. The display unit 406 comprises, for example, a liquid crystal display, a plasma display, an organic light emitting diode (OLED) based display, etc. The input devices 407 are used for inputting data into the mobile stamp creation and communication system (MSCCS) 304. An administrator of the MSCCS 304 uses the input devices 407 to provide inputs to the MSCCS 304. For example, the administrator can configure initial settings for parameters such as ink color, font color, etc., for a specific theme for the personalized communication using the input devices 407. In another example, the administrator can manage books of digital stamps, sponsors for the digital stamps, edit the digital stamps, etc., using the input devices 407. The input devices 407 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the mobile stamp creation and communication system (MSCCS) 304. The programs are loaded onto the fixed media drive 408 and into the memory unit 402 of the MSCCS 304 via the removable media drive 409. In an embodiment, the computer applications and programs may be loaded directly via the network 303. Computer applications and programs are executed by double clicking a related icon displayed on the display unit 406 using one of the input devices 407. The output devices 410 output the results of operations performed by the MSCCS 304. For example, the MSCCS 304 provides the rendered digital stamps, the analytics results, etc., to an administrator of the MSCCS 304 using the output devices 410. The MSCCS 304 displays the created digital stamps, the generated stamped communication, etc., using the output devices 410.

The processor 401 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The mobile stamp creation and communication system (MSCCS) 304 employs the operating system for performing multiple tasks. The operating system is responsible for management and coordination of activities and sharing of resources of the MSCCS 304. The operating system further manages security of the MSCCS 304, peripheral devices connected to the MSCCS 304, and network connections. The operating system employed on the MSCCS 304 recognizes, for example, inputs provided by administrators of the MSCCS 304 using one of the input devices 407, the output display, files, and directories stored locally on the fixed media drive 408. The operating system on the MSCCS 304 executes different programs using the processor 401. The processor 401 and the operating system together define a computer platform for which application programs in high level programming languages are written.

The processor 401 of the mobile stamp creation and communication system (MSCCS) 304 retrieves instructions defined by the data reception module 305a, the digital stamp creation module 305b, the digital stamp rendering module 305c, the stamped communication generation module 305d, the digital stamp marking module 305e, the digital stamp transformation module 305f, the analytics engine 305g, the access control module 305h, the reward processing module 305i, etc., of the MSCCS 304 for performing respective functions disclosed in the detailed description of FIG. 3. The processor 401 retrieves instructions for executing the modules, for example, 305a, 305b, 305c, 305d, 305e, 305f, 305g, 305h, 305i, etc., of the MSCCS 304 from the memory unit 402. A program counter determines the location of the instructions in the memory unit 402. The program counter stores a number that identifies the current position in the program of each of the modules, for example, 305a, 305b, 305c, 305d, 305e, 305f, 305g, 305h, 305i, etc., of the MSCCS 304. The instructions fetched by the processor 401 from the memory unit 402 after being processed are decoded. The instructions are stored in an instruction register in the processor 401. After processing and decoding, the processor 401 executes the instructions, thereby performing one or more processes defined by those instructions.

At the time of execution, the instructions stored in the instruction register are examined to determine the operations to be performed. The processor 401 then performs the specified operations. The operations comprise arithmetic operations and logic operations. The operating system performs multiple routines for performing a number of tasks required to assign the input devices 407, the output devices 410, and memory for execution of the modules, for example, 305a, 305b, 305c, 305d, 305e, 305f, 305g, 305h, 305i, etc., of the mobile stamp creation and communication system (MSCCS) 304. The tasks performed by the operating system comprise, for example, assigning memory to the modules, for example, 305a, 305b, 305c, 305d, 305e, 305f, 305g, 305h, 305g, 305h, 305i, etc., of the MSCCS 304, and to data used by the MSCCS 304, moving data between the memory unit 402 and disk units, and handling input/output operations. The operating system performs the tasks on request by the operations and after performing the tasks, the operating system transfers the execution control back to the processor 401. The processor 401 continues the execution to obtain one or more outputs. The outputs of the execution of the modules, for example, 305a, 305b, 305c, 305d, 305e, 305f, 305g, 305h, 305i, etc., of the MSCCS 304 are displayed, for example, to the administrator of the MSCCS 304 on the display unit 406.

For purposes of illustration, the detailed description refers to the mobile stamp creation and communication system (MSCCS) 304 being run locally as a single computer system; however the scope of the computer implemented method and system 300 disclosed herein is not limited to the MSCCS 304 being run locally on the computer system via the operating system and the processor 401, but may be extended to run remotely over the network 303 by employing a web browser and a remote server, a mobile phone, or other electronic devices. In an embodiment, one or more portions of the MSCCS 304 are distributed across one or more computer systems (not shown) coupled to the network 303.

Disclosed herein is also a computer program product comprising a non-transitory computer readable storage medium that stores computer program codes comprising instructions executable by at least one processor 401 for dynamically creating, rendering, and transforming a digital stamp for a stamped communication and media interactions. The computer program product disclosed herein comprises a first computer program code for receiving, processing, and transforming media content, data elements, and dynamic functional elements from one or more of multiple sources; a second computer program code for creating multiple digital stamps by integrating the received, processed, and transformed media content, data elements, and dynamic functional elements; a third computer program code for processing and rendering the created digital stamps to a user device via the graphical user interface (GUI) 305j provided based on one or more of the dynamic rendering criteria, for use in the stamped communication and/or media interactions; a fourth computer program code for generating a stamped communication with one or more of the processed and rendered digital stamps; a fifth computer program code for marking one or more of the processed and rendered digital stamps in the generated stamped communication with a visual usage marker configured to indicate use of the processed and rendered digital stamps in the generated stamped communication; and a sixth computer program code, in communication with the user device, for processing and transforming the marked digital stamps in the generated stamped communication into dynamic content on the user device using one or more of the data elements and the dynamic functional elements imbedded in the marked digital stamps and one or more of multiple inherent elements of the user device, for performing one or more of multiple actions on the marked digital stamps and invoking media interactions for further creation and rendering of enhanced digital stamps.

The computer program product disclosed herein further comprises a seventh computer program code for determining user behavior associated with one or more of the processed and rendered digital stamps by processing, analyzing, and transforming the media interactions with one or more of the processed and rendered digital stamps in the generated stamped communication using analytical inputs received via the graphical user interface (GUI) 305j and/or analytical tools; and an eighth computer program code for determining the dynamic functional elements for creating and rendering enhanced digital stamps by processing, analyzing, and transforming the media interactions with one or more of the processed and rendered digital stamps in the generated stamped communication using analytical inputs received via the GUI 305j and/or analytical tools.

The computer program product disclosed herein further comprises one or more additional computer program codes for performing additional steps that may be required and contemplated for dynamically creating, rendering, and transforming a digital stamp for a stamped communication and media interactions. In an embodiment, a single piece of computer program code comprising computer executable instructions performs one or more steps of the computer implemented method disclosed herein for dynamically creating, rendering, and transforming a digital stamp for a stamped communication and media interactions. The computer program codes comprising computer executable instructions are embodied on the non-transitory computer readable storage medium. The processor 401 of the mobile stamp creation and communication system 304 retrieves these computer executable instructions and executes them. When the computer executable instructions are executed by the processor 401, the computer executable instructions cause the processor 401 to perform the steps of the computer implemented method for dynamically creating, rendering, and transforming a digital stamp for a stamped communication and media interactions.

FIGS. 5A-5H exemplarily illustrate screenshots of a graphical user interface (GUI) 305j provided by the mobile stamp creation and communication system (MSCCS) 304 exemplarily illustrated in FIG. 3, on a user device, for dynamically creating, rendering, and transforming a digital stamp for a personalized stamped communication. FIGS. 5A-5H illustrate personalization features provided by the MSCCS 304 to allow a user to compose a personalized communication. A user downloads the mobile stamp creation and communication application (MSCCA) 305 on the user device, for example, a mobile device such as a smart phone and invokes the MSCCA 305 on the user device. In an embodiment, the MSCCA 305 communicates with the MSCCS 304 via the network 303 exemplarily illustrated in FIG. 3, to perform the functions disclosed below.

Figure 5A:
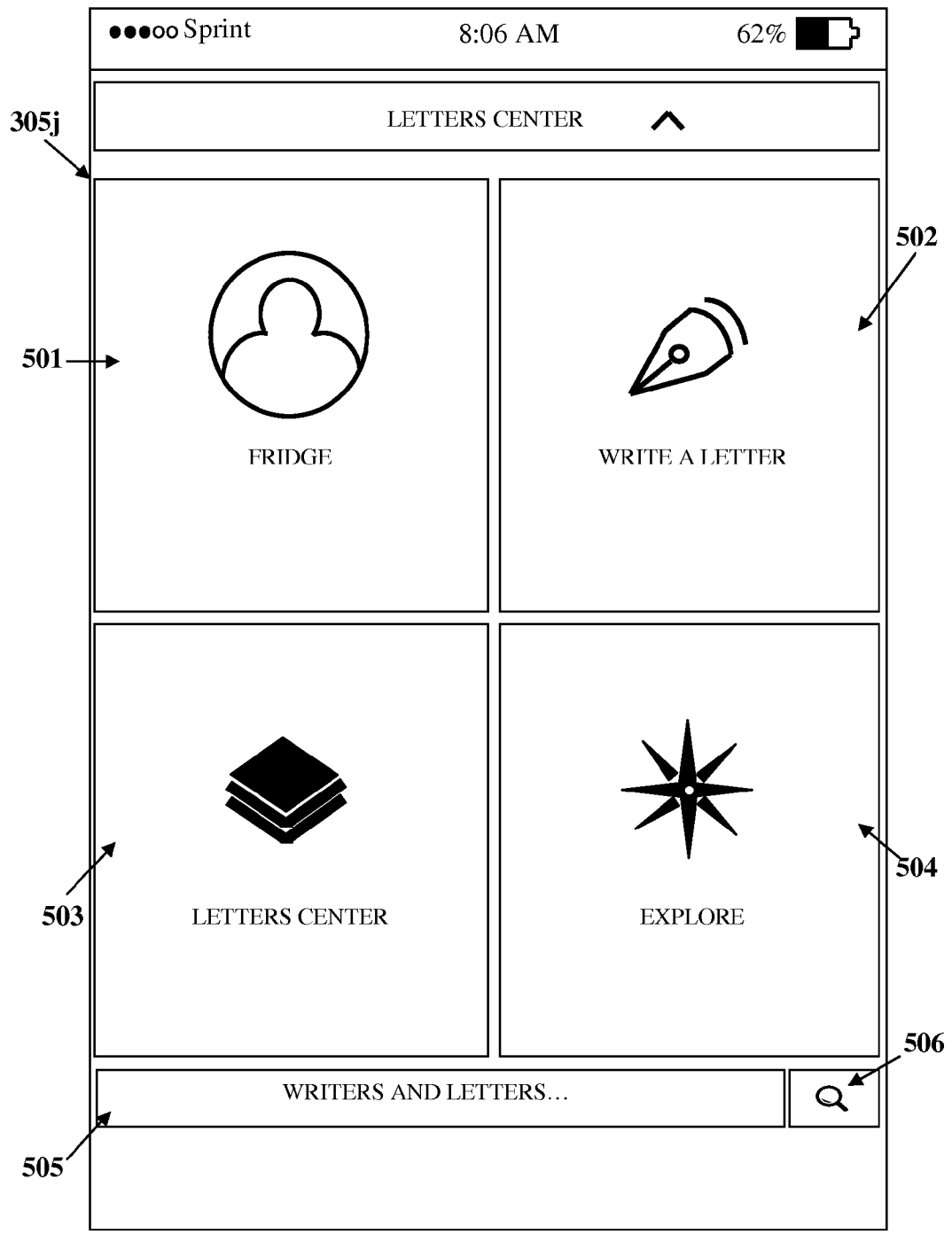
FIG. 5A exemplarily illustrates a screenshot of a graphical user interface provided by the mobile stamp creation and communication system on a user device, showing a home screen of the mobile stamp creation and communication system.

FIG. 5A exemplarily illustrates a screenshot of the graphical user interface (GUI) 305j provided by the mobile stamp creation and communication system (MSCCS) 304 exemplarily illustrated in FIG. 3, on the user device, showing a home screen of the MSCCS 304. When a user invokes the mobile stamp creation and communication application (MSCCA) 305 exemplarily illustrated in FIG. 3, on the user device, the home screen on the GUI 305j displays multiple options for viewing and selection by the user. Consider an example of a user, for example, John from Connecticut using the MSCCA 305 on his user device. When John invokes the MSCCA 305 on the user device, the MSCCA 305 renders a home screen with multiple interface elements on the GUI 305j on the user device. As used herein, "interface elements" refer to software implemented input objects, for example, switches or buttons such as touch buttons or tactile buttons, touch pads, etc., provided on the user device, window interfaces, text containers and graphics such as list boxes, check boxes, icons, screen icon type touch buttons, chat interfaces, hyperlinks, etc., provided on the GUI 305j, that are capable of receiving an input from a user or capturing an application of pressure from the user. The interface elements configured on the home screen are, for example, in the form of icons such as a "Fridge" icon 501, a "Write a Letter" icon 502, a "Letters Center" icon 503, and an "Explore" icon 504 as exemplarily illustrated in FIG. 5A. The MSCCS 304 performs specific operations when the user clicks on each of these icons 501, 502, 503, and 504 as disclosed below. The MSCCA 305, in communication with the MSCCS 304, renders a search interface section 505, for example, towards the lower end of the home screen. When John clicks on the search interface section 505, the MSCCA 305 allows John to enter a search query containing details of a particular writer or personalized communication, for example, a personalized letter for which he wishes to search in the MSCCS 304. When John clicks on a search icon 506 on the home screen, the MSCCA 305, in communication with the MSCCS 304, displays a list of search results based on the search query.

Figure 5B:
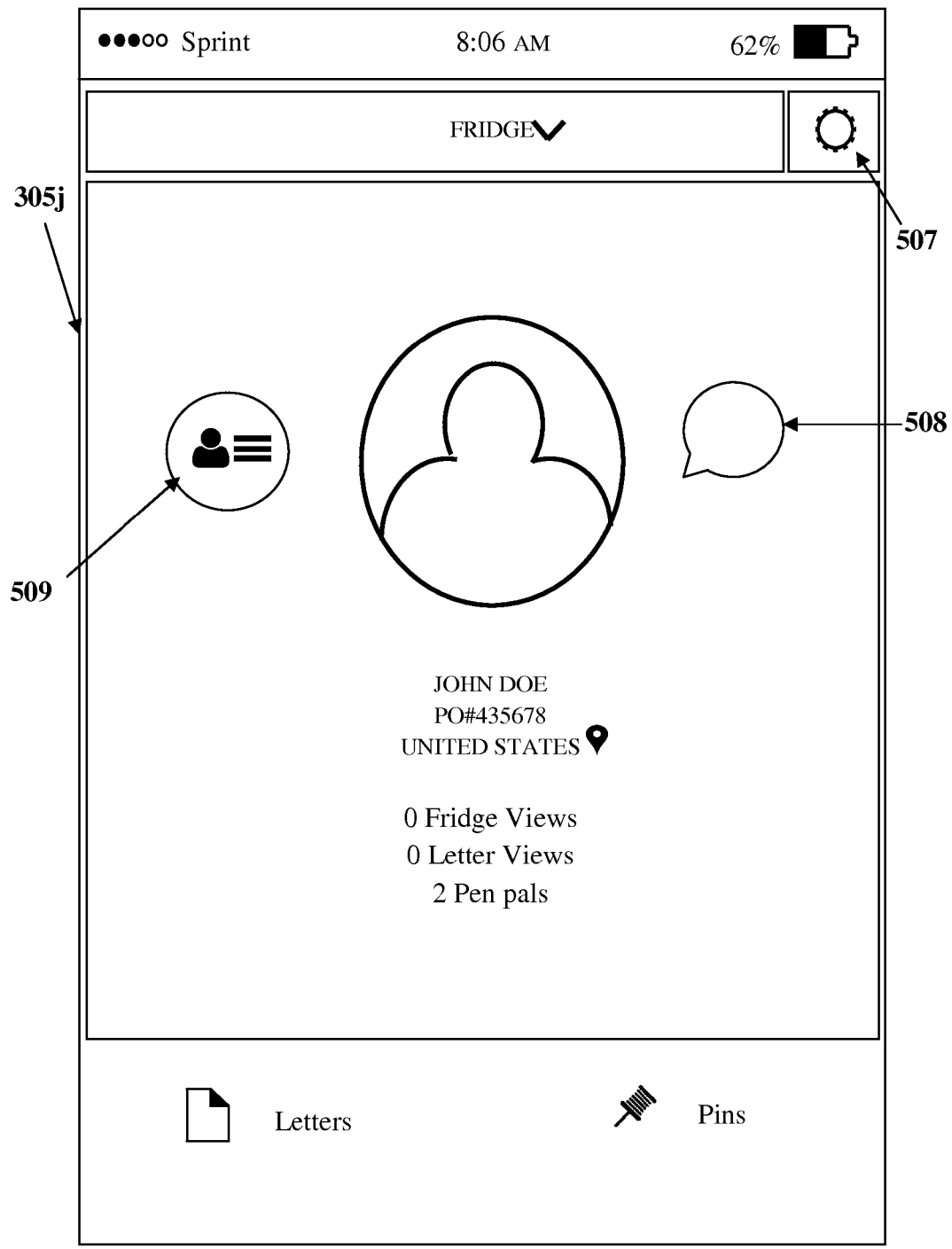
FIG. 5B exemplarily illustrates a screenshot of a profile interface section provided on a graphical user interface of the mobile stamp creation and communication system.

FIG. 5B exemplarily illustrates a screenshot of a profile interface section provided on the graphical user interface (GUI) 305j of the mobile stamp creation and communication system (MSCCS) 304. When a user, for example, John clicks on the "Fridge" icon 501 exemplarily illustrated in FIG. 5A, the mobile stamp creation and communication application (MSCCA) 305 renders the profile interface section with multiple interface elements, for example, a settings button 507, a notification icon 508, and a pen pal icon 509 as exemplarily illustrated in FIG. 5B. On the profile interface section, the MSCCA 305 provides options, for example, to manage settings of his profile, change his password, view notifications, view a list of pen pals, view the number of fridge views, view the number of letter views, etc., on the profile interface section to John. When John clicks on the settings button 507 positioned, for example, at a top right corner of the profile interface section, the MSCCA 305 provides options to allow John to change his existing password, manage his notifications, connect to various social networking platforms, and log out from an active session of the MSCCA 305. When John clicks on the notification icon 508, the MSCCA 305 displays recent activities performed by John through his profile. When John clicks on the pen pal icon 509 positioned, for example, towards the left of the notification icon 508 on the profile interface section, the MSCCA 305 displays a list of pen pals or users who have added John as a pen pal. John can then proceed to view a profile interface section represented as a "fridge" of a pen pal of his choice by clicking on the name of the pen pal.

Figure 5C:
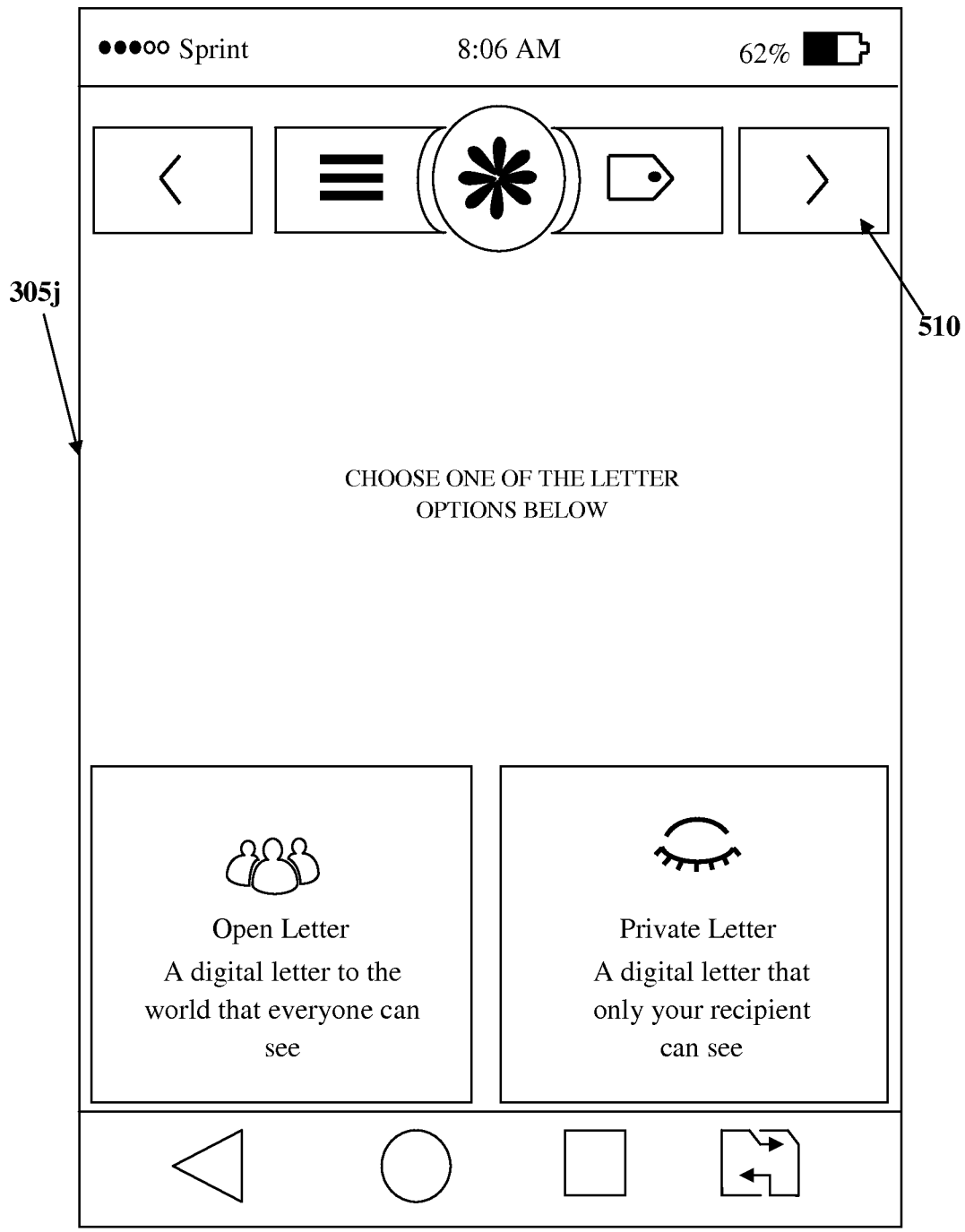
FIGS. 5C-5E exemplarily illustrate screenshots of a graphical user interface provided by the mobile stamp creation and communication system on the user device for composing a personalized communication.
Figure 5D:
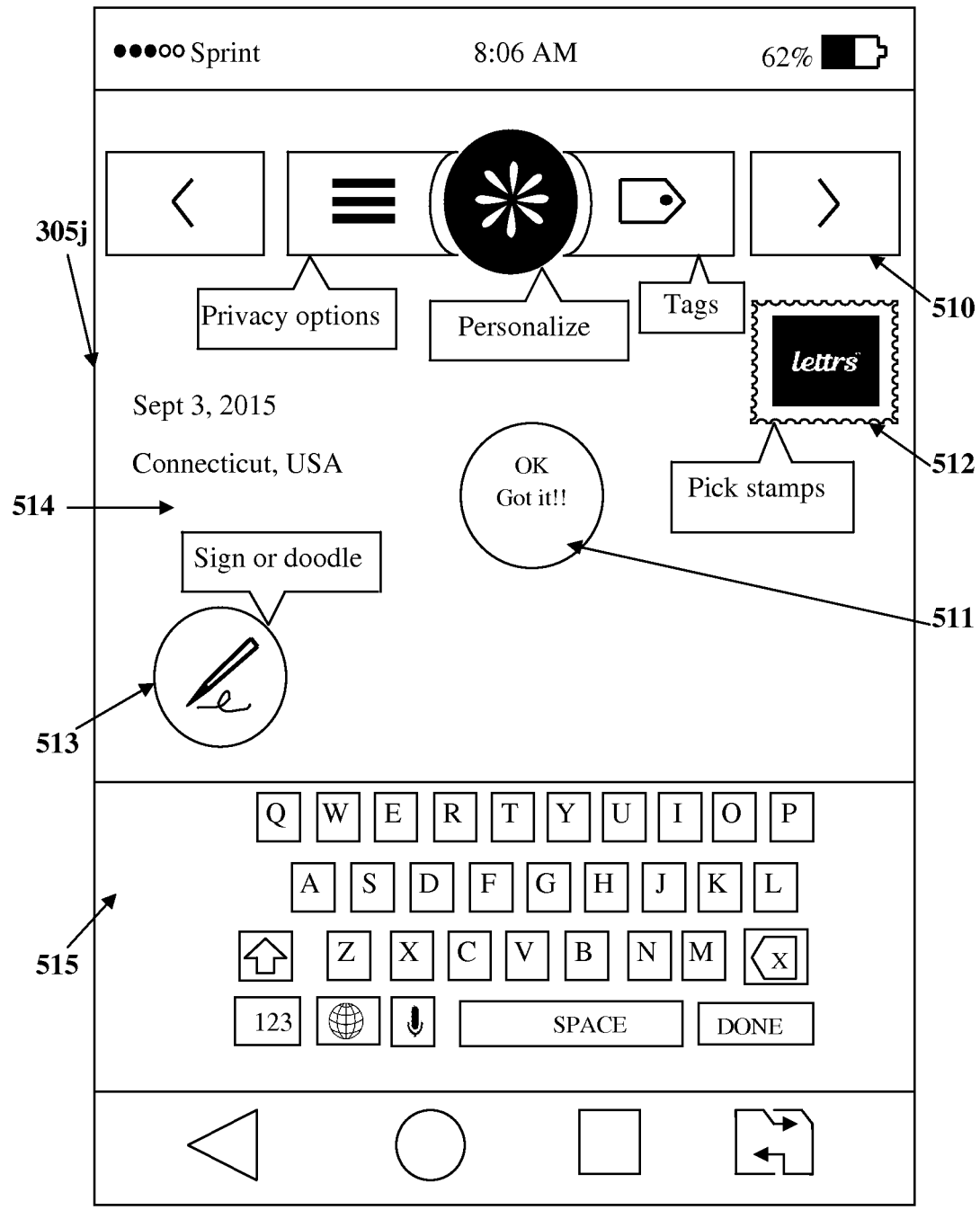
Figure 5E:
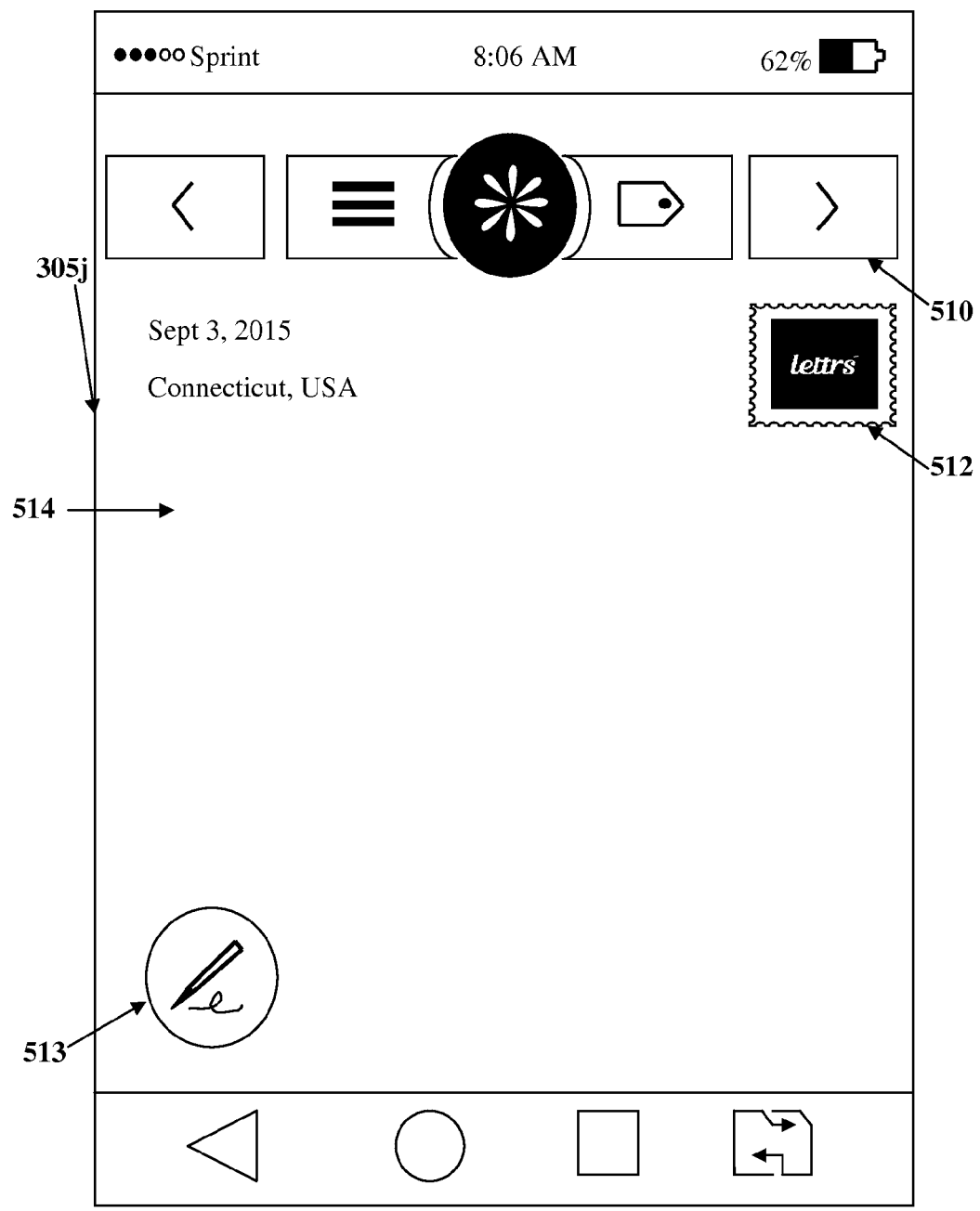

FIGS. 5C-5E exemplarily illustrate screenshots of the graphical user interface (GUI) 305j provided by the mobile stamp creation and communication system (MSCCS) 304 exemplarily illustrated in FIG. 3, on the user device for composing a personalized communication. When the user, John, clicks on the "Write a Letter" icon 502 on the home screen exemplarily illustrated in FIG. 5A, the mobile stamp creation and communication application (MSCCA) 305 renders options to compose a personalized communication, for example, to compose a public open letter or to compose a private letter as exemplarily illustrated in FIG. 5C. An "open letter" refers to a personalized communication that is public or that can be viewed by any user of the MSCCS 304. A "private letter" refers to a personalized communication that is meant for private viewing by a user selected by a sender, for example, John, and not by any user of the MSCCS 304. When John chooses one of the two options provided by the MSCCS 304, he clicks on a "forward" icon 510 positioned, for example, at the top right corner of the GUI 305j as exemplarily illustrated in FIG. 5C.

When John clicks on the "forward" icon 510 on the GUI 305j, the mobile stamp creation and communication application (MSCCA) 305 renders notifications to explain functions of each icon displayed on the GUI 305j as exemplarily illustrated in FIG. 5D. The MSCCA 305 renders a write interface section 514, a digital stamp icon 512, a personal signature icon 513, and a keyboard interface 515 for composing the personalized communication as exemplarily illustrated in FIG. 5D. John may erase these notification by clicking on an "OK, Got it!!" icon 511 positioned on the GUI 305j. When John clicks on the "OK, Got it!!!" icon 511, the MSCCA 305 renders the GUI 305j exemplarily illustrated in FIG. 5E. At the beginning of any personalized stamped communication, the MSCCA 305 displays the user's location obtained from the user device or entered by the user, for example, John at the time of creating a profile with the mobile stamp creation and communication system (MSCCS) 304. When John clicks the write interface section 514 on the GUI 305j, the MSCCA 305 invokes the keyboard interface 515 to allow John to compose the personalized communication. John types in content for the personalized communication by using the keyboard interface 515. After typing in the content for the personalized communication, John clicks on the digital stamp icon 512 to select a digital stamp from a collection of digital stamps of different categories rendered by the MSCCS 304 based on dynamic rendering criteria as disclosed in the detailed description of FIGS. 6A-6E. John may then click on the personal signature icon 513 displayed on the GUI 305j and enter his personal signature as a mobile signature or a social signature via an edit window. When the sender creates the personal signature, the MSCCA 305 enables the sender to accept and save the personal signature, discard the changes made to the personal signature, or cancel the personal signature in the edit window. After John completes the personalized communication, selects a digital stamp of his choice, and adds his personal signature, he clicks on a "forward" icon 510 on the GUI 305j.

Figure 5F:
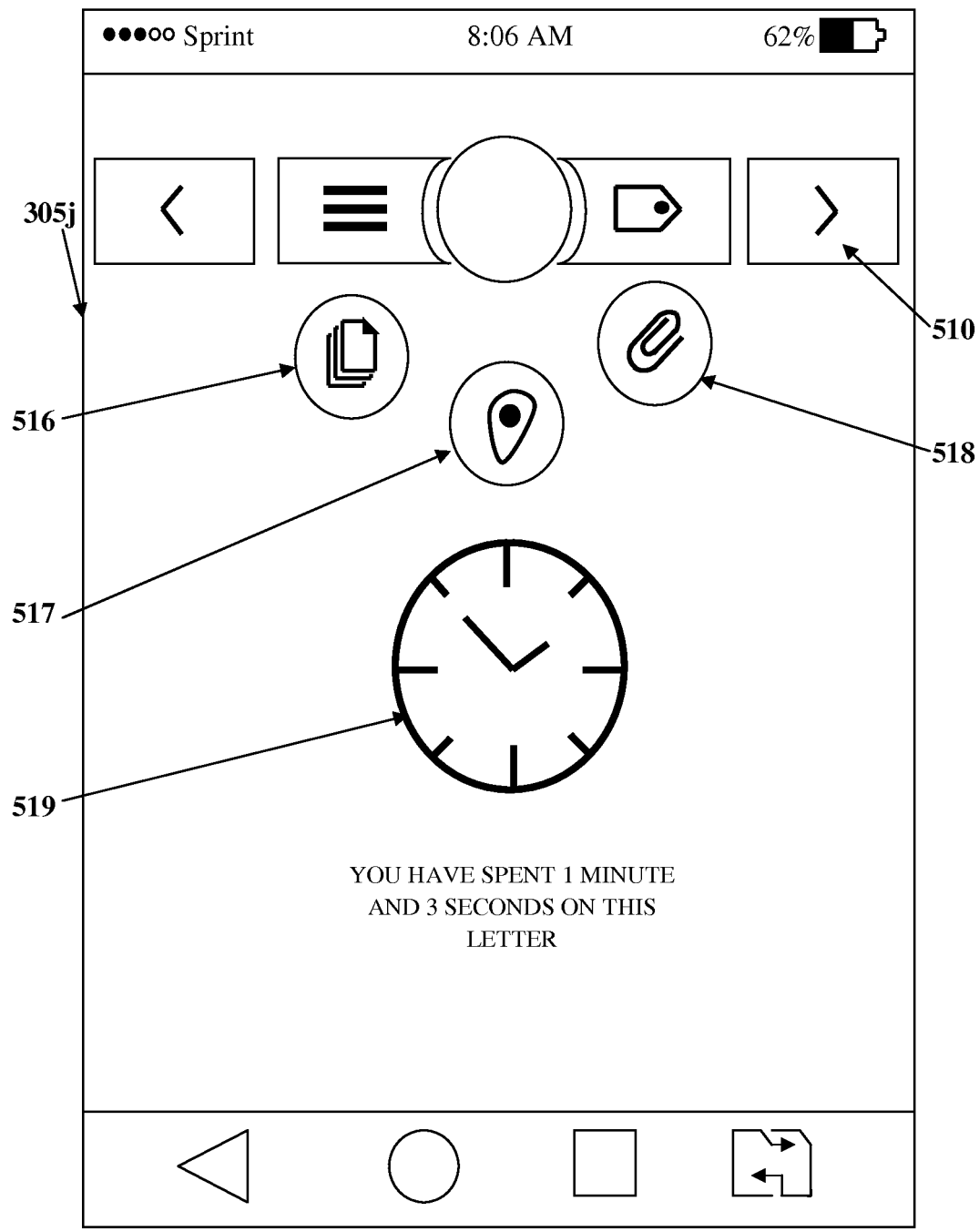
FIG. 5F exemplarily illustrates a screenshot of a graphical user interface provided by the mobile stamp creation and communication system on the user device, showing amount of time spent on composing a personalized communication.

FIG. 5F exemplarily illustrates a screenshot of a graphical user interface (GUI) 305j provided by the mobile stamp creation and communication system (MSCCS) 304 exemplarily illustrated in FIG. 3, on the user device, showing amount of time spent on composing a personalized communication. When John clicks on the "forward" icon 510 exemplarily illustrated in FIG. 5E, the mobile stamp creation and communication application (MSCCA) 305 renders an interface with a theme icon 516, a location icon 517, an attachment icon 518, and a time icon 519 as exemplarily illustrated in FIG. 5F. When John clicks on the theme icon 516, the MSCCA 305 renders a selection of themes to John as exemplarily illustrated in FIGS. 5G-5H. The different themes provided by the MSCCS 304 vary, for example, according to the colors of the background, a design of the background, font styles, etc. These themes allow a user to customize and decorate the personalized communication.

After selecting a theme that suits his personalized stamped communication, John may click on the "location" icon 517. When John clicks on the location icon 517, the mobile stamp creation and communication application (MSCCA) 305 displays John's location, for example, Connecticut, for example, at the beginning of every personalized communication initiated by John. If John does not wish to disclose the location from where he is sending the personalized communication, he can do so by clicking the location icon 517 for a second time. When John clicks the location icon 517 for the second time, the MSCCA 305 deletes the location from the personalized communication. When John clicks on the attachment icon 518, the MSCCA 305 renders a selection of media content, for example, photos from the content database 306 of the mobile stamp creation and communication system (MSCCS) 304 exemplarily illustrated in FIG. 3, photos taken by John from his smartphone, videos taken by John, etc. When John selects a photo that he wishes to attach to the personalized communication, the MSCCA 305 attaches the selected photo to the personalized communication. The MSCCA 305 also calculates and displays the amount of time spent by John on composing the personalized communication. When John clicks on the time icon 519, the MSCCA 305 provides details of the time spent by John on the personalized communication. In an embodiment, the MSCCA 305, in communication with the MSCCS 304, only sends the personalized communication to a recipient if the sender, for example, John spends a predefined period of time, for example, at least one minute to complete the personalized communication. When the personalized communication is complete, John clicks on the "forward" icon 510 and the MSCCS 304 renders options to send the personalized communication to the recipient, for example, Jane as exemplarily illustrated in FIG. 6K.

Figure 5G:
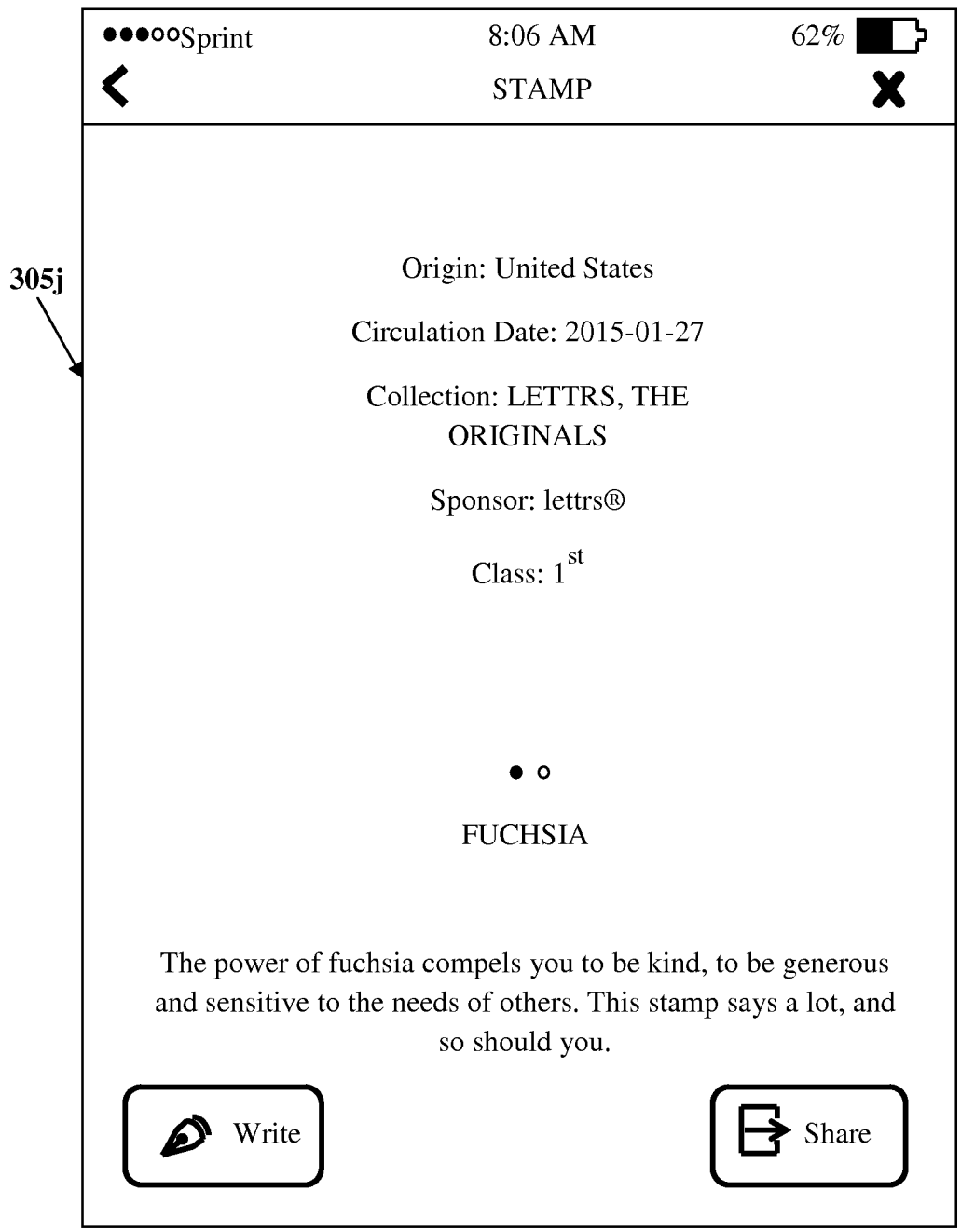
FIGS. 5G-5H exemplarily illustrate screenshots of a graphical user interface provided by the mobile stamp creation and communication system on the user device, showing a selection of themes for use in a personalized communication.
Figure 5H:
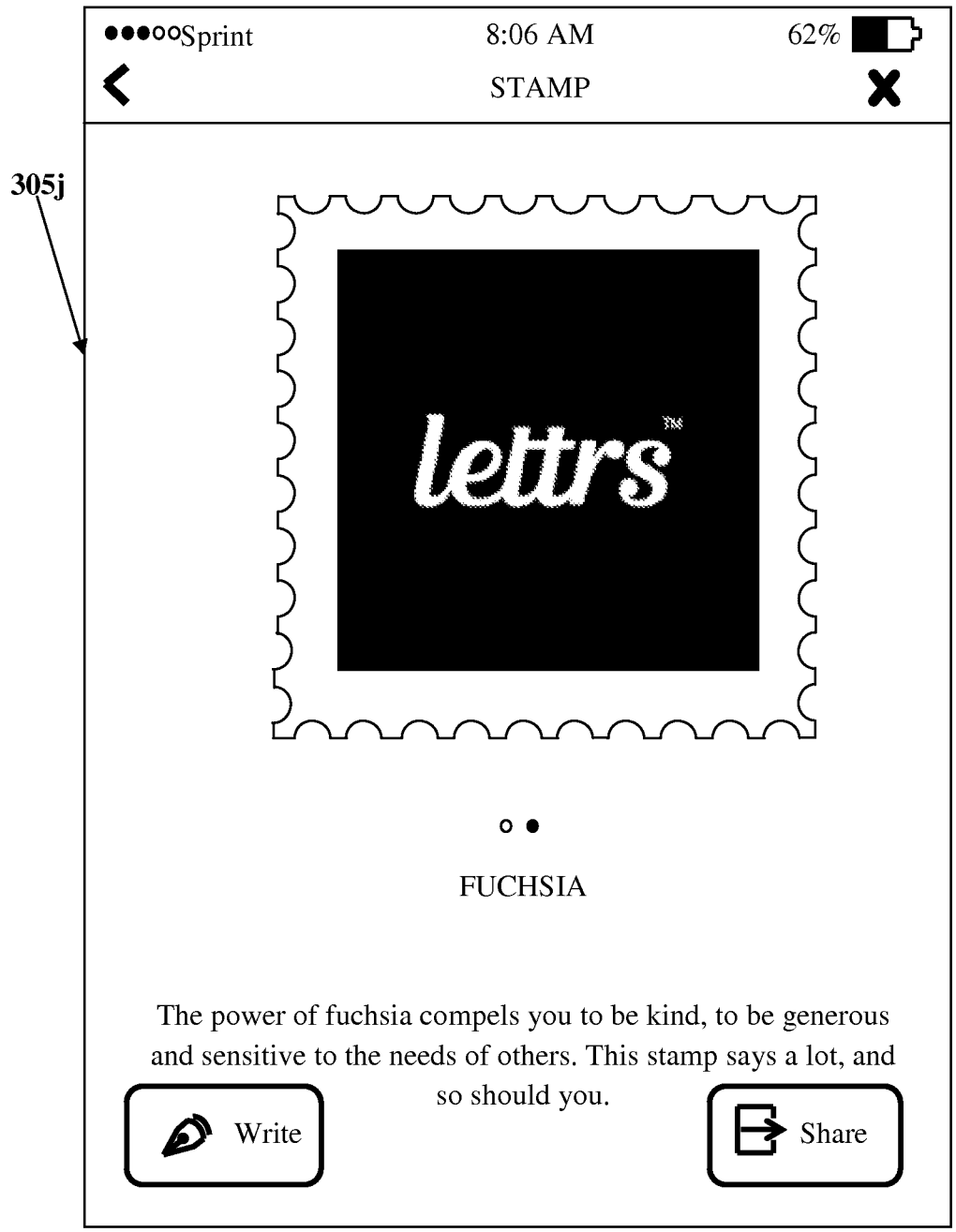

FIGS. 5G-5H exemplarily illustrate screenshots of a graphical user interface (GUI) 305j provided by the mobile stamp creation and communication system (MSCCS) 304 exemplarily illustrated in FIG. 3, on the user device, showing a selection of themes for use in a personalized communication. When John clicks on the theme icon 516 exemplarily illustrated in FIG. 5F, the mobile stamp creation and communication application (MSCCA) 305 provides a selection of themes for John to choose a theme for his personalized communication. When John selects a theme, for example, fuchsia for his personalized communication, the MSCCA 305 applies the selected theme to the personalized communication. The different themes provided by the mobile stamp creation and communication system (MSCCS) 304 allow users to be creative while composing a personalized communication.

Figure 6A:
FIGS. 6A-6C exemplarily illustrate screenshots of a graphical user interface provided by the mobile stamp creation and communication system, showing a selection of digital stamps rendered to the user device by the mobile stamp creation and communication system.
Figure 6B:
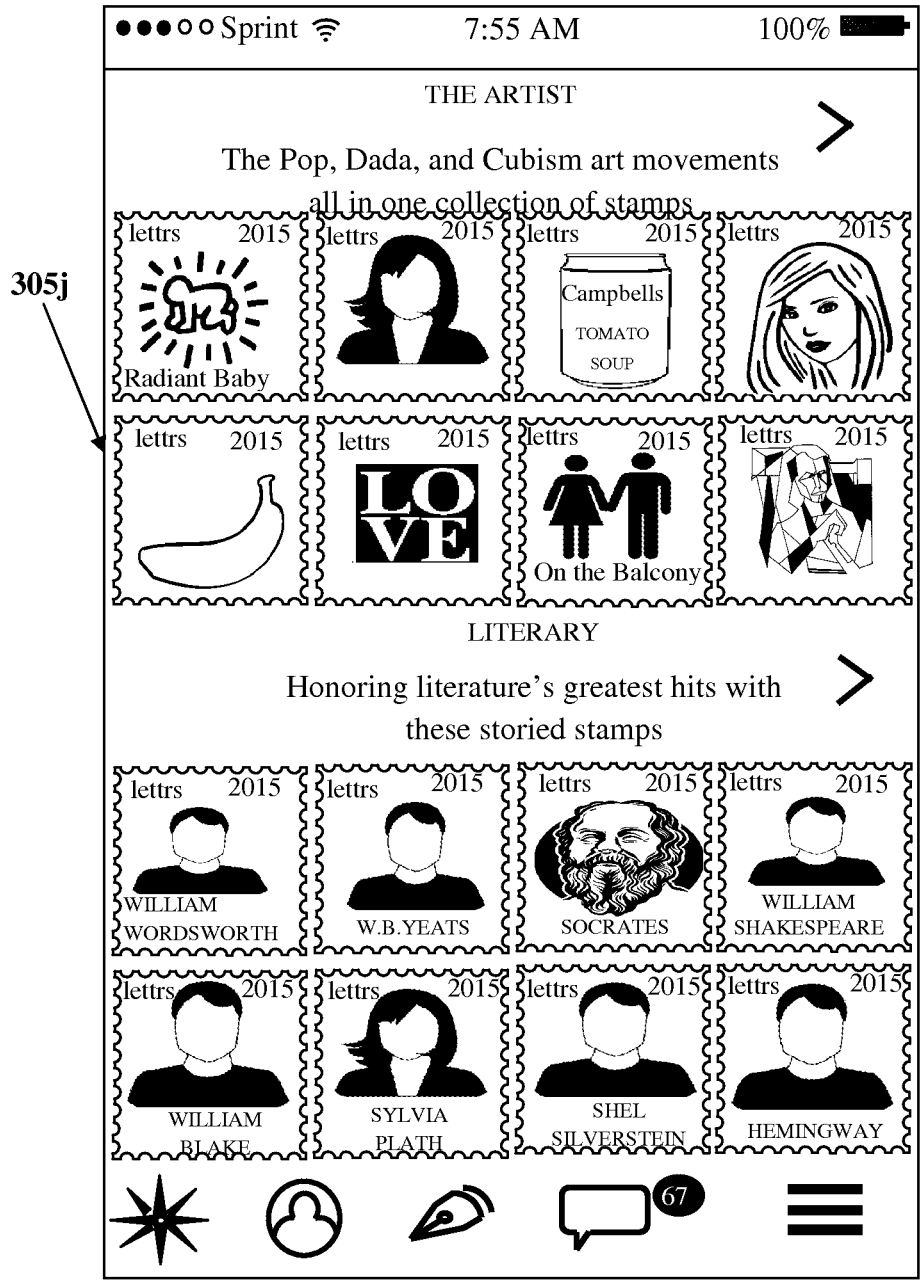
Figure 6C:
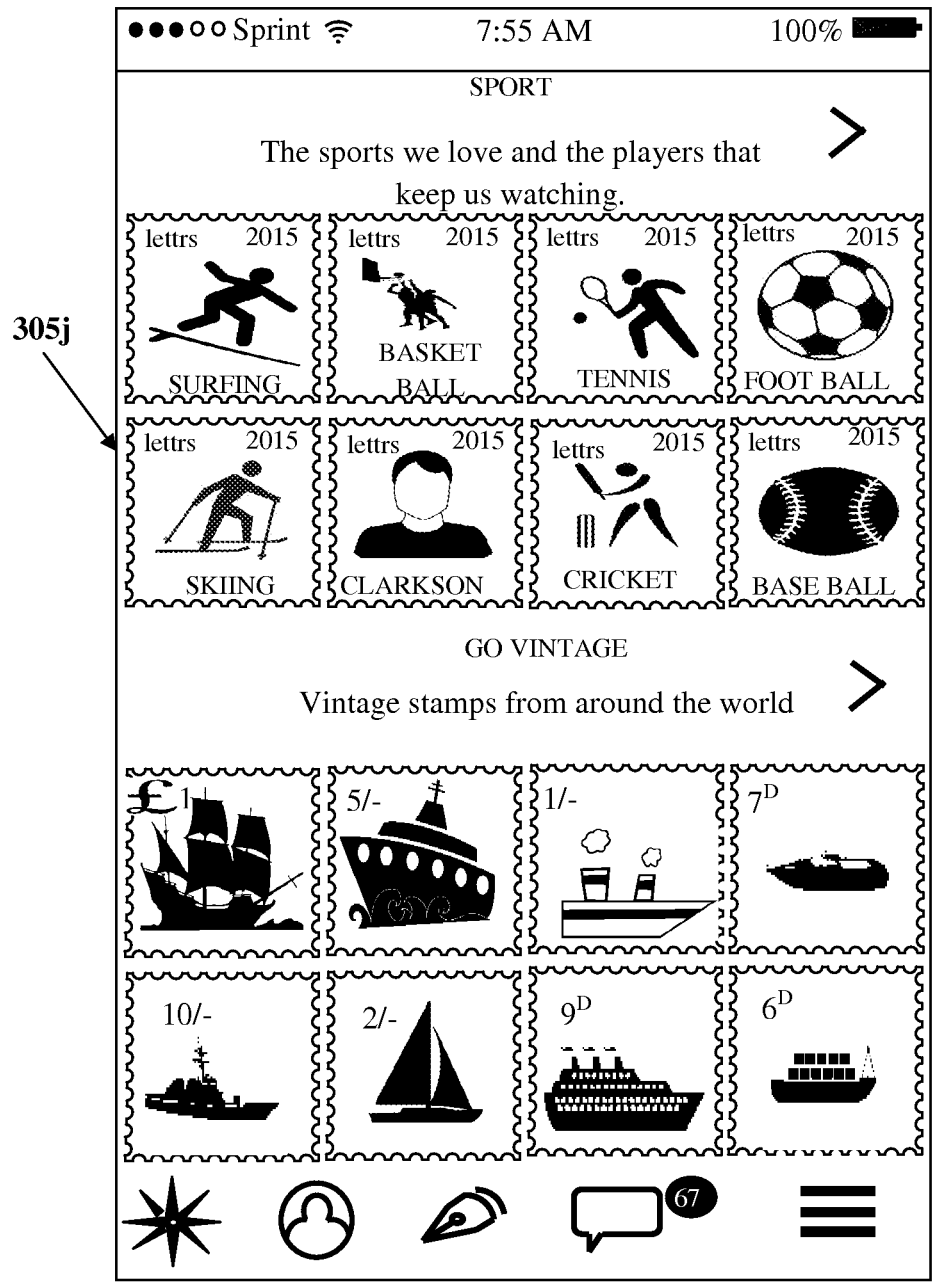
Figure 6D:
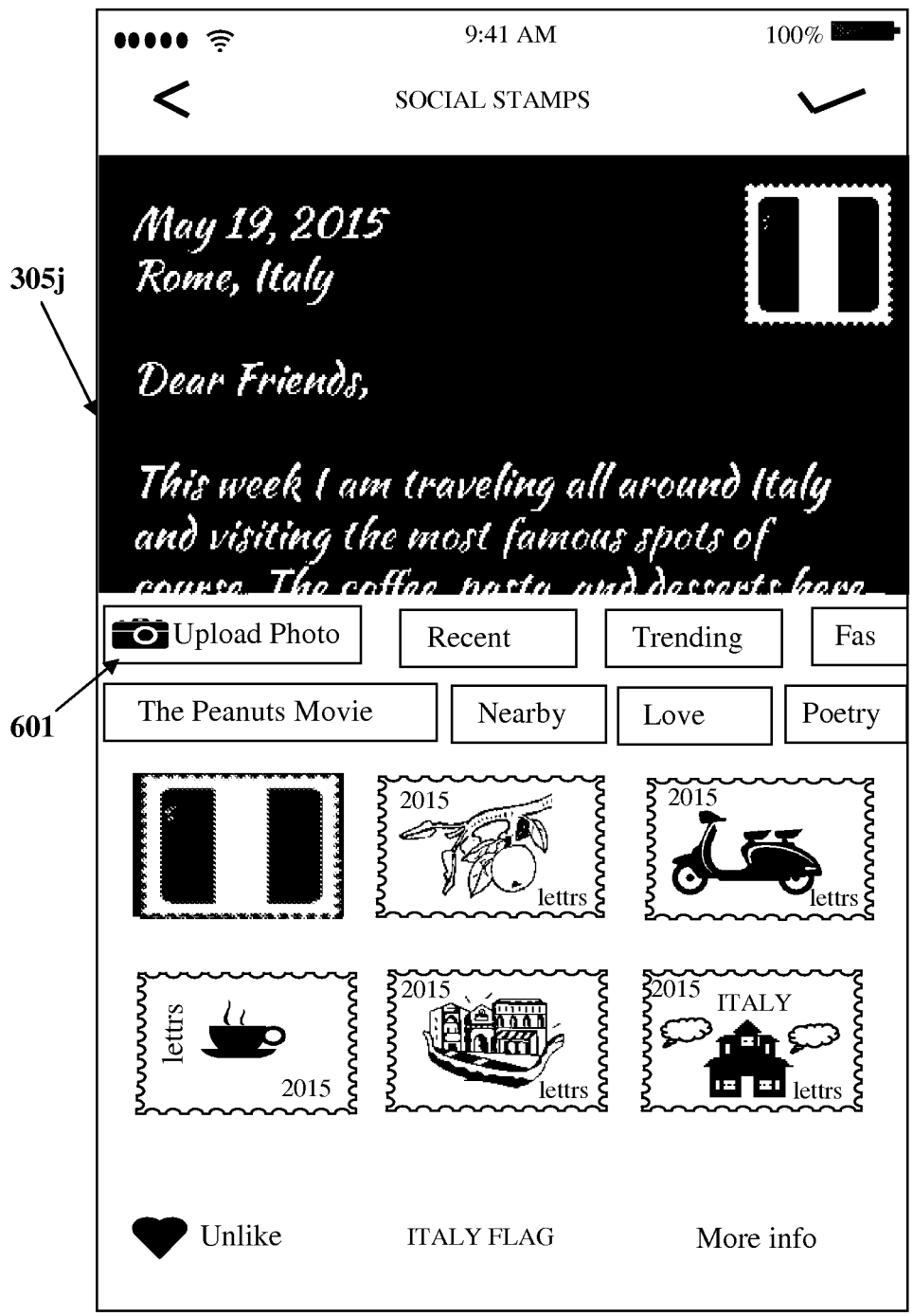
FIGS. 6D-6I exemplarily illustrate screenshots of a graphical user interface provided by the mobile stamp creation and communication system, showing creation of a digital stamp using a photo uploaded from the user device.
Figure 6E:

FIGS. 6A-6C exemplarily illustrate screenshots of a graphical user interface (GUI) 305j provided by the mobile stamp creation and communication system (MSCCS) 304 exemplarily illustrated in FIG. 3, showing a selection of digital stamps rendered to the user device by the MSCCS 304 based on dynamic rendering criteria. When John clicks on the digital stamp icon 512 on the write interface section 514 exemplarily illustrated in FIGS. 5D-5E, the mobile stamp creation and communication application (MSCCA) 305 renders a collection of digital stamps as exemplarily illustrated in FIGS. 6A-6C, based on dynamic rendering criteria as disclosed in the detailed description of FIG. 1. The MSCCA 305 categorizes the digital stamps into categories, for example, stamps submitted by users, academia, artists, literary, sports, vintage, "social stamps", etc., exemplarily illustrated in FIGS. 6A-6D. The MSCCS 304 dynamically changes the categories for the digital stamps to commemorate trending events, for example, the 2016 US presidential election, for example, by rendering digital stamps commemorating the candidates of the presidential race. As exemplarily illustrated in FIG. 6A, the MSCCA 305 renders digital stamps submitted by users and digital stamps related to famous universities across the world in digital stamp collections referred to as "User Submissions" and "Academia" respectively. As exemplarily illustrated in FIG. 6B, the MSCCA 305 renders digital stamps related to famous artists and digital stamps related to famous writers in digital stamp collections called "The Artist" and "Literary" respectively. As exemplarily illustrated in FIG. 6C, the MSCCA 305 renders digital stamps related to sports and vintage digital stamps in digital stamp collections called "Sport" and "Go Vintage" respectively. If John selects one of the digital stamps found in one of the digital stamp collections, for example, the "Academia" collection, then the MSCCA 305 attaches the selected digital stamp to the personalized communication, thereby converting the personalized communication into a personalized stamped communication. FIG. 6D exemplarily illustrates a screenshot of a graphical user interface (GUI) 305j provided by the mobile stamp creation and communication system (MSCCS) 304 exemplarily illustrated in FIG. 3, showing a selection of digital stamps provided by the MSCCS 304 categorized as social stamps.

FIGS. 6D-6I exemplarily illustrate screenshots of the graphical user interface (GUI) 305j provided by the mobile stamp creation and communication system (MSCCS) 304 provided exemplarily illustrated in FIG. 3, showing creation of a digital stamp using a photo uploaded from the user device. Consider the example where John is travelling to Italy and wishes to communicate with a recipient, for example, Jane, to describe Italian cuisine. John searches for a suitable digital stamp across various categories provided by the MSCCS 304, but none seem suitable for his purpose. Therefore, he decided to upload a photo from his user device and create a suitable digital stamp. John clicks on an upload icon 601 provided on the GUI 305j as exemplarily illustrated in FIG. 6D, to upload a photo from his user device. When John clicks on the upload icon 601 on the GUI 305j exemplarily illustrated in FIG. 6D, the mobile stamp creation and communication application (MSCCA) 305 renders options to "upload stamp photo", "take photo", "choose existing photo", and "cancel" in a pop up window 602 on the GUI 305j exemplarily illustrated in FIG. 6E. If John selects the "upload stamp photo" option, the MSCCA 305 renders a digital stamp outline 603 on the GUI 305j exemplarily illustrated in FIG. 6F, within which John can place the uploaded photo. The MSCCA 305 further renders a write interface section 604, for example, at the bottom of the GUI 305j as exemplarily illustrated in FIG. 6F, to allow John to adds a suitable caption for the photo uploaded by him.

Figure 6F:
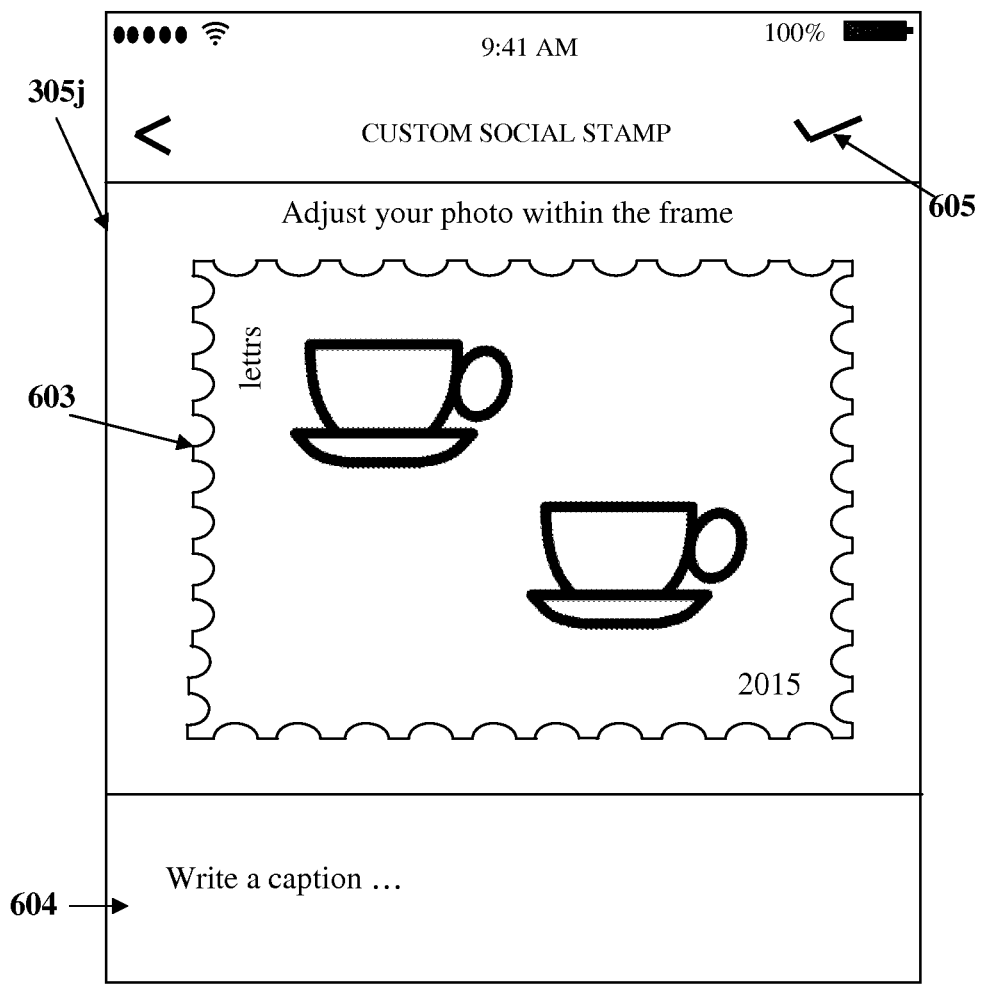
Figure 6G:
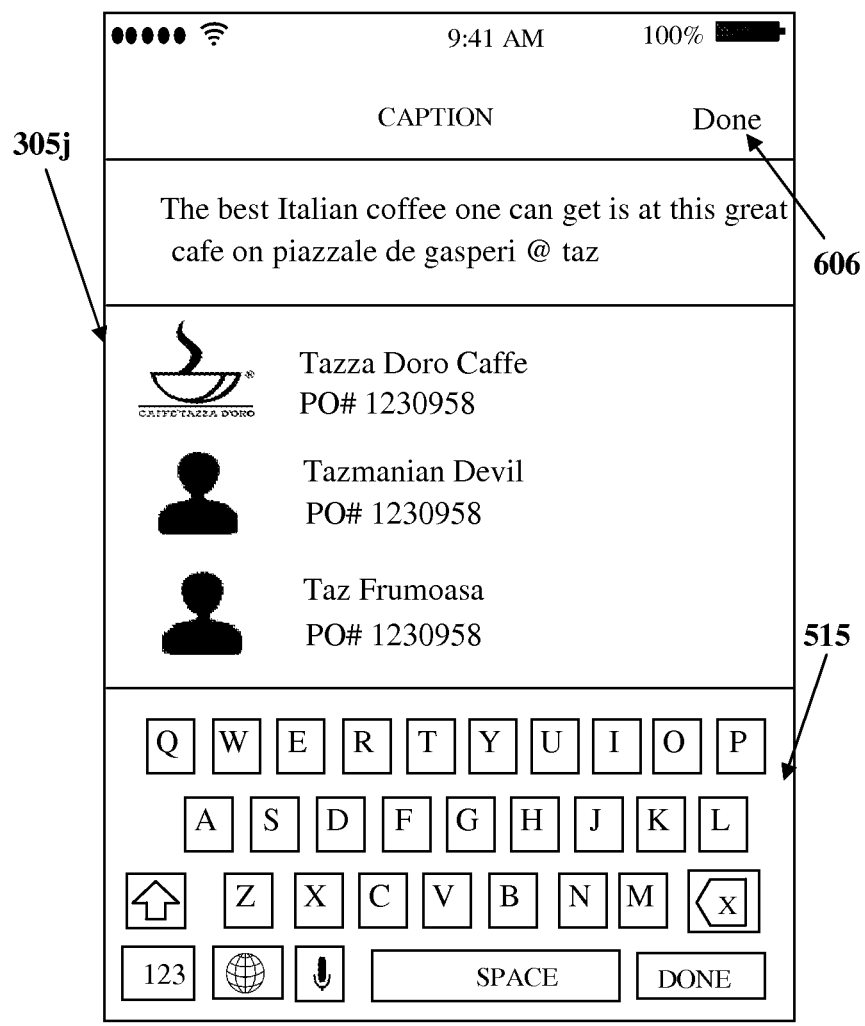
Figure 6H:
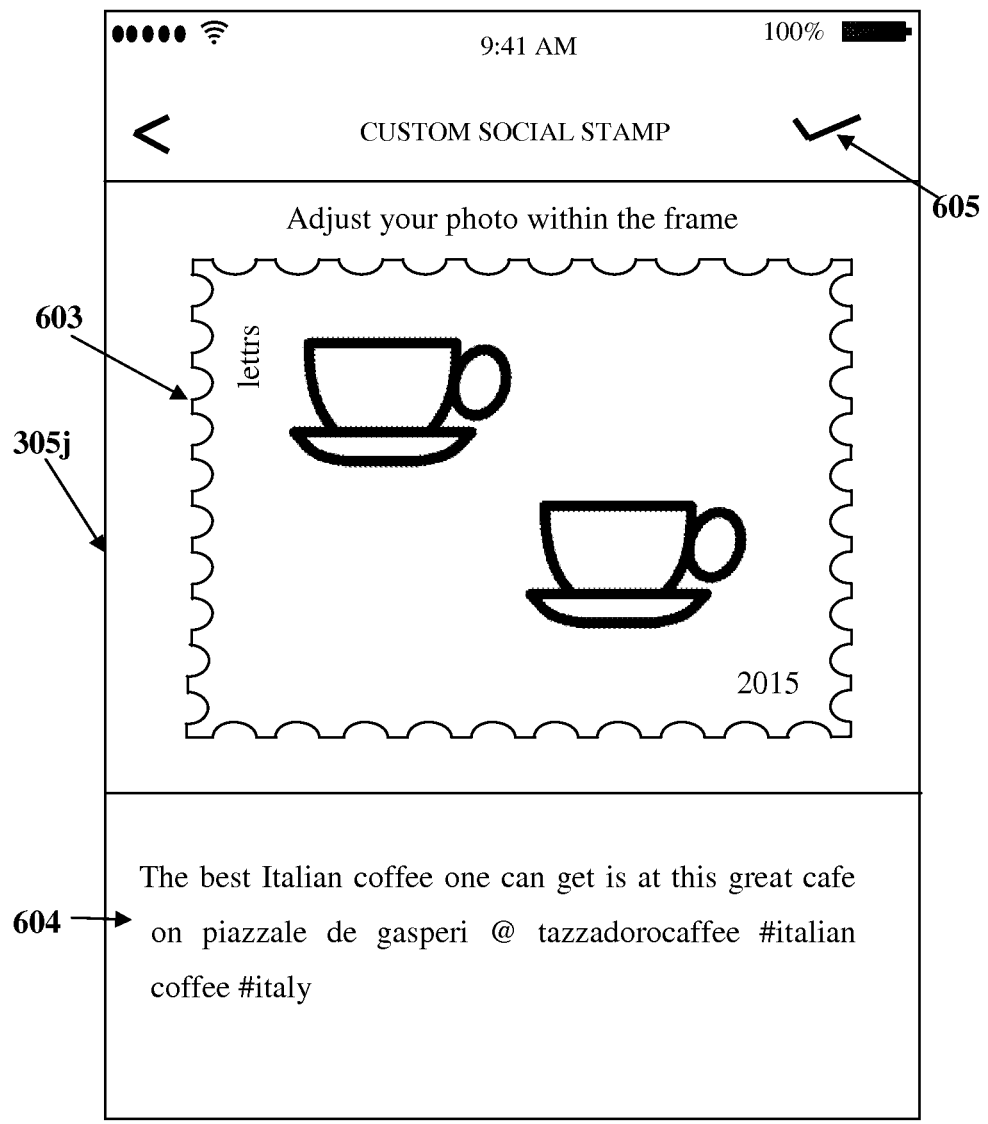
Figure 6I:
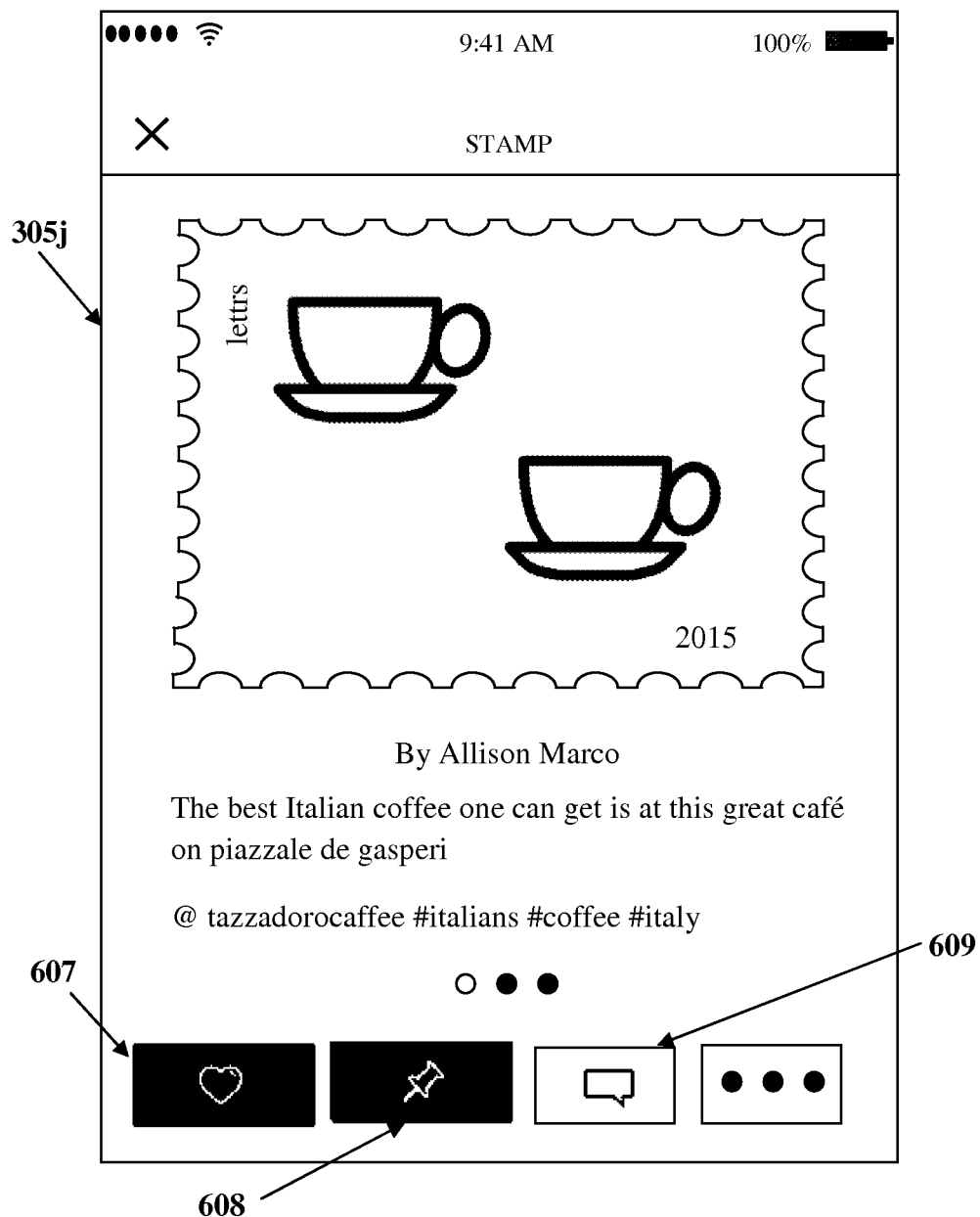

When John clicks on the write interface section 604 exemplarily illustrated in FIG. 6F, the mobile stamp creation and communication application (MSCCA) 305 renders a keyboard interface 515 as exemplarily illustrated in FIG. 6G, to allow John to enter a caption using the keyboard interface 515. When John completes the caption, he clicks on a "done" icon 606 provided on the GUI 305j exemplarily illustrated in FIG. 6G. The MSCCA 305 then renders the caption in the write interface section 604 on the GUI 305j as exemplarily illustrated in FIG. 6G. John then positions the uploaded photo or drags and drops a selected photo within the digital stamp outline 603 on the GUI 305j exemplarily illustrated in FIG. 6H. After positioning the photo within the digital stamp outline 603, John may then click on a checkmark icon 605 provided on the GUI 305j exemplarily illustrated in FIG. 6H. The MSCCA 305 creates a custom digital stamp with the uploaded photo, data elements, and dynamic functional elements and stores the created digital stamp along with the caption entered by John in the content database 306 exemplarily illustrated in FIG. 3. The MSCCA 305 displays the created digital stamp with the caption on the GUI 305j as exemplarily illustrated in FIG. 6I. The MSCCA 305 renders social media icons, for example, a like icon 607, a pin icon 608, and a comment icon 609 at the bottom of the GUI 305j as exemplarily illustrated in FIG. 6I. The MSCCS 304 renders the like icon 607, the pin icon 608, and the comment icon 609 on the GUIs 305j of each user device that accesses the digital stamp created by John. If a user likes the digital stamp, he/she can click on the like icon 607. If the user wishes to comment on the digital stamp, he/she can click on the comment icon 609. A user can pin the digital stamp that he/she likes to his/her "fridge" by clicking on the pin icon 608.

Figure 6J:
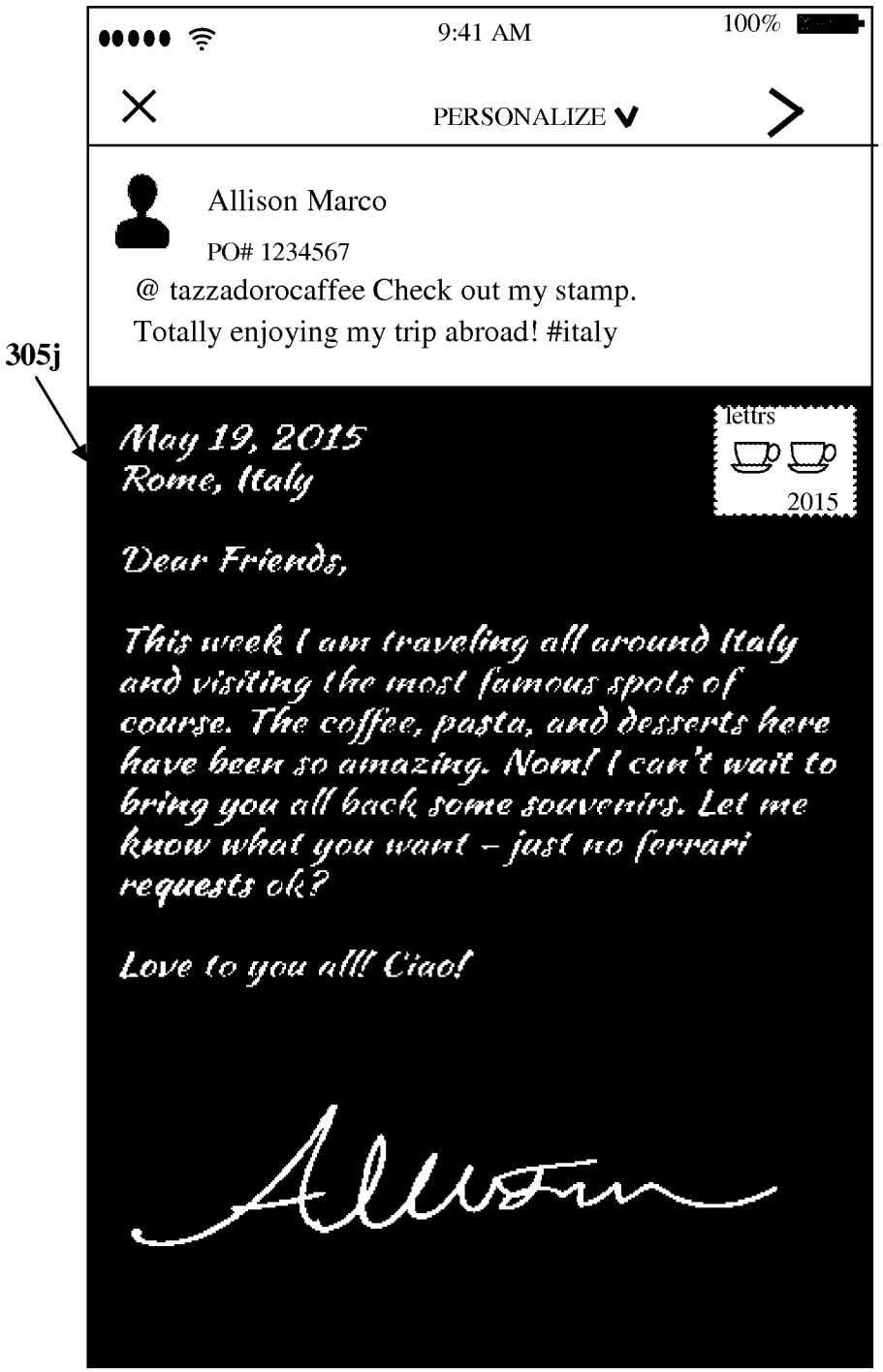
FIG. 6J exemplarily illustrates a screenshot of a graphical user interface provided by the mobile stamp creation and communication system, showing the created digital stamp attached to a personalized communication.

FIG. 6J exemplarily illustrates a screenshot of a graphical user interface (GUI) 305j provided by the mobile stamp creation and communication system (MSCCS) 304 exemplarily illustrated in FIG. 3, showing the created digital stamp attached to a personalized communication, for example, an "open letter". Consider an example of another user, Allison Marco, who selects the digital stamp created by John. When Allison selects the digital stamp, the mobile stamp creation and communication application (MSCCA) 305 on Allison's user device attaches the digital stamp to the personalized communication created by her and renders the personalized stamped communication on the GUI 305j of Allison's user device. The MSCCA 305 therefore converts a content object, for example, an image into a digital stamp that becomes a part of the MSCCS 304 for performing data management and analytics on a messaging network.

Figure 6K:
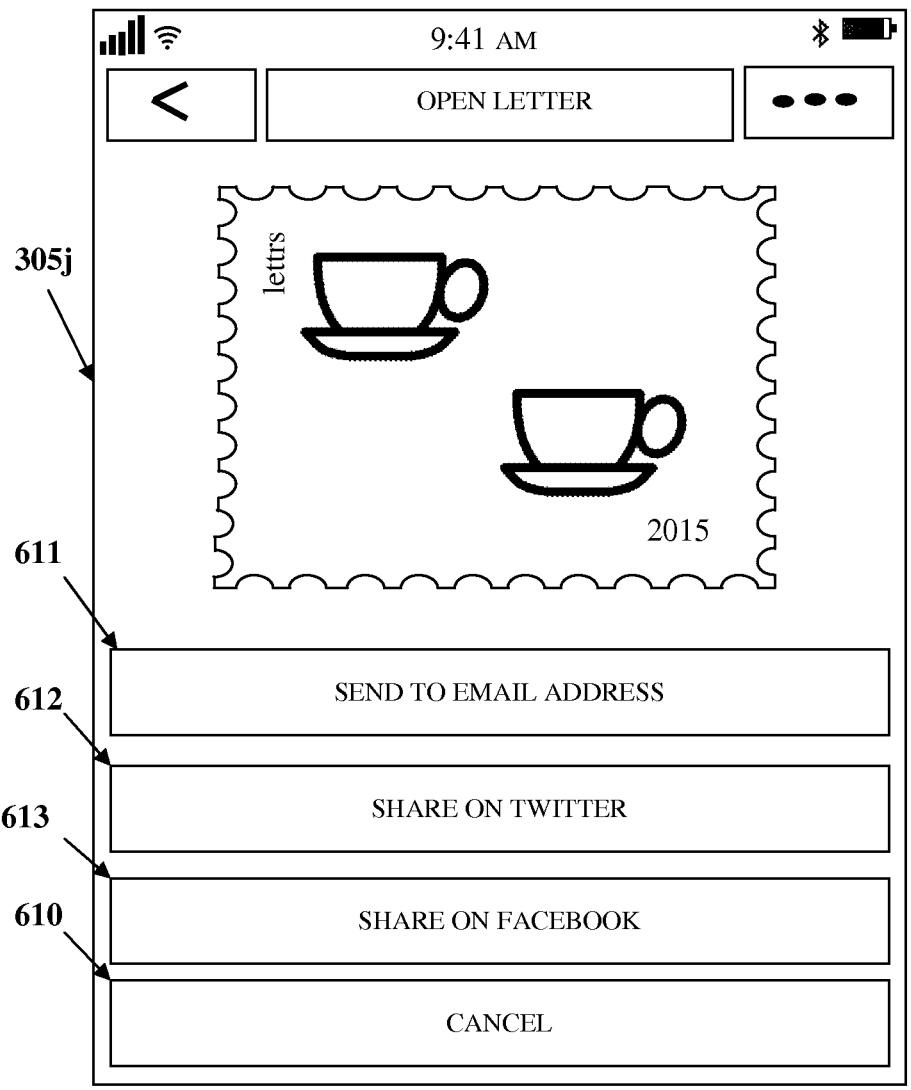
FIG. 6K exemplarily illustrates a screenshot of a graphical user interface provided by the mobile stamp creation and communication system, showing multiple options provided to a user for sharing a digital stamp with other users via a network.

FIG. 6K exemplarily illustrates a screenshot of the graphical user interface (GUI) 305j provided by the mobile stamp creation and communication system (MSCCS) 304 exemplarily illustrated in FIG. 3, showing multiple options provided to a user for sharing a digital stamp with other users via a network. If John wishes to send Jane the personalized stamped communication created by him, John clicks on the "forward" icon 510 exemplarily illustrated in FIG. 5E. The mobile stamp creation and communication application (MSCCA) 305 on John's user device renders interface elements, for example, a "send to an email address" button 611, a "share on Twitter" button 612, a "share on Facebook" button 613, and a "Cancel" button 610 on the GUI 305j exemplarily illustrated in FIG. 6K. The MSCCS 304 can deliver the personalized stamped communication across multiple communication channels, for example, social networks such as Tumblr® of Tumblr, Inc., Linkedin® of LinkedIn Corporation, Instagram® of Instagram, LLC, Twitter® of Twitter, Inc., Google+ of Google Inc., Pinterest® of Pinterest, Inc., Facebook® of Facebook, Inc., etc., email systems, short message service (SMS) systems, multimedia messaging service (MMS) systems, postal delivery systems such as USPS® of United States Postal Service, blogs, etc. A personalized stamped communication once created, distributed, and published, for example, on a social network by the MSCCS 304 becomes a social media object shareable across other social networks.

Figure 7A:
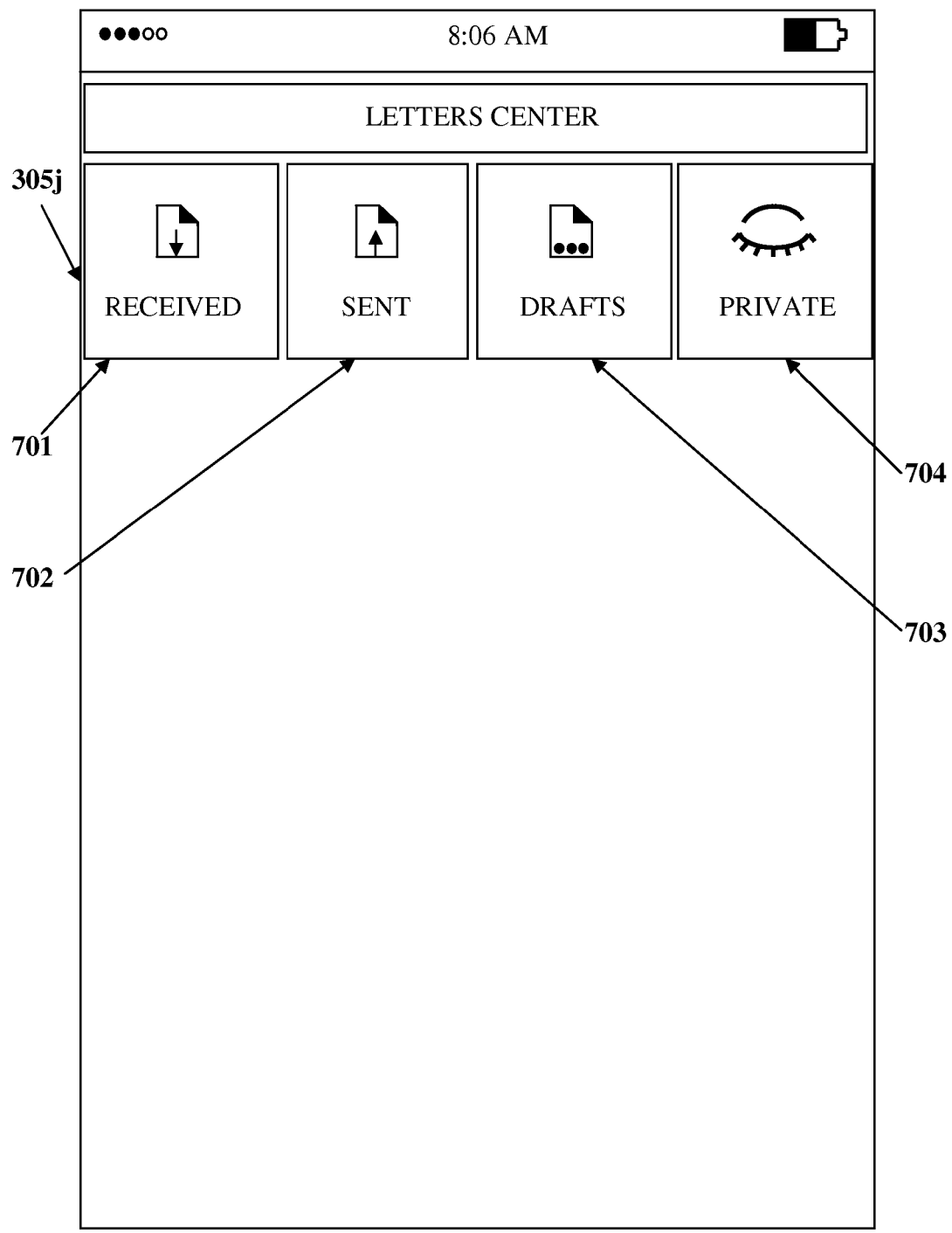
FIG. 7A exemplarily illustrates a screenshot of a letters central interface provided on the graphical user interface of the mobile stamp creation and communication system.

FIG. 7A exemplarily illustrates a screenshot of a letters central interface provided on the graphical user interface (GUI) 305j of the mobile stamp creation and communication system (MSCCS) 304 exemplarily illustrated in FIG. 3. When a user, for example, John clicks on the "Letters Center" icon 503 exemplarily illustrated in FIG. 5A, the mobile stamp creation and communication application (MSCCA) 305 renders the GUI 305j exemplarily illustrated in FIG. 7A, showing a "received" icon 701, a "sent" icon 702, a "drafts" icon 703, and a "private" icon 704 to allow John to manage the personalized stamped communications that he/she "received", "sent", "drafted", and "privately sent/received" respectively.

Figure 7B:
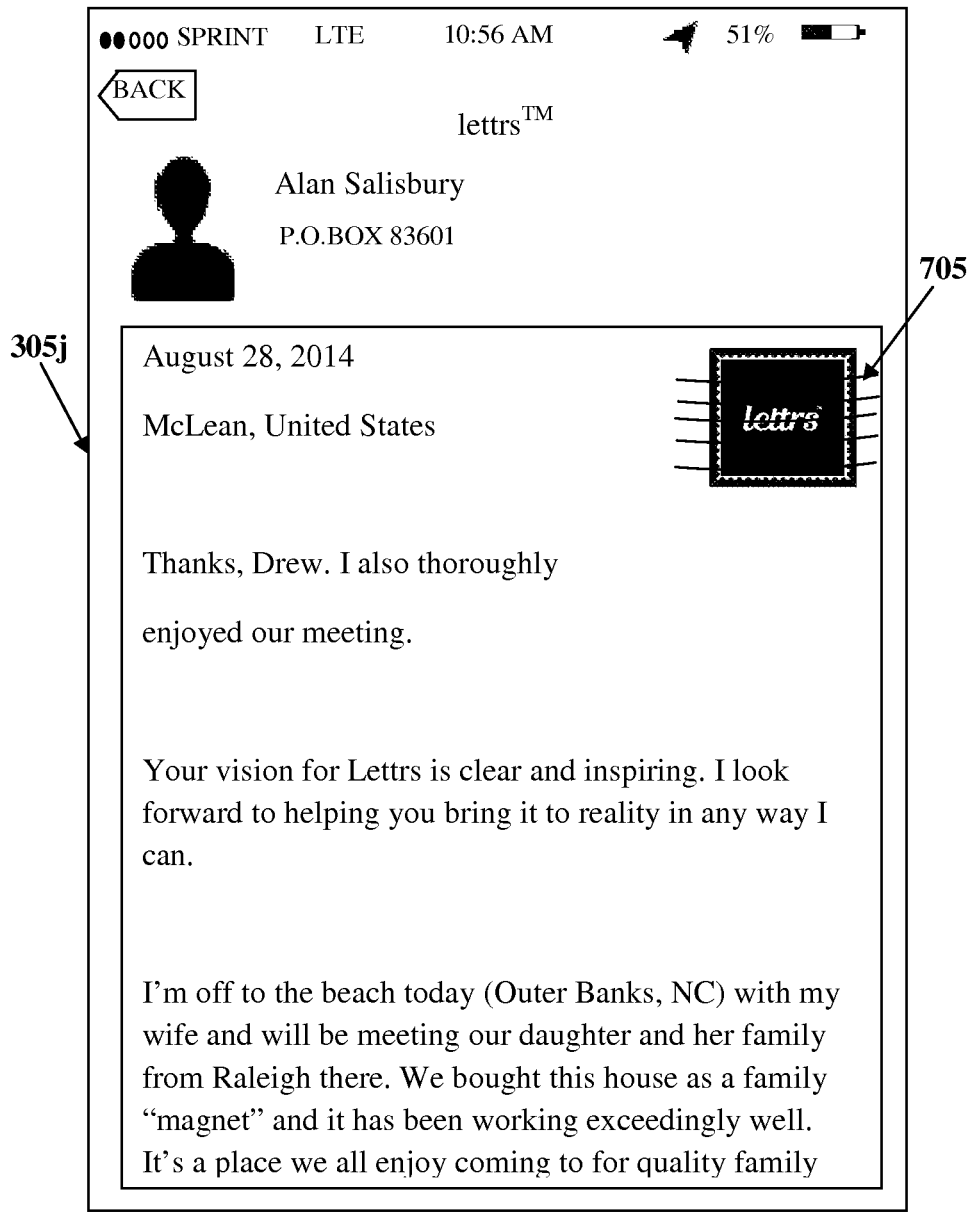
FIG. 7B exemplarily illustrates a screenshot of a graphical user interface provided by the mobile stamp creation and communication system for accessing personalized communication received by a user.

FIG. 7B exemplarily illustrates a screenshot of a graphical user interface (GUI) 305j provided by the mobile stamp creation and communication system (MSCCS) 304 exemplarily illustrated in FIG. 3, for accessing personalized communication received by a user. When the user clicks on the "received" icon 701 exemplarily illustrated in FIG. 7A, the mobile stamp creation and communication application (MSCCA) 305 on the user device renders the personalized stamped communication with a digital stamp. As the personalized stamped communication has been received, the digital stamp is considered to be used as indicated by the visual usage marker 705 marked by the MSCCS 304 across the digital stamp, similar to a used postage stamp. When a user receives and views a personalized stamped communication on a user device via the GUI 305j, the MSCCS 304 embeds the digital stamp in a visual usage marker 705 and renders the marked digital stamp on the personalized stamped communication. Once the MSCCS 304 marks the digital stamp with the visual usage marker 705, a user cannot modify the marked digital stamp. The visual usage marker 705 resembles, for example, an ink stamp of a used physical stamp as exemplarily illustrated in FIG. 7B.

Figure 7C:
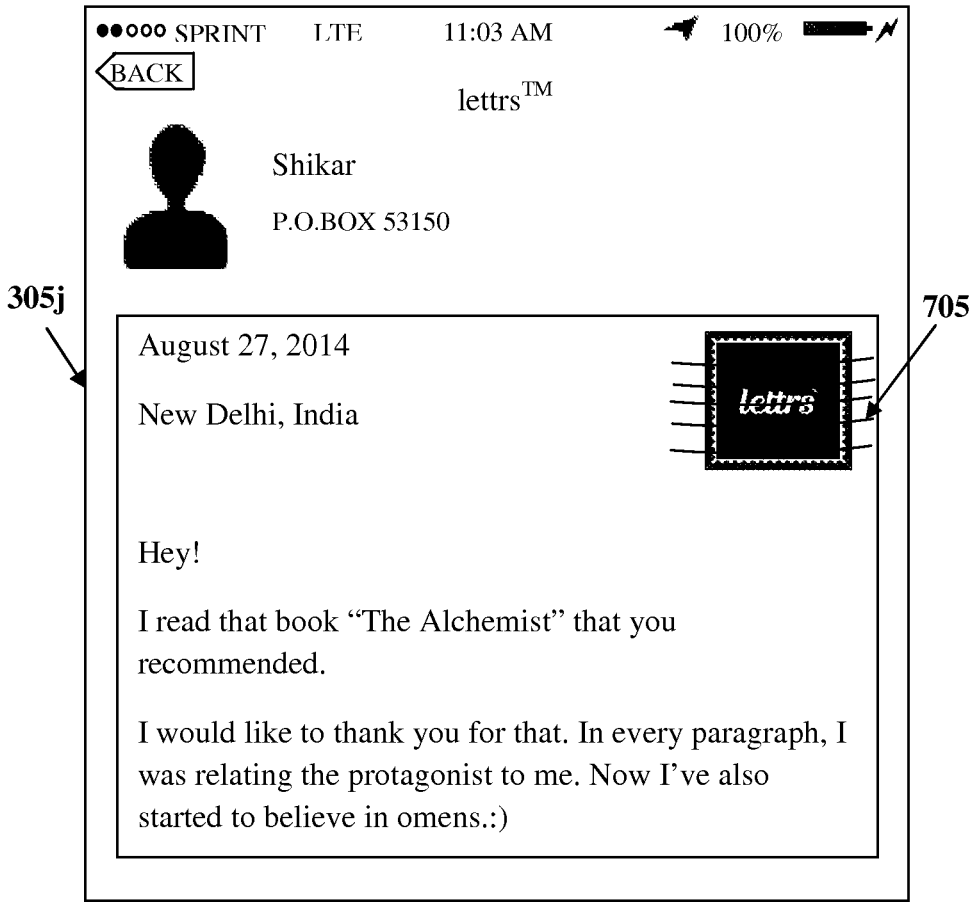
FIG. 7C exemplarily illustrates a screenshot of a graphical user interface provided by the mobile stamp creation and communication system for accessing personalized communication sent by a user.

FIG. 7C exemplarily illustrates a screenshot of a graphical user interface (GUI) 305j provided by the mobile stamp creation and communication system (MSCCS) 304 exemplarily illustrated in FIG. 3, for accessing personalized communication sent by a user. When the user clicks on the "sent" icon 702 exemplarily illustrated in FIG. 7A, the mobile stamp creation and communication application (MSCCA) 305 on the user device renders the personalized stamped communications that were sent by the user. When the personalized stamped communication has been sent, the digital stamp is considered to be used as indicated by the visual usage marker 705 marked by the MSCCS 304 across the digital stamp, similar to a used postage stamp.

Figure 8A:
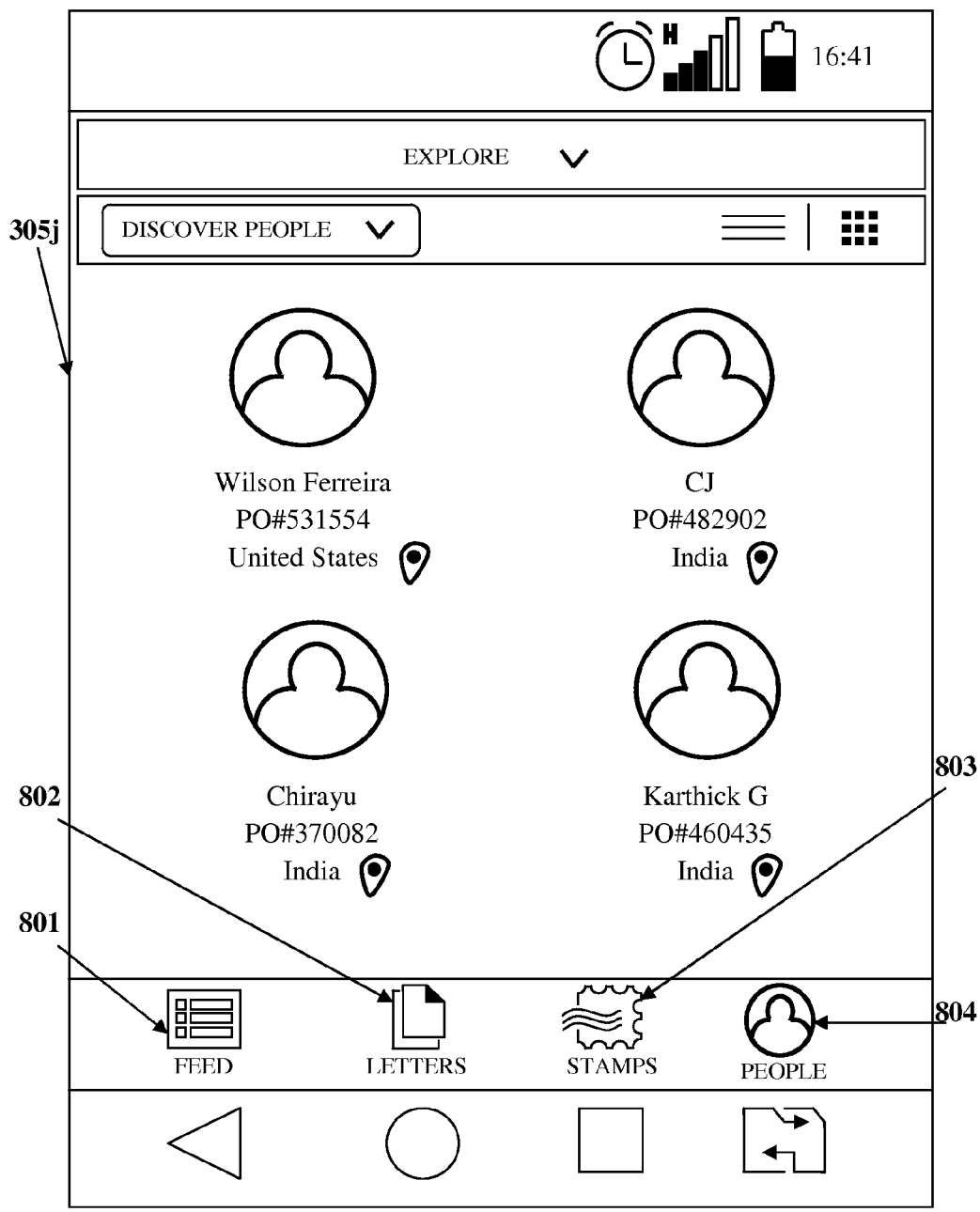
FIG. 8A exemplarily illustrates a screenshot of an explore interface provided on the graphical user interface by the mobile stamp creation and communication system for allowing a user to access contacts, discover new contacts, view personalized communications, and access digital stamps.

FIG. 8A exemplarily illustrates a screenshot of an explore interface provided on the graphical user interface (GUI) 305j by the mobile stamp creation and communication system (MSCCS) 304 exemplarily illustrated in FIG. 3, for allowing a user to access contacts, discover new contacts, view personalized communications, and access digital stamps. When a user, for example, John clicks on the "Explore" icon 504 exemplarily illustrated in FIG. 5A, the mobile stamp creation and communication application (MSCCA) 305 on the user device renders a list of people, along with their locations, who are currently using the MSCCS 304, on the GUI 305j as exemplarily illustrated in FIG. 8A. The MSCCA 305 renders a "FEED" icon 801, a "LETTERS" icon 802, a "STAMPS" icon 803, and a "PEOPLE" icon 804, for example, at the bottom of the GUI 305j as exemplarily illustrated in FIG. 8A. When John clicks on the "FEED" icon 801, the MSCCA 305 renders a live feed including latest personalized stamped communications, people using the MSCCS 304, latest digital stamps, latest writing topics, etc., on the GUI 305j. When John clicks on the "LETTERS" icon 802, the MSCCA 305 renders the latest personalized stamped communications written by users on the GUI 305j. If John clicks on the "STAMPS" icon 803, the MSCCA 305 renders the latest digital stamps which are trending, for example, based on current events occurring across the world, the latest digital stamps uploaded by users, etc., on the GUI 305j. When John clicks on the "PEOPLE" icon 804, the MSCCA 305 renders a list of people currently using the MSCCS 304 on the GUI 305j. John may then click on a user's profile to view various personalized stamped communications posted by the user. For example, John may click on Joao Pessoa's profile to view various personalized stamped communications posted by Joao Pessoa as exemplarily illustrated in FIG. 8B.

Figure 8B:
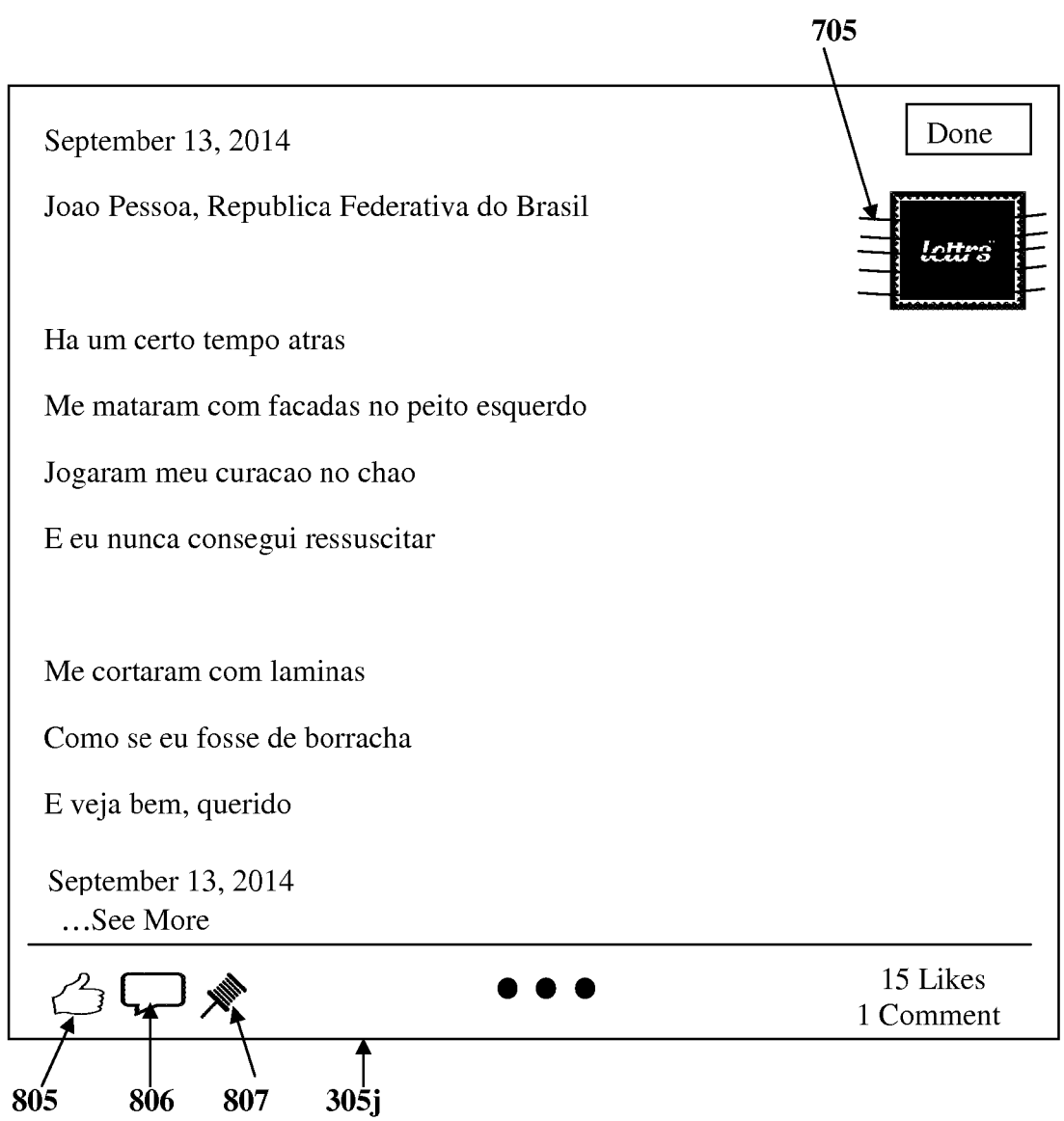
FIG. 8B exemplarily illustrates a screenshot of a graphical user interface provided by the mobile stamp creation and communication system, showing a digital stamp rendered on a personalized stamped communication transmitted to a recipient via a social network platform.

FIG. 8B exemplarily illustrates a screenshot of a graphical user interface (GUI) 305j provided by the mobile stamp creation and communication system (MSCCS) 304 exemplarily illustrated in FIG. 3, showing a digital stamp rendered on a personalized stamped communication transmitted to a recipient via a social network platform. A user uploads media content, for example, an image via the GUI 305j and creates a digital stamp using the mobile stamp creation and communication application (MSCCA) 305 on a user device. The MSCCS 304 creates stamp logic based on the created digital stamp received from the user device via the network 303 exemplarily illustrated in FIG. 3, in addition to stamp logic determined by the MSCCS 304 based on characteristics of the user device. FIG. 8B exemplarily illustrates a digital stamp distributed to multiple user devices via a social network platform. The distributed digital stamp is permanently rendered on a different form of personalized content communication such as a personal digital letter, a mobile message, or a digital text message created by the user via the GUI 305j. Consider the example of John clicking on the "PEOPLE" icon 804 on the GUI 305j exemplarily illustrated in FIG. 8A. By clicking the "PEOPLE" icon 804, John finds several user profiles of users currently using the MSCCS 304 which are provided by the MSCCS 304 on the GUI 305j of John's user device. He finds a user's profile, for example, Joao Pessoa's profile showing interesting personalized stamped communications. Clicking on one of Joao's personalized stamped communications results in the MSCCA 305 rendering the personalized stamped communication as exemplarily illustrated in FIG. 8B. The MSCCA 305 renders a like icon 805, a comment icon 806, and a pin icon 807 at the bottom of the GUI 305j of John's user device to allow John to "like", comment on, and pin Joao Pessoa's personalized stamped communication respectively. If John clicks on the comment icon 806, the MSCCA 305 enables John to add a comment that can be viewed by other users of the MSCCS 304. John may click on the pin icon 807 if he wishes to save the personalized stamped communication of Joao Pessoa in John's "fridge".

Figure 9A:
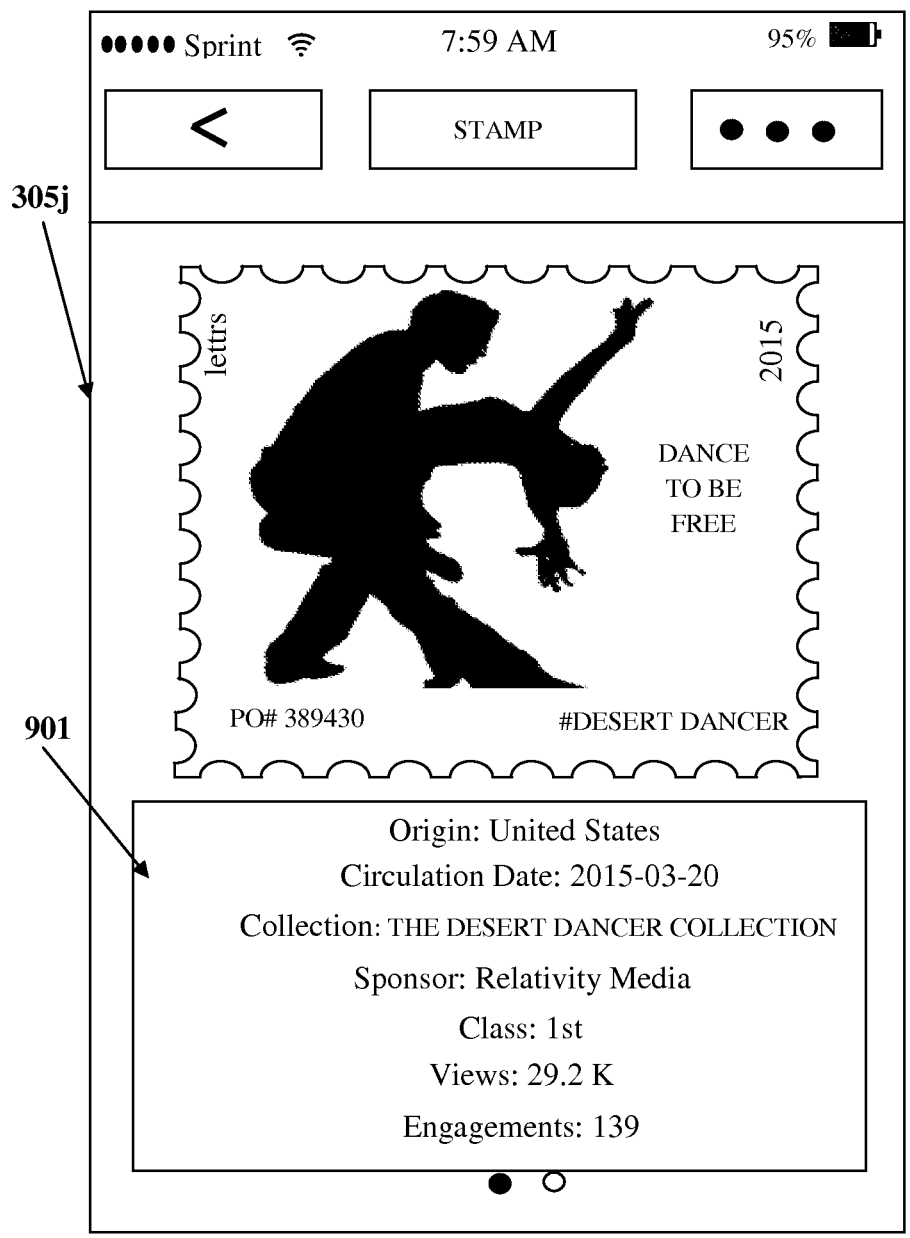
FIGS. 9A-9C exemplarily illustrate screenshots of a graphical user interface provided by the mobile stamp creation and communication system, showing digital stamps commemorating specialized digital stamp collections.
Figure 9B:
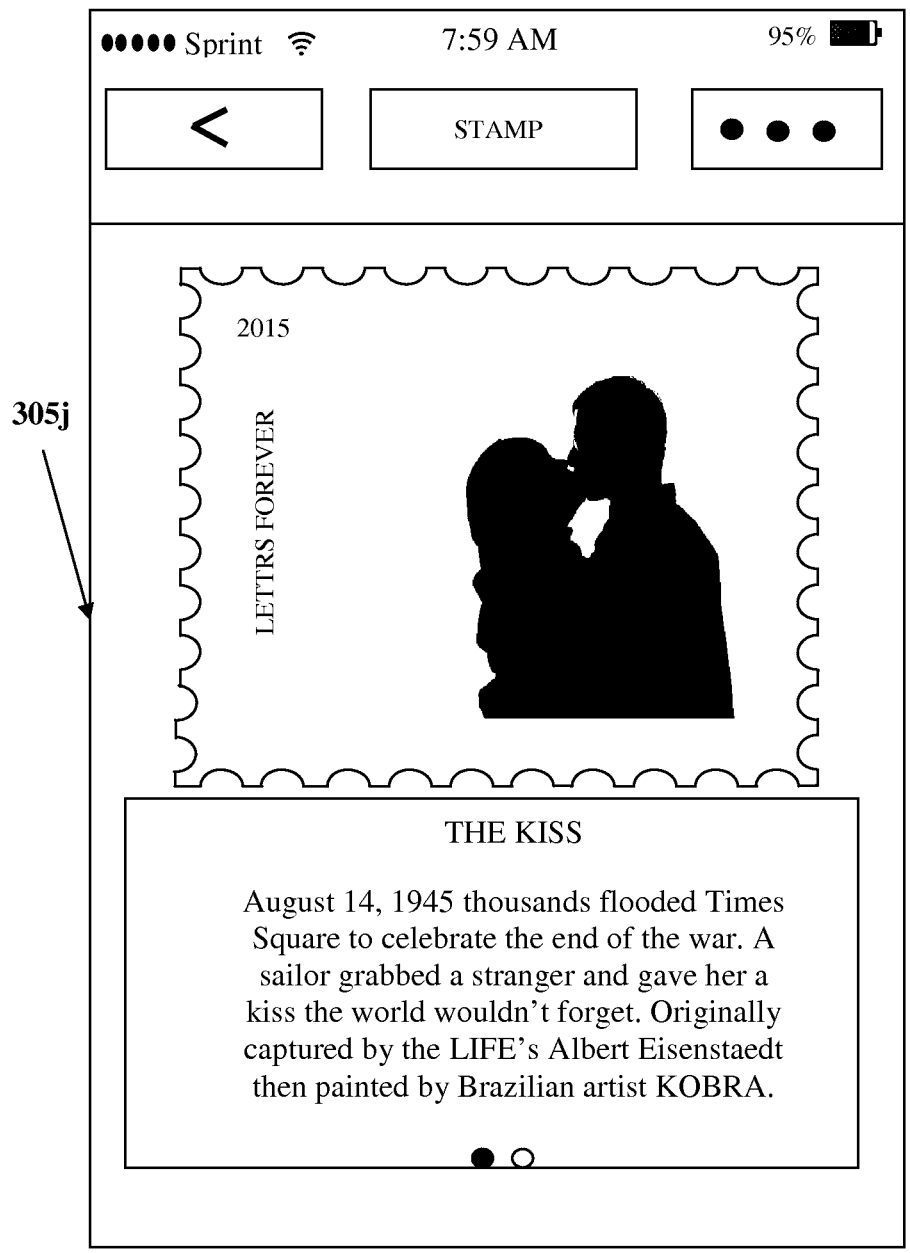
Figure 9C:
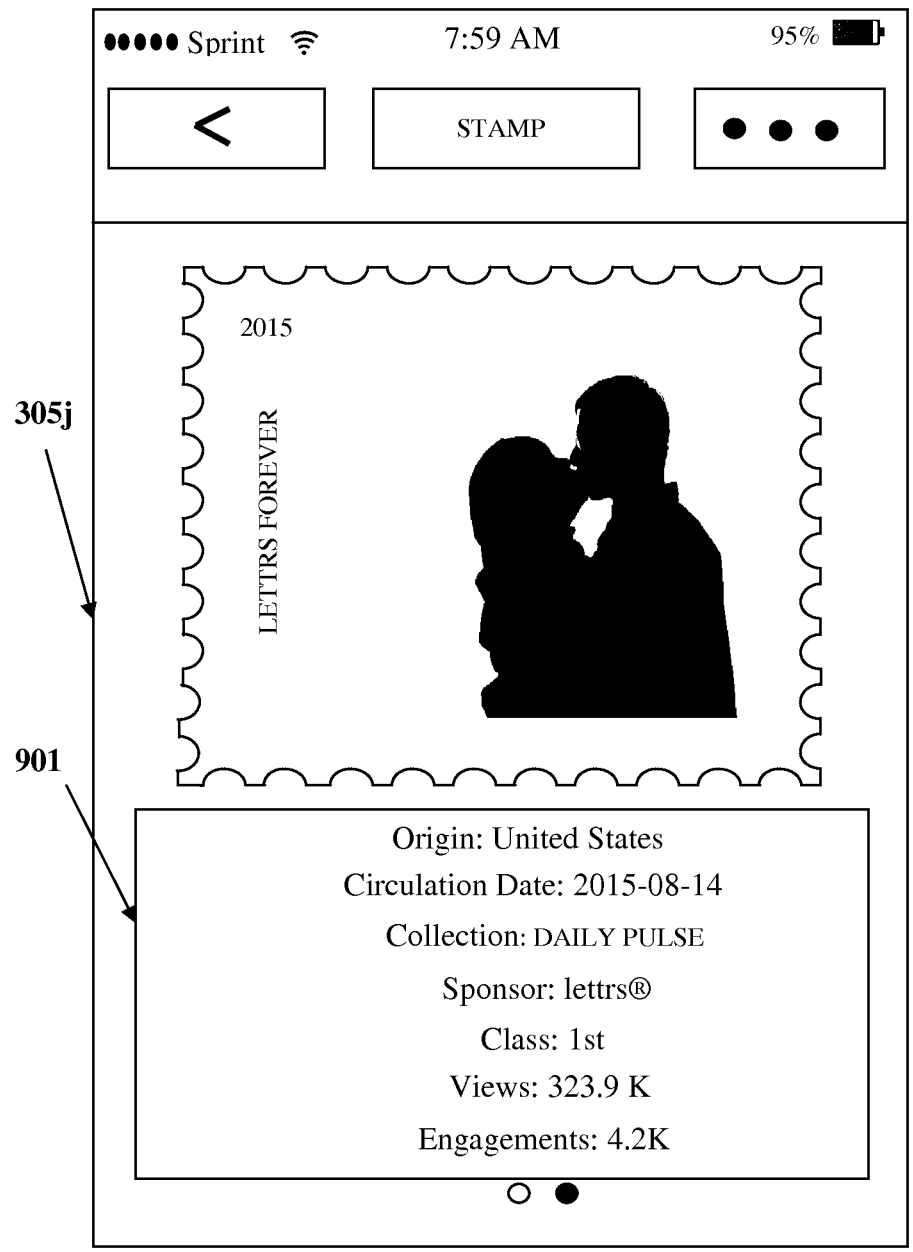

FIGS. 9A-9C exemplarily illustrate screenshots of a graphical user interface (GUI) 305j provided by the mobile stamp creation and communication system (MSCCS) 304 exemplarily illustrated in FIG. 3, showing digital stamps commemorating specialized digital stamp collections. The digital stamp collections of the MSCCS 304 comprise digital stamps, for example, associated with events of historical importance as exemplarily illustrated in FIG. 9B, special collections of the month, etc. For each digital stamp, the MSCCS 304 performs analytics on digital stamps and renders analytics data 901 on the GUI 305j as exemplarily illustrated in FIG. 9A and FIG. 9C. The analytics data 901 generated by the MSCCS 304 can be used to analyze various attributes of the digital stamps. For example, the MSCCS 304 categorizes digital stamps having a high number of views as popular or trending and renders those digital stamps as popular digital stamps to users.

Figure 10B:
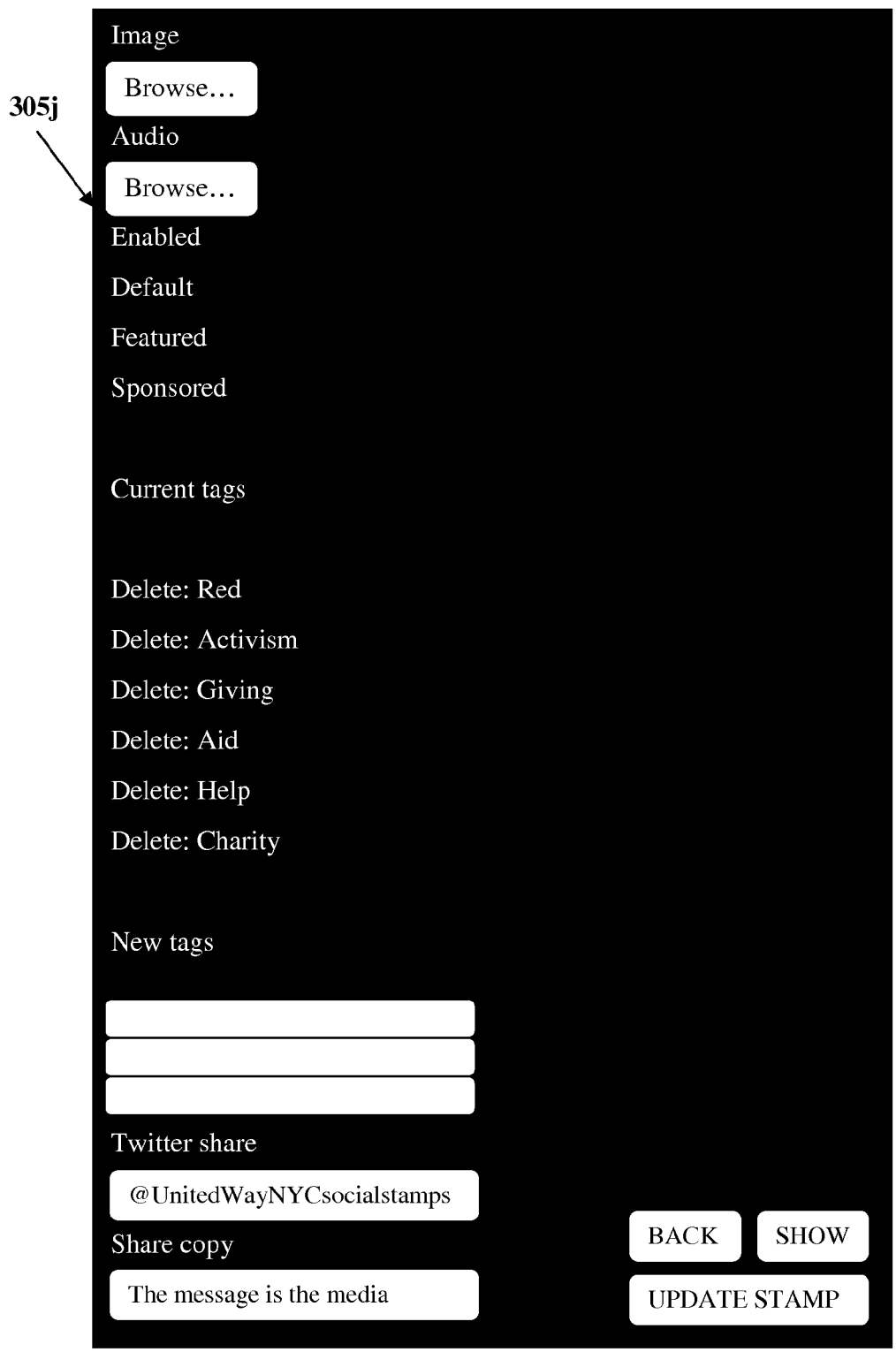

FIGS. 10A-10B exemplarily illustrate screenshots of a graphical user interface (GUI) 305j provided by the mobile stamp creation and communication system (MSCCS) 304 exemplarily illustrated in FIG. 3, for editing a digital stamp. As exemplarily illustrated in FIGS. 10A-10B, a user may enter a name for a digital stamp to be created, a book reference, a sponsor, an order value, a description, an application uniform resource location (URL), a web URL, a circulation date, a stamp type, a geographic origin, etc., on the GUI 305j as exemplarily illustrated in FIG. 10A. The user may also attach media content, for example, an image, an audio file, etc., and enter tag for the digital stamp as exemplarily illustrated in FIG. 10B. The MSCCS 304 integrates the stamp information and the attached media content to create a digital stamp as disclosed in the detailed description of FIG. 1.

Figure 11A:
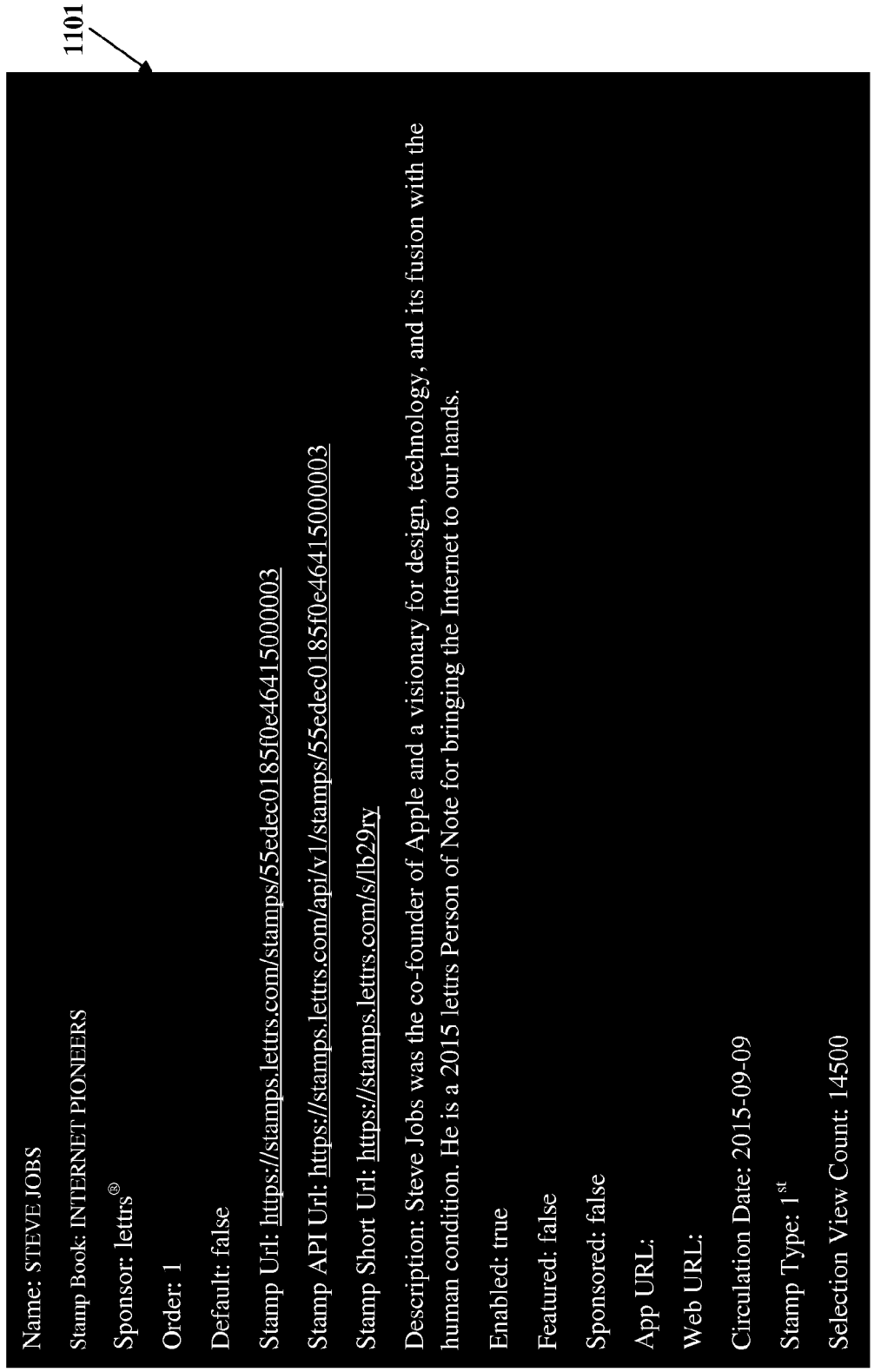
Figure 11B:
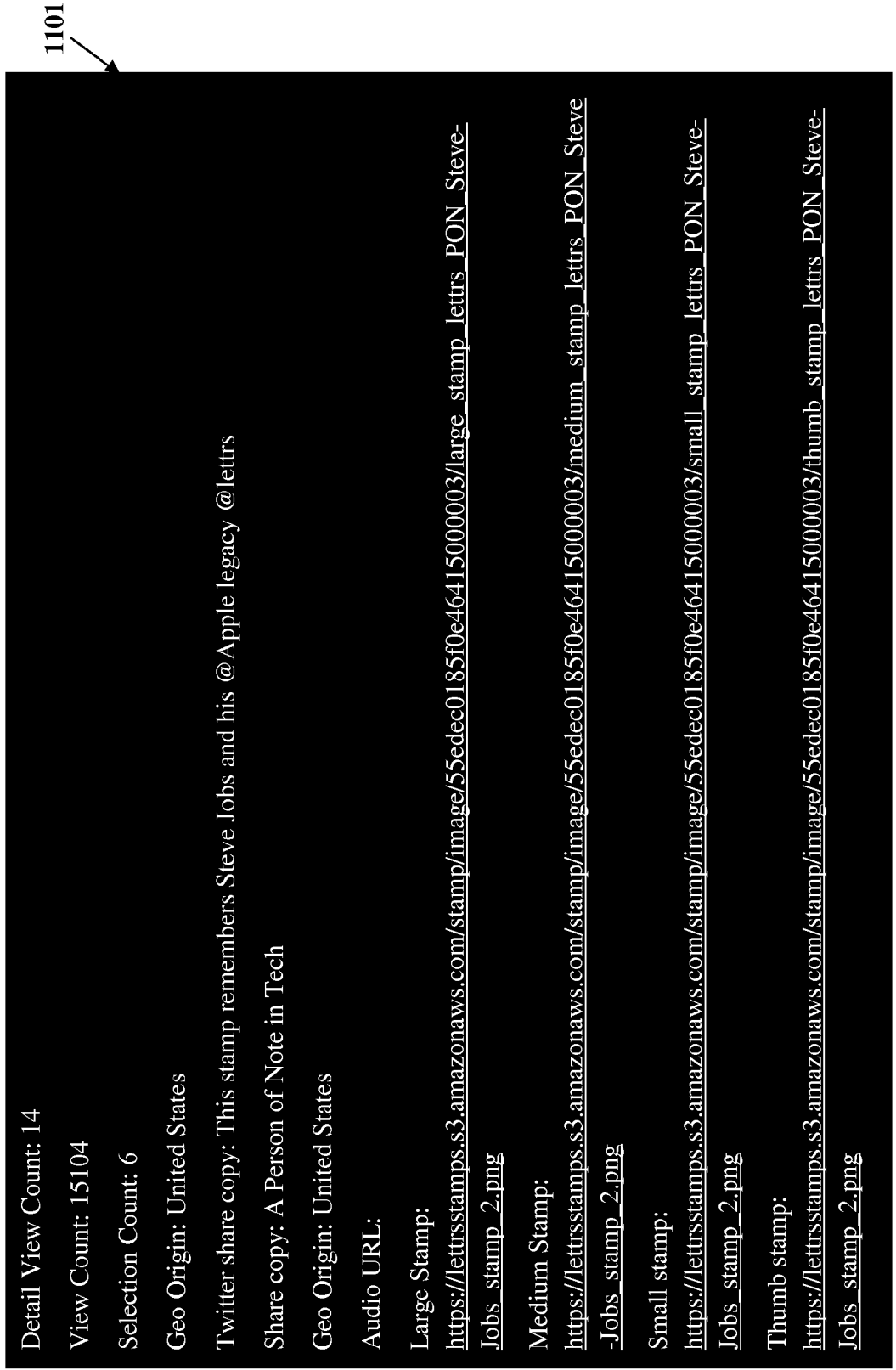

FIGS. 11A-11C exemplarily illustrate administration interfaces 1101 and 1102 provided by the mobile stamp creation and communication system (MSCCS) 304 exemplarily illustrated in FIG. 3, for viewing results of analytics performed in digital stamps. FIGS. 11A-11B exemplarily illustrate an administration interface 1101 provided by the MSCCS 304 exemplarily illustrated in FIG. 3, showing stamp information entered by a user and multiple factors and attributes that can be established for digital stamp creation that determine digital stamp rendering behavior in the graphical user interface (GUI) 305j exemplarily illustrated in FIG. 3, on the user device. FIG. 11A exemplarily illustrates the stamp information entered by the user. FIG. 11B exemplarily illustrates example analytics that determine stamp performance, popularity, and selections, references to ordering of the digital stamp, application programming interfaces (APIs) for the digital stamps, and the different size views of the digital stamp that are rendered using a display algorithm executed by the MSCCS 304.

FIG. 11C exemplarily illustrates an administration interface 1102 provided by the mobile stamp creation and communication system (MSCCS) 304 exemplarily illustrated in FIG. 3, for displaying analytics data generated by the MSCCS 304. The MSCCS 304 processes, analyzes, and transforms media interactions associated with the created and rendered digital stamps to determine user behavior and the dynamic functional elements used for creating the digital stamps, and also to compute one or more factors comprising, for example, number of views on each of the created digital stamps, stamp engagement, etc. The MSCCS 304 renders different views, for example, a stamp selection view, a stamp detail view, a letter list view, a letter detail view, a stamp total view, a stamp uses on letters, and stamp engagement for viewing and analysis by an administrator of the MSCCS 304. A stamp analytics table as exemplarily illustrated in FIG. 11C, also displays the total stamps, total stamps in circulation, and total stamp books.

Figure 12A:
Figure 12A:
Figure 12A:
Figure 12A:
Figure 12A:
Figure 12A:
Figure 12A:

FIGS. 12A-12B exemplarily illustrate screenshots of administration interfaces 1201 and 1202 provided by the mobile stamp creation and communication system (MSCCS) 304 exemplarily illustrated in FIG. 3, for managing stamp books and sponsors for digital stamps. The MSCCS 304 renders a listing of stamp books ordered by users on the administration interface 1201 exemplarily illustrated in FIG. 12A. A user may create a new stamp book and add the created stamp book with digital stamps to an existing book list. The listing of stamp books on the GUI 305j also provides information about the number of orders made on each stamp book, whether the stamp books are enabled, etc. A user, for example, an administrator can view, edit, or delete stamp books via the GUI 305j exemplarily illustrated in FIG. 12A. The MSCCS 304 also renders a listing of sponsors for the digital stamps on the administration interface 1202 exemplarily illustrated in FIG. 12B. A user may create a new sponsor and add the sponsor to an existing sponsor list. The administration interface 1202 exemplarily illustrated in FIG. 12B, also displays information about the sponsors, a description, a website uniform resource locator (URL), and the application URL of the particular sponsor. A user, for example, an administrator can view, edit, or delete sponsors via the GUI 305j exemplarily illustrated in FIG. 12B.

It will be readily apparent in different embodiments that the various methods, algorithms, and computer programs disclosed herein are implemented on computer readable media appropriately programmed for computing devices. As used herein, "computer readable media" refers to non-transitory computer readable media that participate in providing data, for example, instructions that are read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementation of the processes of various embodiments. Therefore, the embodiments are not limited to any specific combination of hardware and software. In general, the computer program codes comprising computer executable instructions may be implemented in any programming language. Examples of programming languages that can be used comprise C, C++, C#, Java®, JavaScript®, Fortran, Ruby, Perl®, a stack oriented programming language, Python®, Visual Basic®, programming languages for the iOS of Apple Inc., the Android® of Google Inc., hypertext preprocessor (PHP), Microsoft® .NET, Realm™, application programming interfaces (APIs), etc. Other object-oriented, functional, scripting, and/or logical programming languages may also be used. In an embodiment, the computer program codes or software programs are stored on or in one or more mediums as object code. In another embodiment, various aspects of the computer implemented method and the mobile stamp creation and communication system (MSCCS) 304 disclosed herein and exemplarily illustrated in FIG. 3, are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the computer implemented method and the MSCCS 304 disclosed herein are implemented as programmed elements, or non-programmed elements, or any suitable combination thereof. The computer program product disclosed herein comprises one or more computer program codes for implementing the processes of various embodiments.

Where databases are described such as the content database 306 and the analytics database 307, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the mobile stamp creation and communication system (MSCCS) 304, the databases are integrated to communicate with each other for enabling simultaneous updates of data linked across the databases, when there are any updates to the data in one of the databases.

The computer implemented method and the mobile stamp creation and communication system (MSCCS) 304 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The computer implemented method and the mobile stamp creation and communication system (MSCCS) 304 disclosed herein are not limited to a particular computer system platform, processor, operating system, or network. In an embodiment, one or more aspects of the computer implemented method and the MSCCS 304 disclosed herein are distributed among one or more computer systems, for example, servers configured to provide one or more services to one or more client computers, or to perform a complete task in a distributed system. For example, one or more aspects of the computer implemented method and the MSCCS 304 disclosed herein are performed on a client-server system that comprises components distributed among one or more server systems that perform multiple functions according to various embodiments. These components comprise, for example, executable, intermediate, or interpreted code, which communicate over a network using a communication protocol. The computer implemented method and the MSCCS 304 disclosed herein are not limited to be executable on any particular system or group of systems, and are not limited to any particular distributed architecture, network, or communication protocol.

The foregoing examples have been provided merely for the purpose of explanation and are in no way to be construed as limiting of the computer implemented method and the mobile stamp creation and communication system (MSCCS) 304 disclosed herein. While the computer implemented method and the MSCCS 304 have been described with reference to various embodiments, it is understood that the words, which have been used herein, are words of description and illustration, rather than words of limitation. Further, although the computer implemented method and the MSCCS 304 have been described herein with reference to particular means, materials, and embodiments, the computer implemented method and the MSCCS 304 are not intended to be limited to the particulars disclosed herein; rather, the computer implemented method and the MSCCS 304 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the computer implemented method and the MSCCS 304 disclosed herein in their aspects.

We claim:

1. A computer implemented method for dynamically creating, rendering, and transforming a digital stamp for a stamped communication and media interactions, said method employing a mobile stamp creation and communication system comprising at least one processor configured to execute computer program instructions for performing said method, said method comprising:

receiving, processing, and transforming media content, data elements, and dynamic functional elements from one or more of a plurality of sources by said mobile stamp creation and communication system, wherein said dynamic functional elements comprise a stamp transformation criteria for transformation of said digital stamp to dynamic content, and wherein said stamp transformation criteria comprises a code logic;

creating one or more of said digital stamps by integrating said received, processed, and transformed media content, said data elements, and said dynamic functional elements by said mobile stamp creation and communication system;

processing and rendering said created digital stamps to a user device via a graphical user interface provided by said mobile stamp creation and communication system based on dynamic rendering criteria, by said mobile stamp creation and communication system, wherein said mobile stamp creation and communication system transforms said created digital stamps into smart digital stamps;

generating said stamped communication with said smart digital stamps by said mobile stamp creation and communication system;

marking said smart digital stamps in said generated stamped communication with a visual usage marker, wherein said visual usage marker indicates use of said smart digital stamps in said generated stamped communication by said mobile stamp creation and communication system;

processing and transforming said marked smart digital stamps in said generated stamped communication into dynamic content on said user device by said mobile stamp creation and communication system, in communication with said user device, using said data elements, said dynamic functional elements imbedded in said smart digital stamps, and inherent elements of said user device; and performing one or more actions on said smart digital stamps and invoking said media interactions for further creation and rendering of enhanced digital stamps, by said mobile stamp creation and communication system.

2. The computer implemented method of claim 1, wherein said dynamic rendering criteria comprises one or more of logic parameters, user device characteristics, time, location, a user selection, user purchase information, user profile information, user interaction information, marketing criteria, a rendering sequence, pricing, a user membership status, and user profile settings in social networks.

3. The computer implemented method of claim 1, wherein said visual usage marker is further configured to indicate one or more of a delivery status and a viewing status of said smart digital stamps on said user device.

4. The computer implemented method of claim 1, wherein said inherent elements of said user device comprise a built-in image capture device, a global positioning system that provides geolocation information of said user device, and user device data.

5. The computer implemented method of claim 1, wherein said actions comprise tracking, data extraction, analysis, sharing, providing pathways to external sources, and management of said smart digital stamps.

6. The computer implemented method of claim 1, further comprising determining user behavior associated with said smart digital stamps by said mobile stamp creation and communication system by processing, analyzing, and transforming said media interactions with said smart digital stamps in said generated stamped communication using one or more of analytical inputs received via said graphical user interface and analytical tools.

7. The computer implemented method of claim 1, further comprising determining said dynamic functional elements for said creation and said rendering of said enhanced digital stamps by said mobile stamp creation and communication system by processing, analyzing, and transforming said media interactions with said smart digital stamps in said generated stamped communication using one or more of analytical inputs received via said graphical user interface and analytical tools.

8. The computer implemented method of claim 1, further comprising tracking and processing a date and a timestamp of each of said smart digital stamps by said mobile stamp creation and communication system.

9. The computer implemented method of claim 1, further comprising configuring access controls on said smart digital stamps by said mobile stamp creation and communication system for controlling access to said media content of said smart digital stamps and for tracking and processing said media interactions with said smart digital stamps and activities associated with said smart digital stamps.

10. The computer implemented method of claim 1, further comprising determining a cost for each of said created smart digital stamps by said mobile stamp creation and communication system based on predetermined pricing criteria, wherein said predetermined pricing criteria comprises one or more of digital stamp availability, promotion of said created digital stamps, sponsorship of said created digital stamps, stamp usage trends, and social factors.

11. The computer implemented method of claim 1, further comprising determining an ordering sequence for said rendering of said created smart digital stamps to said user device by said mobile stamp creation and communication system based on predetermined ordering criteria, wherein said predetermined ordering criteria comprises one or more of a manual order, digital stamp availability, promotion of said created digital stamps, sponsorship of said created digital stamps, stamp usage trends, and social factors.

12. The computer implemented method of claim 1, further comprising processing said media interactions performed on said smart digital stamps via said graphical user interface and transforming said processed media interactions into rewards by said mobile stamp creation and communication system.

13. The computer implemented method of claim 1, wherein said smart digital stamps comprise links to origin locations of said smart digital stamps.

14. The computer implemented method of claim 1, wherein said media content comprises one or more of textual content, image content, audio content, video content, audiovisual content, multimedia content, digital content, messaging content, social media content, advertising content, links to external sources, and any combination thereof.

15. A mobile stamp creation and communication system for dynamically creating, rendering, and transforming a digital stamp for a stamped communication and media interactions, said mobile stamp creation and communication system comprising:

a non-transitory computer readable storage medium configured to store computer program instructions defined by modules of said mobile stamp creation and communication system;

at least one processor communicatively coupled to said non-transitory computer readable storage medium, said at least one processor configured to execute said defined computer program instructions; and said modules of said mobile stamp creation and communication system comprising:

a data reception module configured to receive, process, and transform media content, data elements, and dynamic functional elements from one or more of a plurality of sources, wherein said dynamic functional elements comprise a stamp transformation criteria for transformation of said digital stamp to dynamic content, and wherein said stamp transformation criteria comprises a code logic;

a digital stamp creation module configured to create one or more of said digital stamps by integrating said received, processed, and transformed media content, said data elements, and said dynamic functional elements;

a digital stamp rendering module configured to process and render said created digital stamps to a user device via a graphical user interface provided by said mobile stamp creation and communication system based on dynamic rendering criteria, by said mobile stamp creation and communication system, wherein said mobile stamp creation and communication system transforms said created digital stamps into smart digital stamps;

a stamped communication generation module configured to generate said stamped communication with said smart digital stamps;

a digital stamp marking module configured to mark said smart digital stamps in said generated stamped communication with a visual usage marker, wherein said visual usage marker indicates use of said smart digital stamps in said generated stamped communication;

a digital stamp transformation module, in communication with said user device, configured to process and transform said marked smart digital stamps in said generated stamped communication into dynamic content on said user device, in communication with said user device, using said data elements, said dynamic functional elements imbedded in said smart digital stamps, and inherent elements of said user device; and said digital stamp transformation module further configured to perform one or more actions on said smart digital stamps and invoking said media interactions for further creation and rendering of enhanced digital stamps.

16. The mobile stamp creation and communication system of claim 15, wherein said dynamic rendering criteria comprises one or more of logic parameters, user device characteristics, time, location, a user selection, user purchase information, user profile information, user interaction information, marketing criteria, a rendering sequence, pricing, a user membership status, and user profile settings in social networks.

17. The mobile stamp creation and communication system of claim 15, wherein said visual usage marker is further configured to indicate one or more of a delivery status and a viewing status of said smart digital stamps on said user device.

18. The mobile stamp creation and communication system of claim 15, wherein said inherent elements of said user device comprise a built-in image capture device, a global positioning system that provides geolocation information of said user device, and user device data.

19. The mobile stamp creation and communication system of claim 15, wherein said actions comprise tracking, data extraction, analysis, sharing, providing pathways to external sources, and management of said smart digital stamps.

20. The mobile stamp creation and communication system of claim 15, wherein said modules of said mobile stamp creation and communication system further comprise an analytics engine configured to determine user behavior associated with said smart digital stamps by processing, analyzing, and transforming said media interactions with said smart digital stamps in said generated stamped communication using one or more of analytical inputs received via said graphical user interface and analytical tools.

21. The mobile stamp creation and communication system of claim 15, wherein said modules of said mobile stamp creation and communication system further comprise an analytics engine further configured to determine said dynamic functional elements for said creation and said rendering of said enhanced digital stamps by processing, analyzing, and transforming said media interactions with said smart digital stamps in said generated stamped communication using one or more of analytical inputs received via said graphical user interface and analytical tools.

22. The mobile stamp creation and communication system of claim 15, wherein said digital stamp rendering module is further configured to track and process a date and a timestamp of each of said processed and rendered smart digital stamps.

23. The mobile stamp creation and communication system of claim 15, wherein said modules of said mobile stamp creation and communication system further comprise an access control module configured to configure access controls on said smart digital stamps for controlling access to said media content of said smart digital stamps and for tracking and processing said media interactions with said smart digital stamps and activities associated with said smart digital stamps.

24. The mobile stamp creation and communication system of claim 15, wherein said digital stamp creation module is further configured to determine a cost for each of said created smart digital stamps based on predetermined pricing criteria, wherein said predetermined pricing criteria comprises one or more of digital stamp availability, promotion of said created digital stamps, sponsorship of said created digital stamps, stamp usage trends, and social factors.

25. The mobile stamp creation and communication system of claim 15, wherein said digital stamp creation module is further configured to determine an ordering sequence for said rendering of said created smart digital stamps to said user device based on predetermined ordering criteria, wherein said predetermined ordering criteria comprises one or more of a manual order, digital stamp availability, promotion of said created digital stamps, sponsorship of said created digital stamps, stamp usage trends, and social factors.

26. The mobile stamp creation and communication system of claim 15, wherein said modules of said mobile stamp creation and communication system further comprise a reward processing module configured to process said media interactions performed on said smart digital stamps via said graphical user interface and transforming said processed media interactions into rewards.

27. A computer program product comprising a non-transitory computer readable storage medium having embodied thereon, computer program codes comprising instructions executable by at least one processor for dynamically creating, rendering, and transforming a digital stamp for a stamped communication and media interactions, said computer program codes comprising:

a first computer program code for receiving, processing, and transforming media content, data elements, and dynamic functional elements from one or more of a plurality of sources, wherein said dynamic functional elements comprise a stamp transformation criteria for transformation of said digital stamp to dynamic content, and wherein said stamp transformation criteria comprises a code logic;

a second computer program code for creating one or more of said digital stamps by integrating said received, processed, and transformed media content, said data elements, and said dynamic functional elements;

a third computer program code for processing and rendering said created digital stamps to a user device via a graphical user interface provided by said mobile stamp creation and communication system based on dynamic rendering criteria, wherein said mobile stamp creation and communication system transforms said created digital stamps into smart digital stamps, and wherein said dynamic rendering criteria comprises logic parameters, user device characteristics, time, location, a user selection, user purchase information, user profile information, user interaction information, marketing criteria, a rendering sequence, pricing, a user membership status, and user profile settings in social networks;

a fourth computer program code for generating said stamped communication with said smart digital stamps;

a fifth computer program code for marking said smart digital stamps in said generated stamped communication with a visual usage marker, wherein said visual usage marker indicates use of said smart digital stamps in said generated stamped communication; and a sixth computer program code for processing and transforming said marked smart digital stamps in said generated stamped communication into dynamic content on said user device, in communication with said user device, using said data elements, said dynamic functional elements imbedded in said smart digital stamps, and inherent elements of said user device; and said sixth computer program code further comprising code for performing one or more actions on said smart digital stamps and invoking said media interactions for further creation and rendering of enhanced digital stamps, wherein said inherent elements of said user device comprise a built-in image capture device, a global positioning system that provides geolocation information of said user device, and user device data.

28. The computer program product of claim 27, wherein said computer program codes further comprise:

a seventh computer program code for determining user behavior associated with said smart digital stamps by processing, analyzing, and transforming said media interactions with said smart digital stamps in said generated stamped communication using one or more of analytical inputs received via said graphical user interface and analytical tools; and an eighth computer program code for determining said dynamic functional elements for said creation and said rendering of said enhanced digital stamps by processing, analyzing, and transforming said media interactions with said smart digital stamps in said generated stamped communication using one or more of analytical inputs received via said graphical user interface and analytical tools.

* * * * *